May 1, 1962 W. H. KAUTZ 3,032,746
BUFFER STORAGE SYSTEM
Filed July 5, 1956 26 Sheets-Sheet 1

MEMORY I

MEMORY II

INVENTOR.
WILLIAM H. KAUTZ
BY Lyon & Lyon
ATTORNEYS

INVENTOR.
WILLIAM H. KAUTZ
BY Lyon & Lyon
ATTORNEYS

INVENTOR.
WILLIAM H. KAUTZ
BY Lyon & Lyon
ATTORNEYS

May 1, 1962 W. H. KAUTZ 3,032,746

BUFFER STORAGE SYSTEM

Filed July 5, 1956

26 Sheets-Sheet 4

INVENTOR.
WILLIAM H. KAUTZ
BY Lyon & Lyon
ATTORNEYS

INVENTOR.
WILLIAM H. KAUTZ
BY Lyon & Lyon
ATTORNEYS

INVENTOR.
WILLIAM H. KAUTZ
BY Lyon & Lyon
ATTORNEYS

INVENTOR.
WILLIAM H. KAUTZ
BY Lyon & Lyon
ATTORNEYS

May 1, 1962 W. H. KAUTZ 3,032,746

BUFFER STORAGE SYSTEM

Filed July 5, 1956

26 Sheets-Sheet 8

INVENTOR.
WILLIAM H. KAUTZ
BY Lyon & Lyon
ATTORNEYS

INVENTOR.
WILLIAM H. KAUTZ
BY Lyon & Lyon
ATTORNEYS

BUFFER STORAGE SYSTEM

Filed July 5, 1956 26 Sheets-Sheet 10

INVENTOR.
WILLIAM H. KAUTZ
BY Lyon & Lyon
ATTORNEYS

May 1, 1962 W. H. KAUTZ 3,032,746

BUFFER STORAGE SYSTEM

Filed July 5, 1956 26 Sheets-Sheet 11

INVENTOR.
WILLIAM H. KAUTZ

BY Lyon & Lyon

ATTORNEYS

INVENTOR.
WILLIAM H. KAUTZ
BY Lyon & Lyon
ATTORNEYS

May 1, 1962 W. H. KAUTZ 3,032,746

BUFFER STORAGE SYSTEM

Filed July 5, 1956 26 Sheets-Sheet 13

INVENTOR.
WILLIAM H. KAUTZ
BY Lyon & Lyon
ATTORNEYS

INVENTOR.
WILLIAM H. KAUTZ
BY Lyon & Lyon
ATTORNEYS

May 1, 1962 W. H. KAUTZ 3,032,746

BUFFER STORAGE SYSTEM

Filed July 5, 1956 26 Sheets-Sheet 15

INVENTOR.
WILLIAM H. KAUTZ
BY Lyon & Lyon
ATTORNEYS

INVENTOR.
WILLIAM H. KAUTZ
BY Lyon & Lyon
ATTORNEYS

May 1, 1962 W. H. KAUTZ 3,032,746

BUFFER STORAGE SYSTEM

Filed July 5, 1956 26 Sheets-Sheet 17

INVENTOR.
WILLIAM H. KAUTZ
BY Lyon & Lyon
ATTORNEYS

INVENTOR.
WILLIAM H. KAUTZ
BY Lyon & Lyon
ATTORNEYS

May 1, 1962 W. H. KAUTZ 3,032,746

BUFFER STORAGE SYSTEM

Filed July 5, 1956 26 Sheets-Sheet 19

INVENTOR.
WILLIAM H. KAUTZ

BY Lyon & Lyon

ATTORNEYS

INVENTOR.
WILLIAM H. KAUTZ
BY Lyon & Lyon
ATTORNEYS

INVENTOR.
WILLIAM H. KAUTZ
BY Lyon & Lyon
ATTORNEYS

INVENTOR.
WILLIAM H. KAUTZ
BY Lyon & Lyon
ATTORNEYS

BUFFER STORAGE SYSTEM

Filed July 5, 1956 26 Sheets-Sheet 23

INVENTOR.
WILLIAM H. KAUTZ
BY Lyon & Lyon
ATTORNEYS

INVENTOR.
WILLIAM H. KAUTZ
BY Lyon & Lyon
ATTORNEYS

INVENTOR.
WILLIAM H. KAUTZ
BY
ATTORNEYS

INVENTOR.
WILLIAM H. KAUTZ
BY Lyon & Lyon
ATTORNEYS

United States Patent Office 3,032,746

Patented May 1, 1962

3,032,746
BUFFER STORAGE SYSTEM

William H. Kautz, Palo Alto, Calif., assignor, by mesne assignments, to General Electric Company, New York, N.Y., a corporation of New York Filed July 5, 1956, Ser. No. 596,045
16 Claims. (Cl. 340—172.5)

This invention relates to storage systems for information-handling machines and, more particularly, to an improved buffer storage system for information-handling machines.

A buffer storage system is, in effect, a data storage system which is usually employed in an information-handling machine for the purpose of altering the rate of information flow. For example, data being entered randomly into a machine may be collected and stored in a buffer store and then entered rapidly and in quantity into a central memory, or the data may be fed rapidly from the central memory into the buffer store from whence it is fed as rapidly as possible to an output printer. The present invention deals with the former type of buffer store—that is, one which is employed to collect and hold input data for subsequent rapid transfer to a second "main" memory system.

For the main, or "permanent," memory, present-day information-handling machines usually employ a plurality of magnetic tapes. This is a serial type of memory, since data is stored serially on the tapes. The present invention employs a magnetic drum as a buffer store between the input and a subsequent serial type of memory such as the plurality of magnetic tapes.

An object of the present invention is to provide a novel buffer storage system.

A simple buffer storage arrangement is one wherein the buffer storage is divided into as many sections as there are tapes upon which entries are to be made. Each section is associated with a different tape; thus, entries destined for tape 1 are entered into buffer store section 1, entires destined for tape 2 are entered into buffer store section 2, etc. The principal disadvantages of such a system are that, in a situation where the distribution of incoming data is not uniform, there is an inefficient utilization of the availablbe storage space and difficulties may arise due to insufficient storage space being allotted to the data for the more popular tapes. Also, oftentimes data input must be interrupted until the buffer store has been emptied.

Another object of the present invention is to provide a buffer storage system which is more efficient in the utilization of storage space than those heretofore.

Yet another object of the present invention is the provision of an improved buffer storage system which is flexible with respect to assignments of space for storage.

Still another object of the present invention is the provision of an improved buffer storage system which assigns storage space as required.

Another object of this invention is the provision of an improved buffer storage system wherein there is no interruption of input required for emptying the buffer store.

These and other objects of the invention are achieved in a buffer storage system in accordance with this invention wherein the store is divided into a large number of sections with no fixed correspondence being established between these sections and the subsequent magnetic tapes into which the data is to be eventually entered. The data being entered bears the address of the tape on which it will be eventually stored. The data is entered into the one of the sections of the buffer store, which, in the embodiment of the invention, is a magnetic drum, and which section has been preliminarily assigned to that data. The amount of storage space in each section is monitored, and provision is made so that when the storage space in a section attains a condition to be emptied, which may or may not be a completely filled condition, it is emptied. Another section of the buffer store is assigned meanwhile so that incoming data may continue to be received. If for some reason a filled section cannot be emptied onto tape, then other sections of storage space are assigned as required, so that data can continue to be received without a shutdown being required until the buffer store is emptied. Provision is also made to empty the sections of the buffer store in the same order as they were filled.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 6:
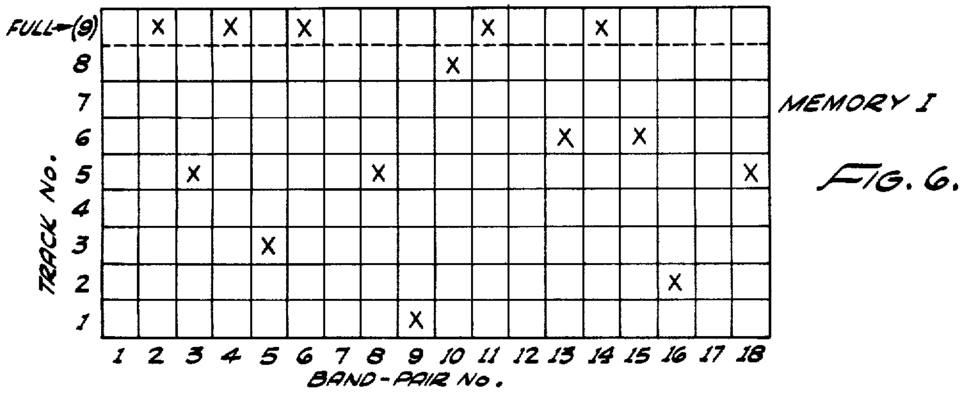
FIGURE 6 is a schematic diagram of a portion of Memory I.
Figure 7:
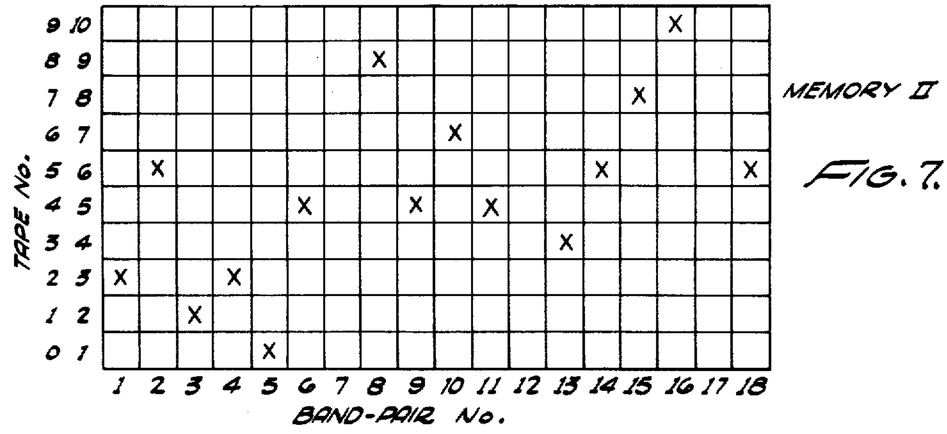
Figure 6A:
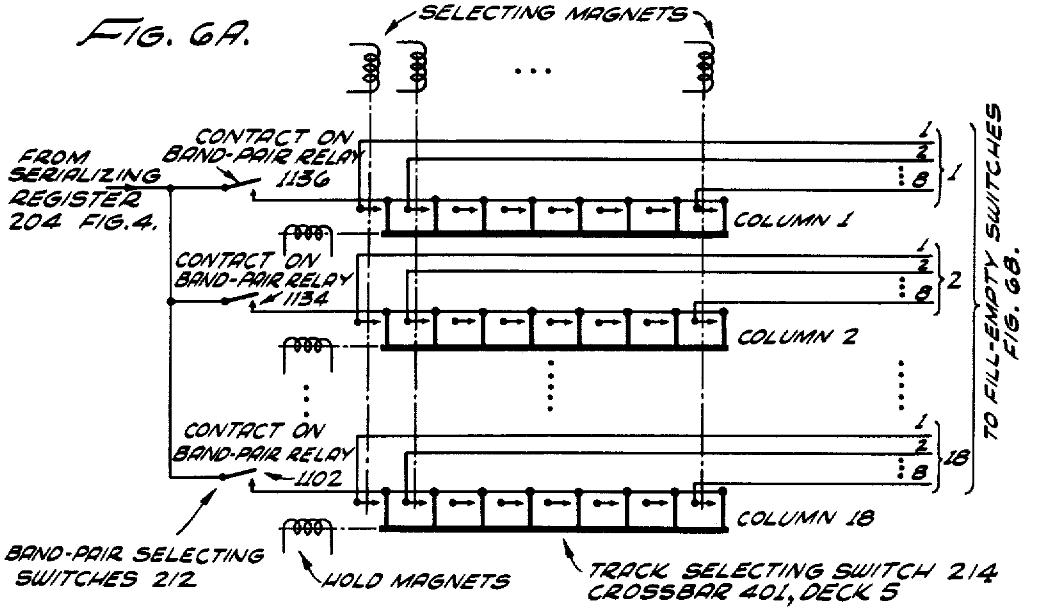
Figure 6B:
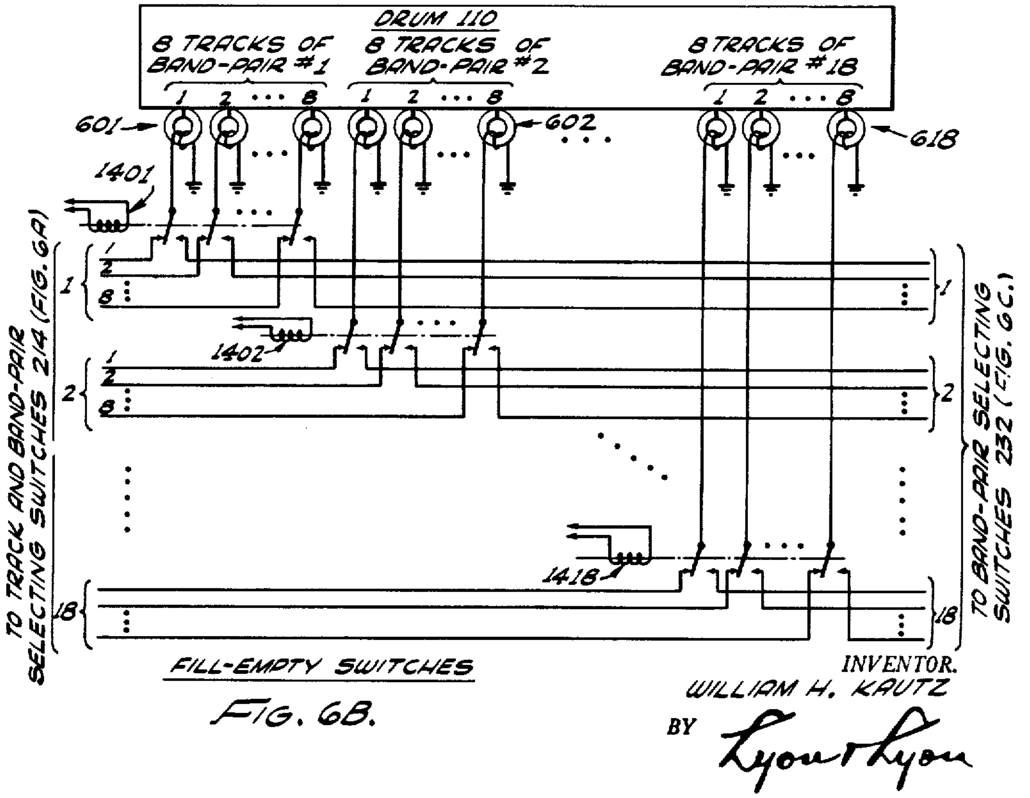
Figure 6C:
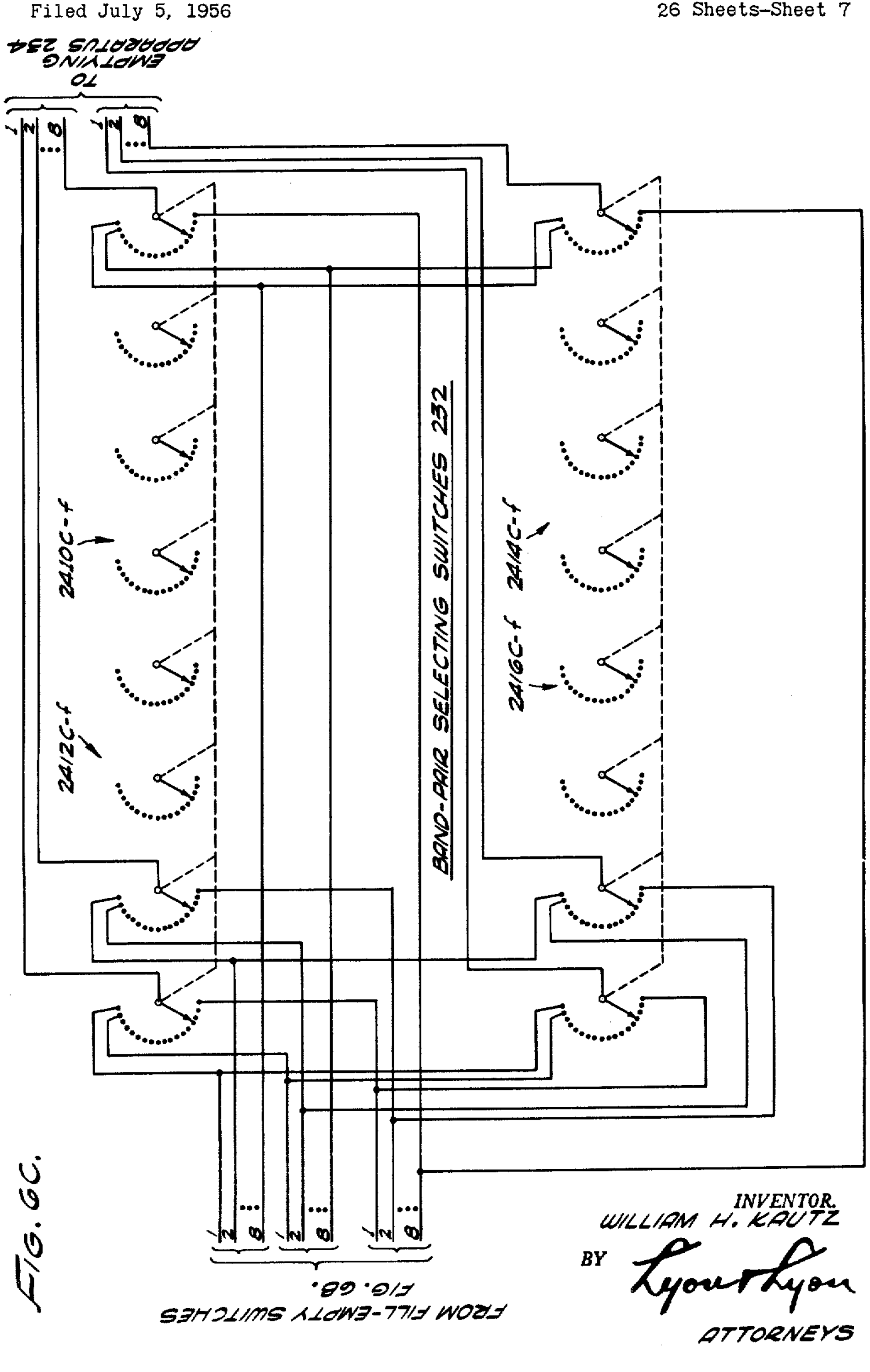
Figure 8:
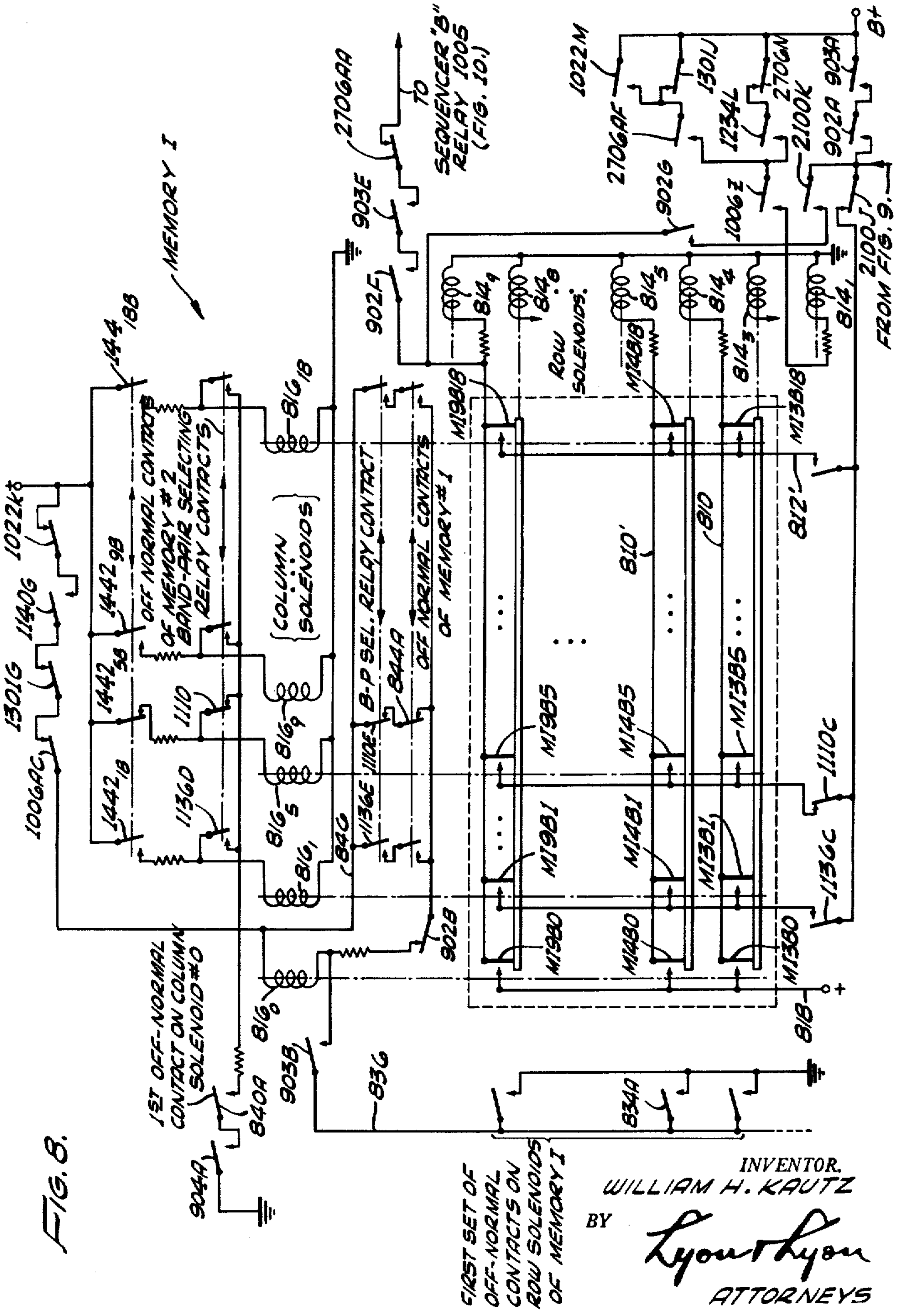
Figure 9:
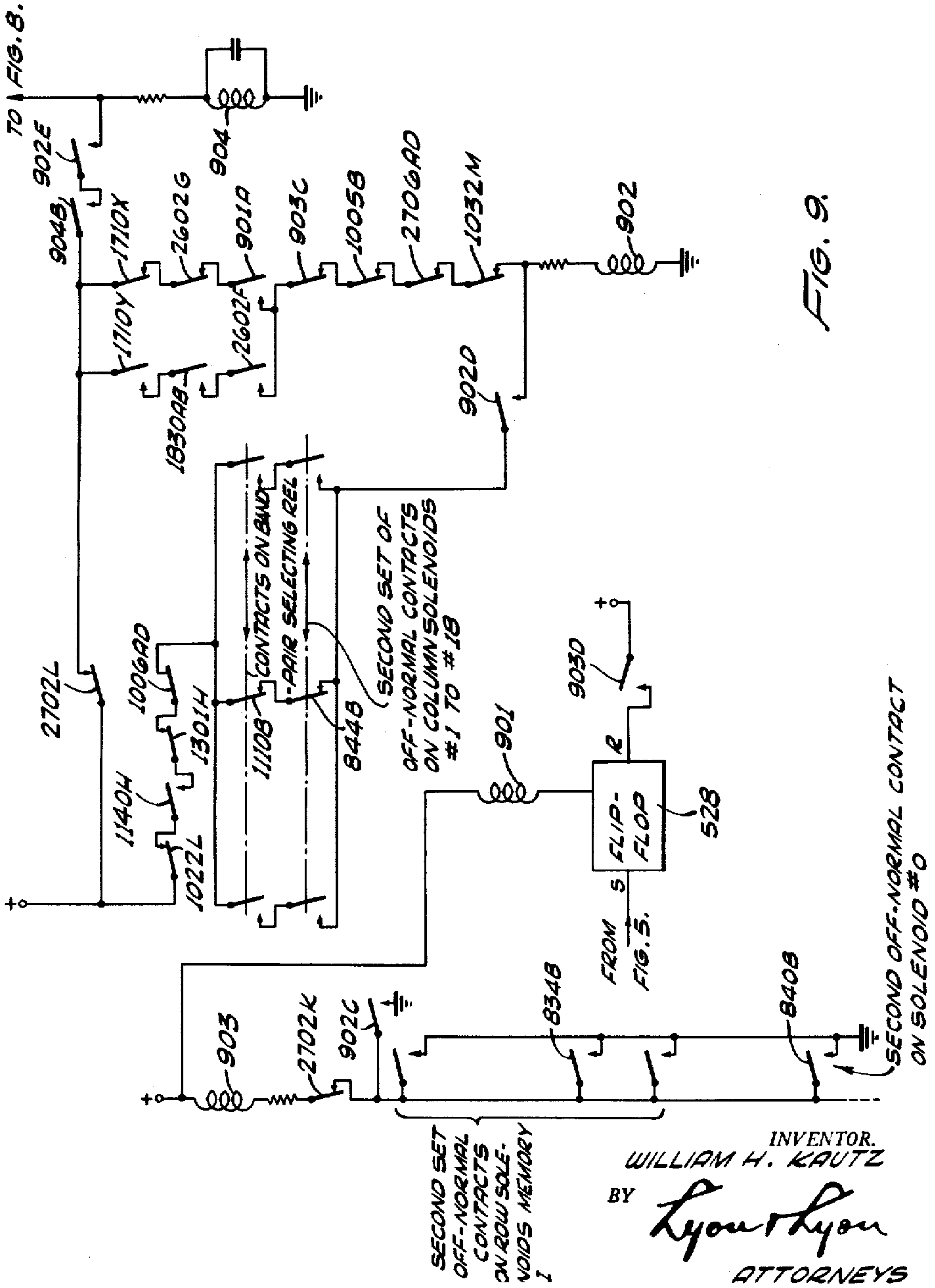
Figure 24:
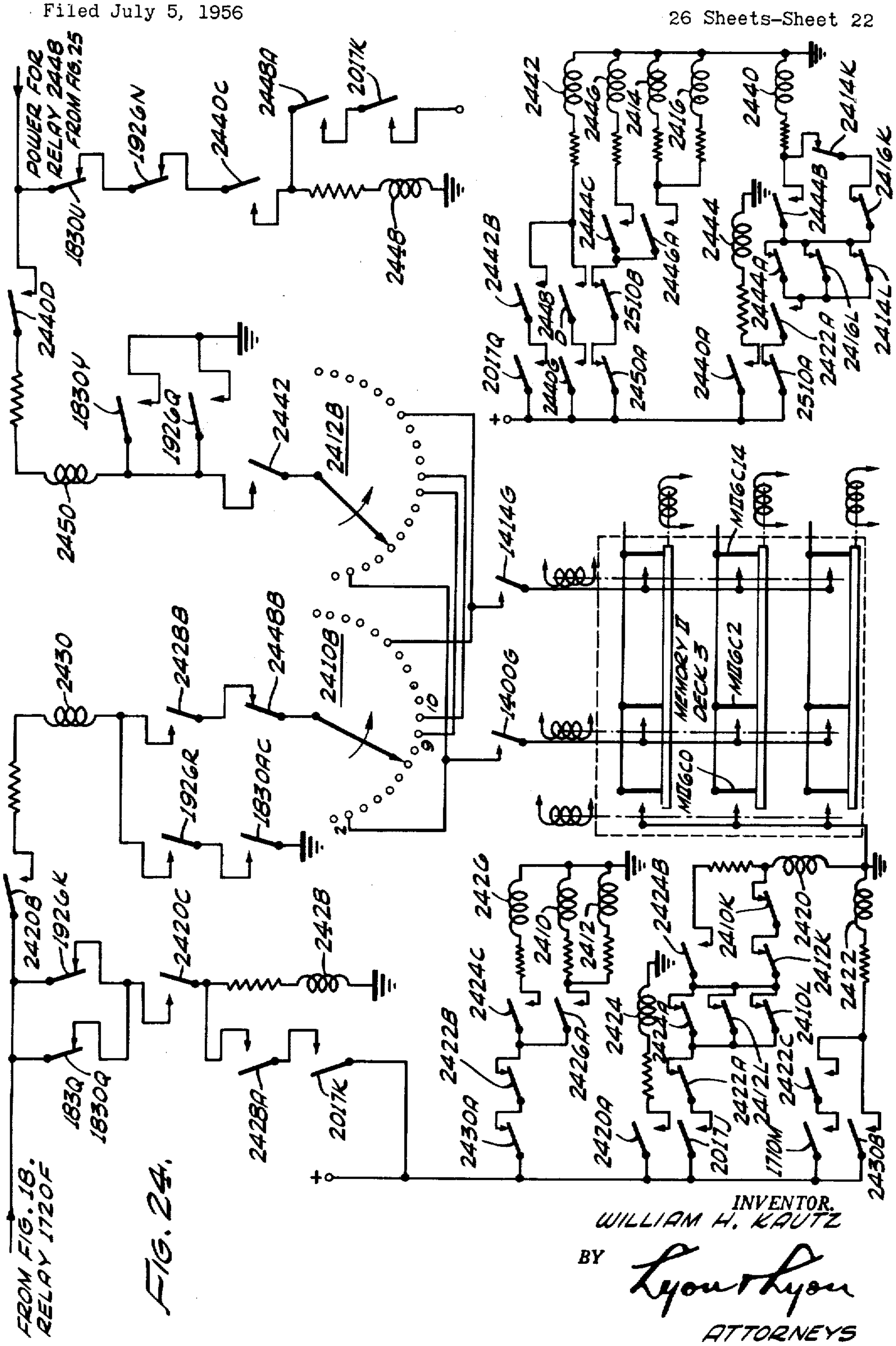
Figure 25:
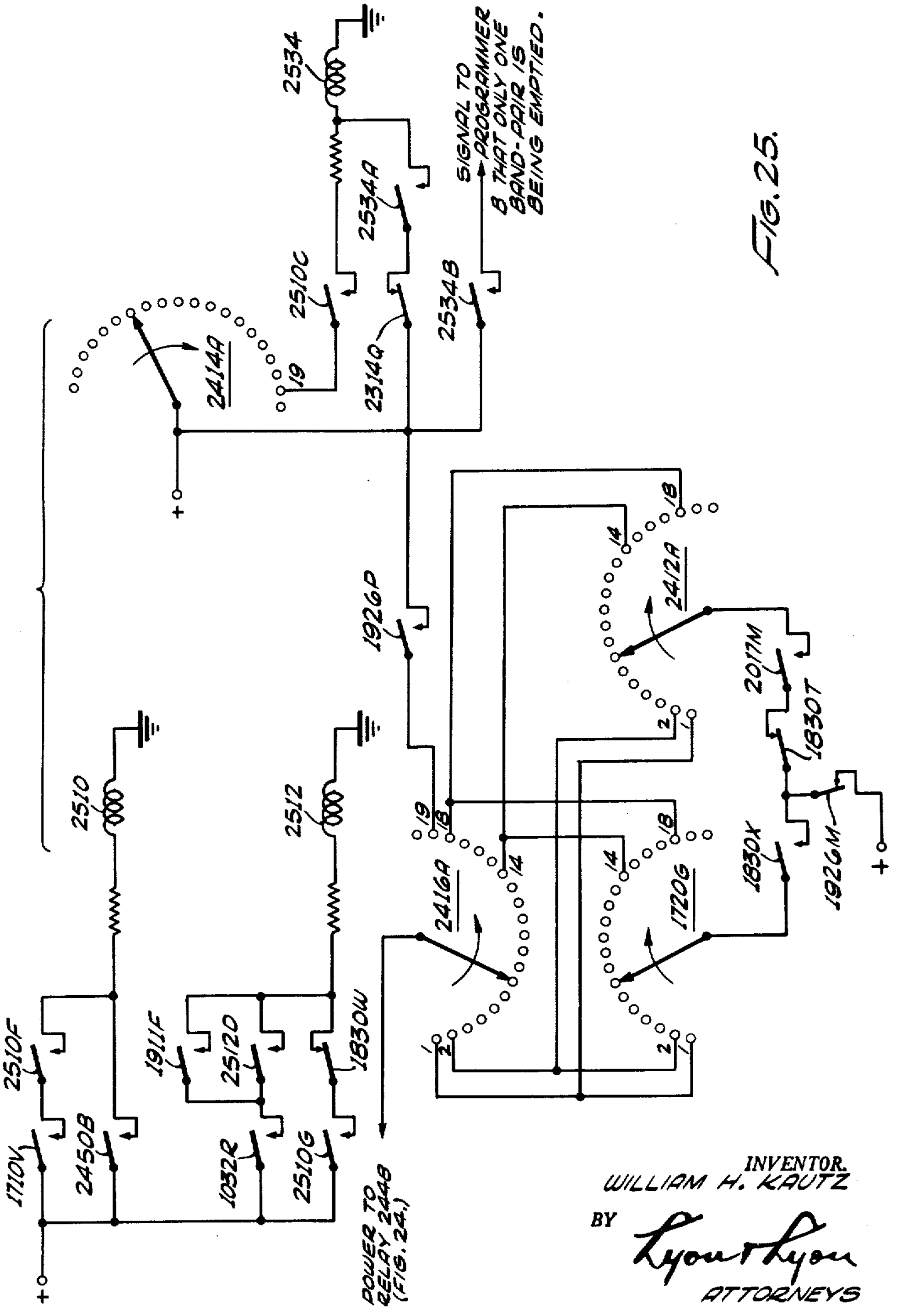
Figure 26:
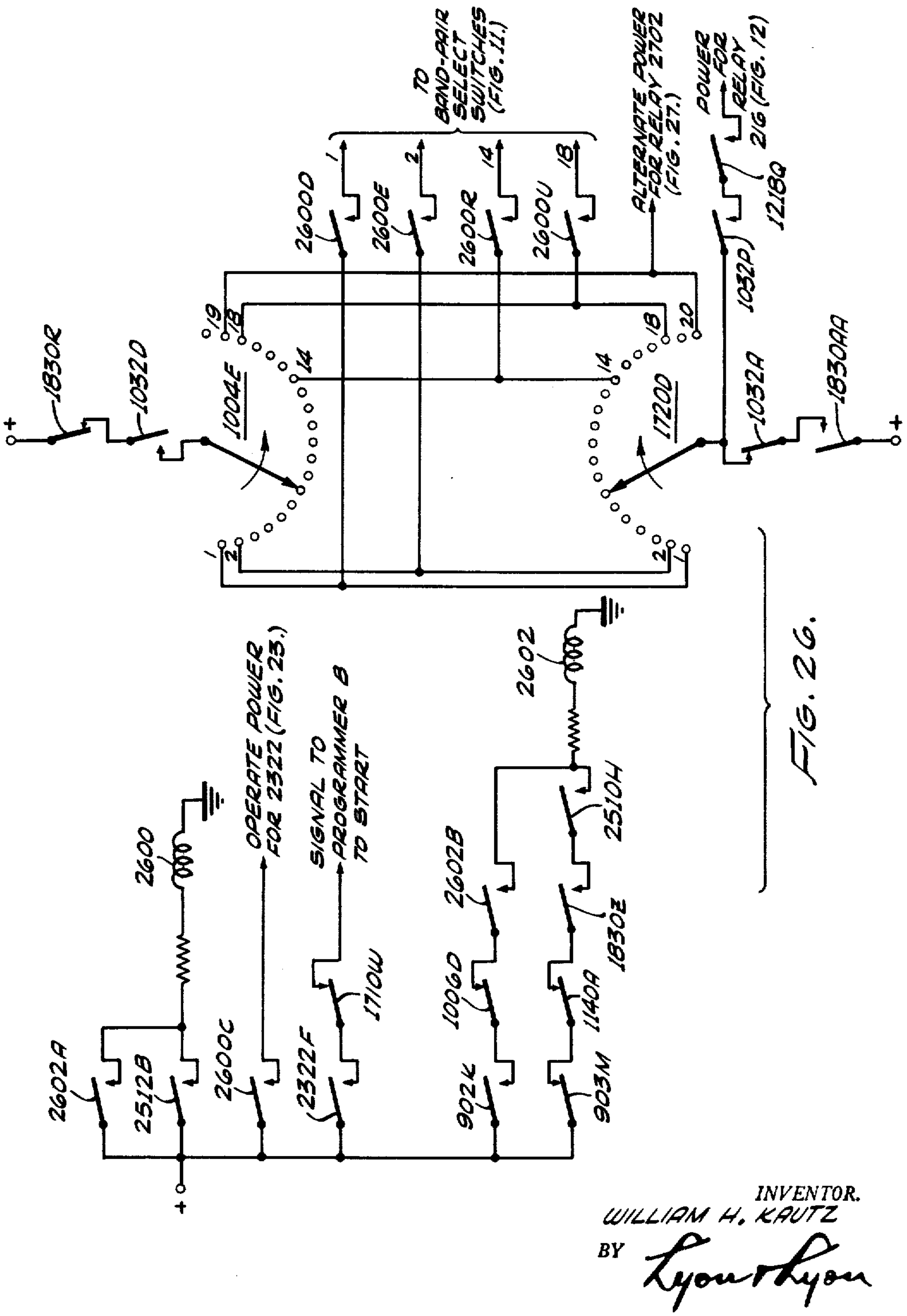
Figure 29:
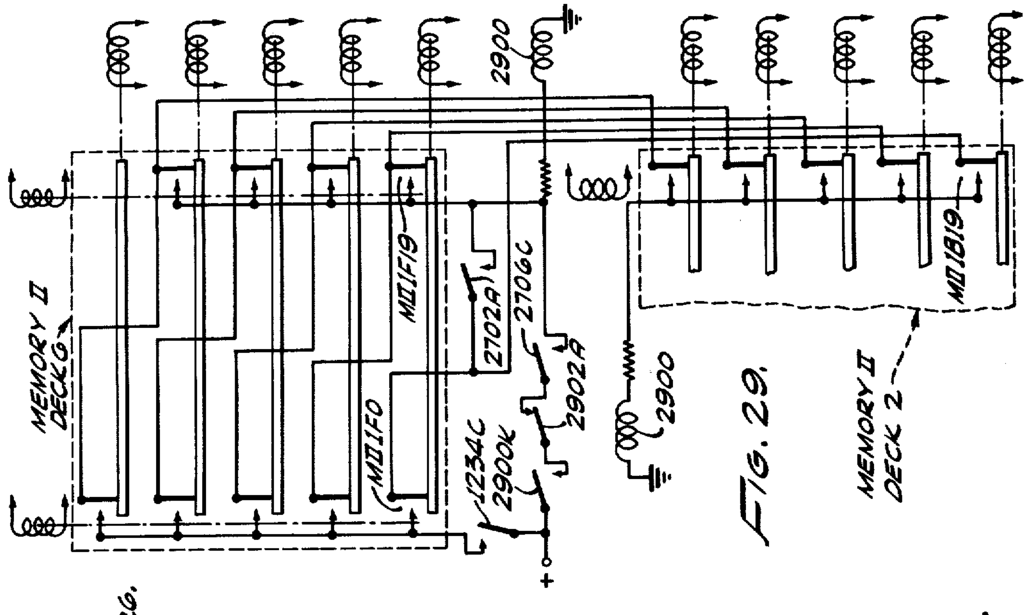
Figure 27:
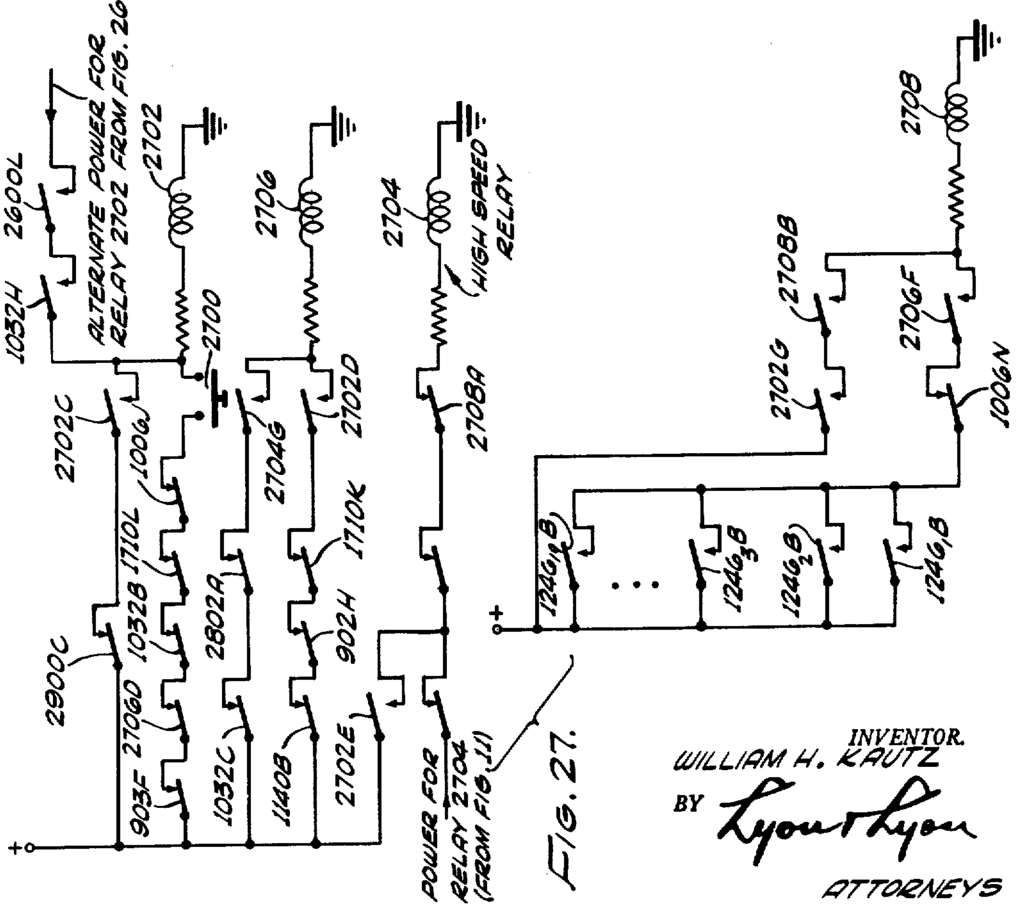
Figure 28:
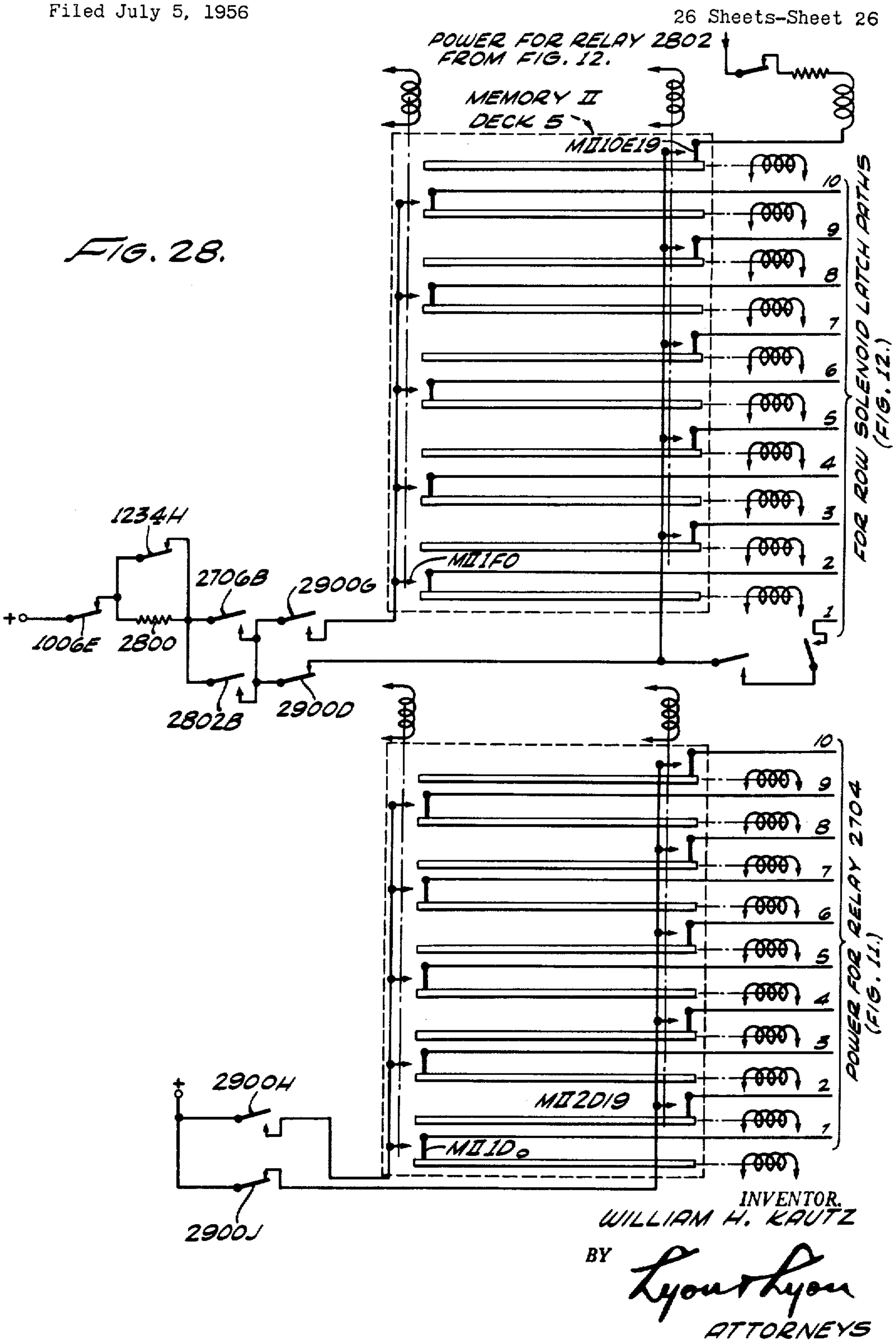

FIGURES 6A, 6B, and 6C are schematic diagrams of data paths to the drum from the serializing register and from the drum to subsequent apparatus;

FIGURE 7 is a schematic diagram of a portion of Memory II;

FIGURES 8 and 9 are circuit diagrams of Sequencer A and so much of Memory I as co-operates with it to advance the track assignment in response to a request therefor;

FIGURES 10 through 16 are circuit diagrams of Sequencer B and associated portions of Memory I and Memory II and the fill-empty relays required for its operation;

FIGURES 17 through 23 are schematic circuit diagrams of Sequencer C;

FIGURES 24 through 26 are schematic circuit diagrams of Sequencer D and the band-pair selecting switches; and FIGURES 27 through 29 are schematic circuit diagrams of Sequencer E.

*General Description*

The buffer store, which is an embodiment of this invention, is described in an environment wherein it is between the data-input source of an information-handling machine and the permanent store or memory of the machine. In an embodiment of the invention which was built, the data-input source was a keyboard-input arrangement which, in combination with other circuitry, converted a decimal input to an excess-three binary code which is employed in the information-handling machine. The input data consisted of decimal numbers which included an account number which identified a person making a transaction and which was also used as the address of the data. The remainder of the numbers for a single item of data indicated a transaction which took place and which the machine would process for the person whose account number is identified. Such an arrangement is described and claimed in an application for an Error-Checking System, by Bonnar Cox et al., Serial No. 539,504, filed October 10, 1955, and assigned to a common assignee.

The permanent memory with which the embodiment of the invention was employed consisted of a plurality of magnetic tapes. Assume, by way of illustration, that there are ten tapes. Each of these tapes has its own transport mechanism and reading and writing apparatus and can be separately actuated for reading or writing. It is determined in advance which tape will store which account numbers. Thus, for example, by recognizing the most significant digit of the account number of an item of incoming data, which may be termed a "word," the tape upon which it will be stored eventually is established. Keyboards for converting an input to a code are well known and are used in presentday information-handling machines. A preferred arrangement for converting from keyboard input to an excess-three binary code is shown and described in the previously noted application for an Error-Checking System, Serial No. 539,504. Code recognition circuits are also well known, a suitable arrangement being shown in a patent to Ayres et al., Patent No. 2,648,829. A suitable number of the code-recognition circuits are employed, each of which provides an output upon recognizing the code indicative of the tape upon which storage is to occur. Alternatively, when an item is entered into the input keyboard, one column of keys on the keyboard may be used to energize one out of many separate lines to indicate the tape on which this item will eventually be stored.

Accordingly, the input to the buffer storage system embodying this invention consists of signals indicative of the tape upon which the incoming data is to be stored eventually, as well as the incoming data itself.

Figure 1:
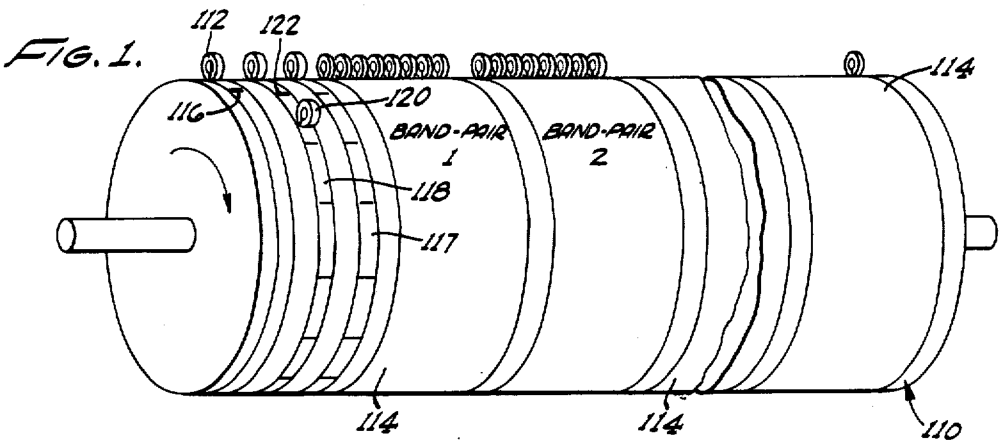
FIGURE 1 shows a preferred arrangement of the data stored on a magnetic drum as used in an embodiment of this invention.

As previously stated, the actual storage medium employed in the embodiment of the invention which was built is a magnetic drum. This is not to be construed as a limitation on the invention, since other types of cyclically operated storage devices may be employed in place of the magnetic drum without departing from the spirit and scope of the invention. In order to better understand this invention, the arrangement of the drum and the data thereon as shown in FIGURE 1 will be explained. The magnetic drum 110 has a read-write head 112 positioned over every track on the drum. A "track" is the portion of the periphery of a drum which passes under a read-write head and in which binary digits are stored.

In the description of the embodiment of the invention that follows, the term "band-pair" 114 is used to denote a section of the magnetic drum used as the buffer store which is to be associated with or is already allotted to a specific magnetic tape. Each band-pair includes eight tracks on the magnetic drum which are not necessarily adjacent. The incoming data consists of separate items, each of which includes the address of the item, such as the account number previously mentioned. The items are written serially on the drum on one track of a band-pair at a time, so that the eight tracks will fill up in sequence. Provision is made on the drum for a "begin-band marker" 116. This means a mark on the drum which may be detected either magnetically or optically by photoelectric devices as indicative of the beginning, or origin point, of all the tracks on the drum. Provision is also made in well-known manner for deriving timing pulses from the drum, whereby the writing on the drum may be properly timed and, also, timing pulses may be obtained for timing the operation of the balance of the information-handling machine. A suitable arrangement for deriving these timing pulses is shown in Patent No. 2,702,380 to Brustman et al.

Intelligence for determining whether sufficient space on a track exists for the next item to be written may be derived after an item has been written by counting the number of timing pulses occurring between the last item which was written in the track and the begin-band pulse. This furnishes a measure of the remaining space since, if the count is less than a predetermined number, as determined by the number of timing pulses occurring over a track sector, which is the space allotted along a track for writing an item, then a new track must be assigned for incoming data. The track sectors over the entire drum are aligned with each other axially. A single track 117 has pulses recorded therealong at the beginning of every sector. These are designated as sector pulses.

A preferred method for handling the space-measuring problem is to employ a special track, known as the last-item-marker track 118. This track has a writing head 120 spaced one sector space and five digit spaces after the reading head. This track is divided into sectors which are aligned with the sectors for the items. Each sector has ten separate recording positions corresponding to the fact that writing on the drum will occur for ten different tapes in ten different tracks in ten different band-pairs. Recording position 1 is always identified with the track destined for tape 1. Thus, it is only necessary to record a pulse in a sector next to the one aligned with the sector in which the last item was written on the track in the band-pair whose data is destined for tape 1. More specifically, the pulse should be in recording position 1 in that sector. This pulse will, as recording progresses, progressively be recorded in a succeeding sector and erased in a preceding sector.

For the track with data destined for tape 2, recording positon 2 in each sector is employed—recording position 10 in each sector is used for last-item-marking the track with data for tape 10.

Figure 5:
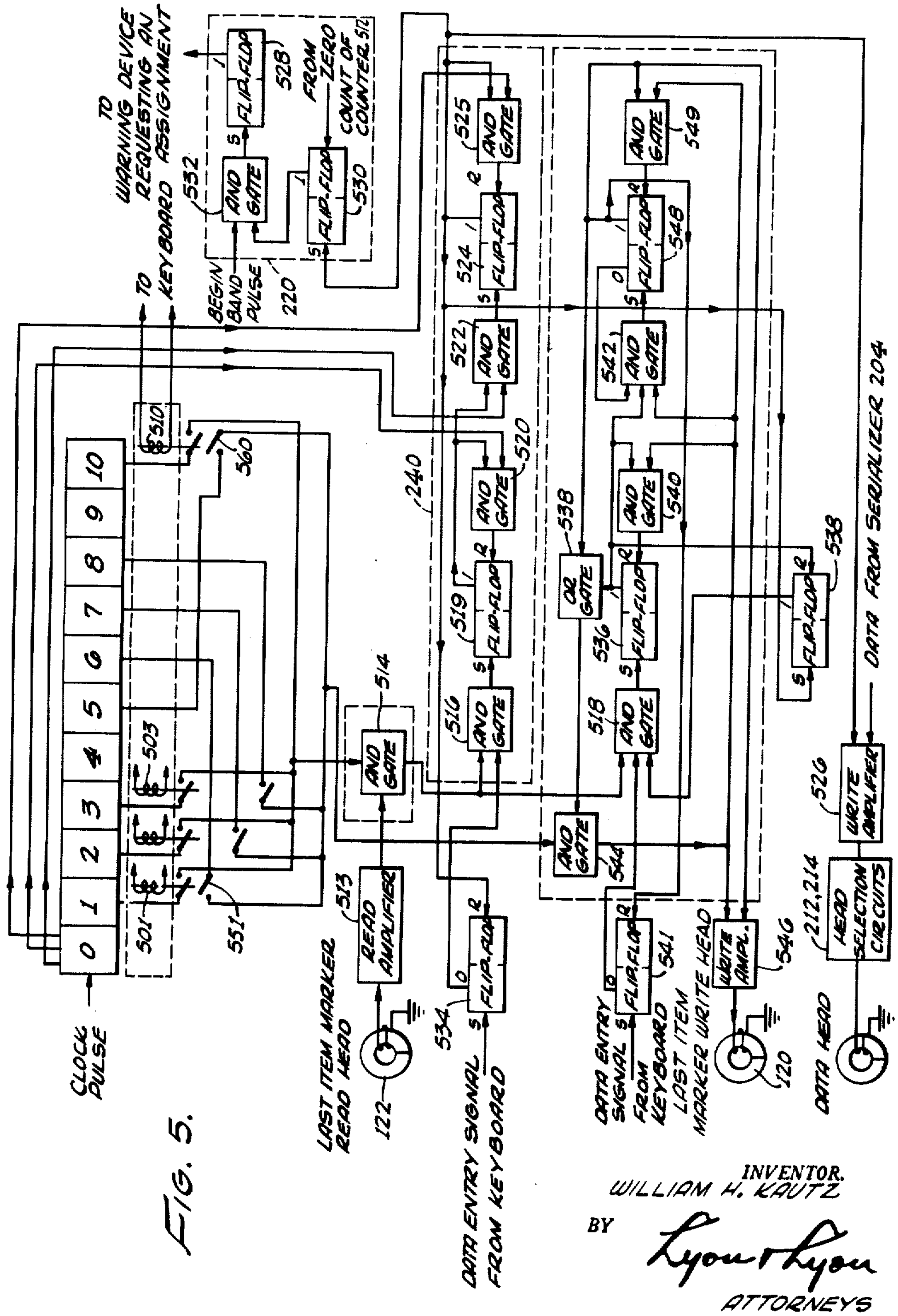
FIGURE 5 is a block diagram of an arrangement for an inspect-track circuit.

Since writing only occurs in one track of a band-pair at a time, it is only necessary to watch that one track. After a track fills, the last-item marker is moved up to the first sector for the next track assigned to that tape. The distance from the sector in which is recorded the last-item-marker pulse for each track to the begin-band pulse can be readily measured. Also, information as to when to write the next word is also provided. Details for apparatus showing the last-item-marker-drum-indexing techniques are shown in FIGURE 5.

*General Description of the Embodiment of the Invention*

Figure 2:
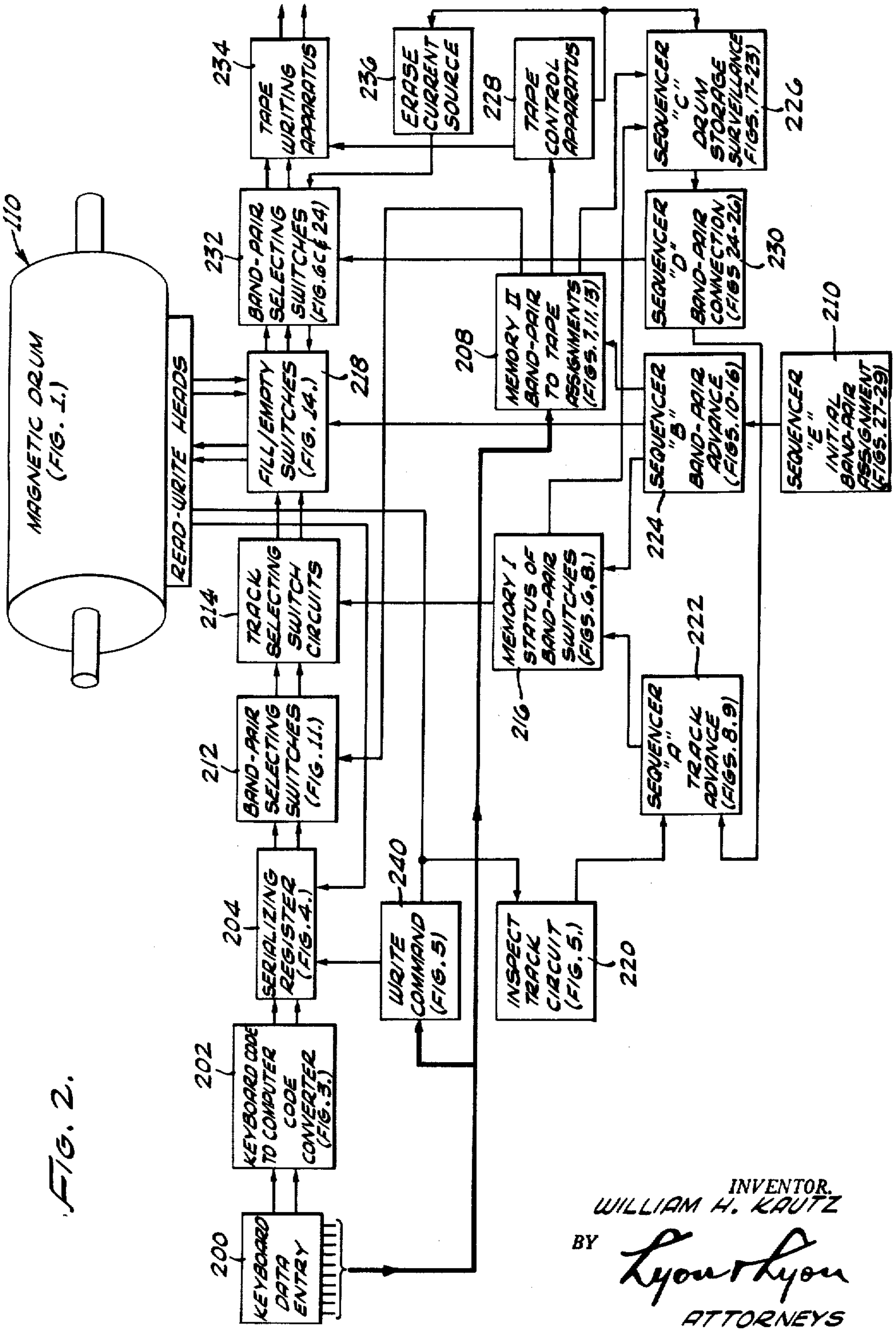
FIGURE 2 is a block diagram of the embodiment of the invention.

Reference is now made to FIGURE 2, wherein there is shown a schematic diagram of an embodiment of the invention. In this diagram, data paths are denoted by a double line, and switching, or control, signal paths are denoted by a single line. The input to the system may be a keyboard machine 200, similar to the type used in machine accounting or bookkeeping practice. These are manufactured, for example, by the National Cash Register Company. The keyboard provides an electrical output in response to the mechanical input. Assuming, for example, that the input data consists of a depositor's account number and the amount of the financial transaction involved, the keyboard output is applied to a "keyboard-code-to-computer-code converter" 202. The code converter may be any suitable type of code-converter matrix, or relay-contact arrangement. The output of the code converter is applied to a serializing register 204. The serializing register may be the well-known type of flip-flop stepping register out of which data may be stepped serially at the proper time. An arrangement which is suitable is described and shown in an article by Knapton and Stevens in the magazine Electronics, which is published by the McGraw-Hill Book Company, in the December 1949 issue, pages 186–192, vol. 22, entitled Gate Type Shifting Register. However, a preferred arrangement for code conversion and serializing the data prior to entry into the drum is shown and described in the previously mentioned application to Cox et al.

For tape-assignment recognition, as previously described, the output from one column of keys, energizing one out of ten lines, is employed. This column may be one digit position in the account number, for example. The one of ten energized lines represents on which one of the ten tapes the incoming data will eventually be written. The ten leads are connected to a crossbar-switching arrangement 208, designated as "Memory No. II."

The crossbar switches employed in the embodiment of the invention are of a well-known and commercially purchaseable type which have their contacts arranged in rows and columns. The contacts are normally open. To close a desired contact, a row solenoid must first be excited and, while it is excited, a column solenoid must be excited. These solenoids must be the ones assigned to the row and column in which the contacts desired to be closed exist. Continued energization thereafter of a column solenoid holds the contacts closed. The crossbar switches employed have many levels or decks of contacts, so that a large switching capacity is provided. Each level is electrically independent of the others. The details of the crossbar switch employed for Memory II will be explained in the detailed explanation of the invention.

Memory II has had its contacts previously set up with the band-pair-to-tape assignments. The manner of doing this will also be explained later in connection with the description of Sequencer E 210. Accordingly, upon receiving a signal from the tape-assignment-recognition circuit, Memory II operates the proper ones of the band-pair-selection switches 212, so that the data in the register will be routed to the proper band-pair on the drum. It will be recalled that a band-pair consists of eight tracks on the drum. There is an initial assignment of band-pairs to tapes so that data which is eventually to be written on a tape is first stored in the band-pair assigned to that tape.

The incoming data is stored in the tracks of a band-pair in the order of arrival. Thus, it is necessary to select the proper track of a band-pair into which the incoming data is to be written. The actual switching operation is performed by track-selecting switches 214, which receive their instructions from a crossbar-switching arrangement 216, designated as Memory No. I. The track-selecting switches 214 are connected to fill-empty switches 218. This apparatus merely comprises a plurality of double-pole double-throw switches normally in a writing position which can connect the magnetic transducers from a writing position to a read-out position as instructed. An inspect-track circuit 220 serves the function of determining, after each time data has been written into the drum, how much room is left in the track on which the data has been written. If there is sufficient room for the next word of data, then no output signal is provided. If there is insufficient room, then an output signal is applied to track-advance circuits designated as Sequencer A 222.

Memory No. I serves to store the conditions of the various tracks of the band-pairs; that is, whether they are filled, filling, or empty. Thus, Sequencer A, upon receiving an instruction from the inspect-track circuit that a track into which a word of data has been written is filled makes a connection through Memory No. I to the next track of the band-pair available for filling. It then instructs Memory No. I, so that when the next item which is to be written in this band-pair is received, the track-selecting switches are already prepared to route that word onto this next track.

If Sequencer A, upon scanning Memory No. I, determines that all tracks of a band-pair are filled, it issues a signal to band-pair-advance circuits 224, designated as Sequencer B. This signal, in effect, instructs Sequencer B to assign the next free band-pair for filling. Sequencer B scans Memory No. I to find this next free band-pair and instructs Memory No. I to assign the first empty track of this band-pair for filling. Memory No. I is also instructed by Sequencer B to record an indication that a band-pair has been filled.

Sequencer B next issues an instruction to Memory No. II to record the assignment of the newly selected band-pair to the same tape as was the band-pair which was just filled. Another signal is issued by Sequencer B to the fill-empty switches 218 which causes those switches connected to the magnetic transducer heads over the just-filled band-pair tracks to be operated to the empty, or read-out, position.

The actual initiation of the operation of equipment subsequent to the fill-empty switches to effectuate transfer of data from drum to tape is the function of drum-storage-surveillance circuits 226. These circuits are designated as Sequencer C. Sequencer C, in response to a signal from tape-control apparatus 228 indicative of the fact that the tapes are available for data storage, scans Memory No. I and Memory No. II to determine which band-pairs should be next emptied onto tape. Upon finding one or two band-pairs which are in a condition suitable for emptying, a suitable signal is emitted to a Sequencer D 230. Sequencer D, in response thereto, operates the proper ones of the band-pair-selecting switches 232 which are on the reading side of the drum circuitry. A second signal is emitted by Sequencer D to Sequencer A if the band-pair to be emptied is one which is at that time connected to be filed. The function of this signal is to initiate the operation of Sequencer A to select another free band-pair upon which can be stored incoming data which is intended for the same tape as is the data in the band-pair which has been selected for emptying. Sequencer C, through Memory No. II, also informs the tape-control apparatus 228 which of the tapes should be started running to receive data from the drum.

The tape-writing apparatus 234 may include, if desired, additional sorting equipment to sort the data in a desired sequence before it is written onto the tape. A preferred sorting arrangement is shown, described, and claimed in Patent No. 2,735,082, for Data Sorting System, by Jacob Goldberg et al., issued February 14, 1956.

Provision must be made to determine when all the words in a track, as well as in a band-pair on a drum, have been written onto the tape so that an instruction may be issued to Sequencer C, calling for further data. This may be accomplished in any number of known different ways, such as counting the number of words in a band-pair selected to be transferred to tape, using the begin-band pulse to initiate the count, and then counting the words as they are written on the tape. A coincidence in counts is sensed and the signal derived as a result may be used to initiate the request for further data. Alternatively, provision may be made to place a special code mark on the drum indicative of each word read, so that a sensing of these special code marks for each word between sensing of the begin-band pulse as the drum rotates is used to initiate a request for the read-out of more data from the drum. More simply, after read-out the data may be erased and a signal may be generated indicative of the fact that no further data exists between begin-band pulses. Regardless of the arrangement for detecting the completion of the transfer of data from drum to tape, and there are several which are well known in the information-handling field, as far as the present invention is concerned, a signal indicative of the fact that such transfer has been completed is required. Besides this signal initiating the operation of Sequencer C, it also enables an erase current source 236 to be connected to the band-pair selecting switches 232. This erase current source is a source of direct current which finds its way through the still connected relay contacts to the heads over the tracks which have just been emptied onto tape. These tracks are thus erased before they are released for reassignment by Sequencer B.

As previously indicated, the function of Sequencer E, 210, is to enable an original assignment of band-pairs to tapes at the beginning of operations. As will be subsequently described in more detail, this is effectuated by setting switches which cause Sequencer B to operate and set up Memory No. II correspondingly. At the conclusion of operations, the emptied part of the drum may be reassigned for write-in of new data.

In the broad description of the invention, no mention has yet been made of apparatus for controlling the sequence, or timing, of the data handling. This is the apparatus required to time the serializing of the data which has been entered into the keyboard and then when to empty its contents onto the drum. Also, the apparatus which tells the tape-writing apparatus when to commence to write the data being received from the drum. This apparatus is known in the art, is not a part of the present invention, and, therefore, no detailed description of this apparatus will be provided here. The apparatus which sequences the operation of the present invention comprises Sequencers A through E.

The register 204 is of the type known as a stepping register, and input to the register, as well as output from the register, requires the application thereto of stepping pulses. The stepping pulses may be derived from clock pulses which are provided by the drum or by having an auxiliary track with the pulses recorded thereon. An arrangement for properly timing the entry of data into a stepping register and for the transfer of data from the register onto a drum is represented by the rectangle 240, designated as write-command apparatus. It receives a control signal from the keyboard which is a signal to emit pulses to enter data from the keyboard into the register. It receives another control signal from the last-item-marker track on the drum to emit pulses to shift out data to the drum at the proper time. In effect, the write-command apparatus is a counter which is started by a control signal, counts a predetermined number, and then shuts itself off until the next control signal is received.

Figure 3:
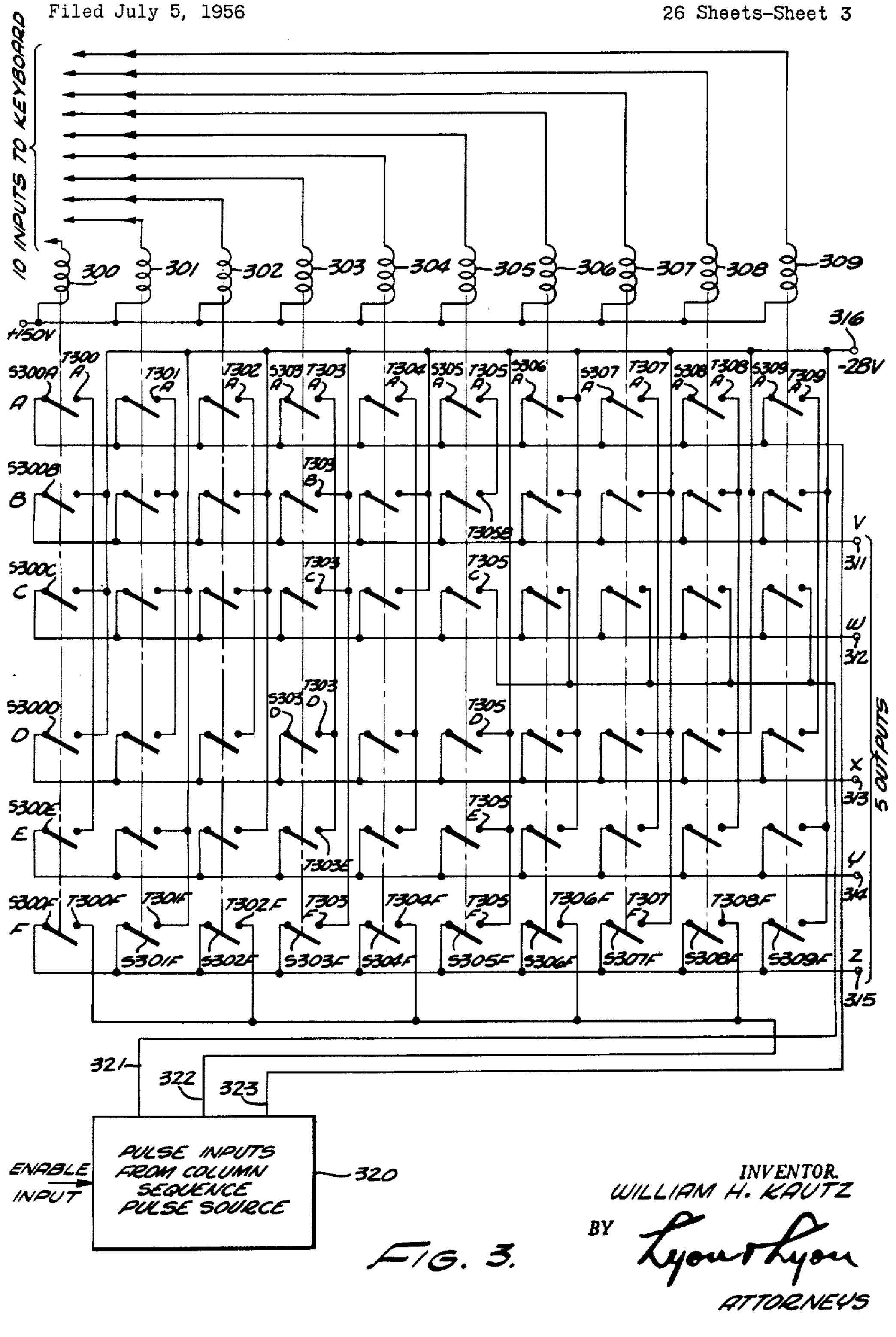
FIGURE 3 is a block diagram of an arrangement for converting from keyboard to computer code.
Figure 4:
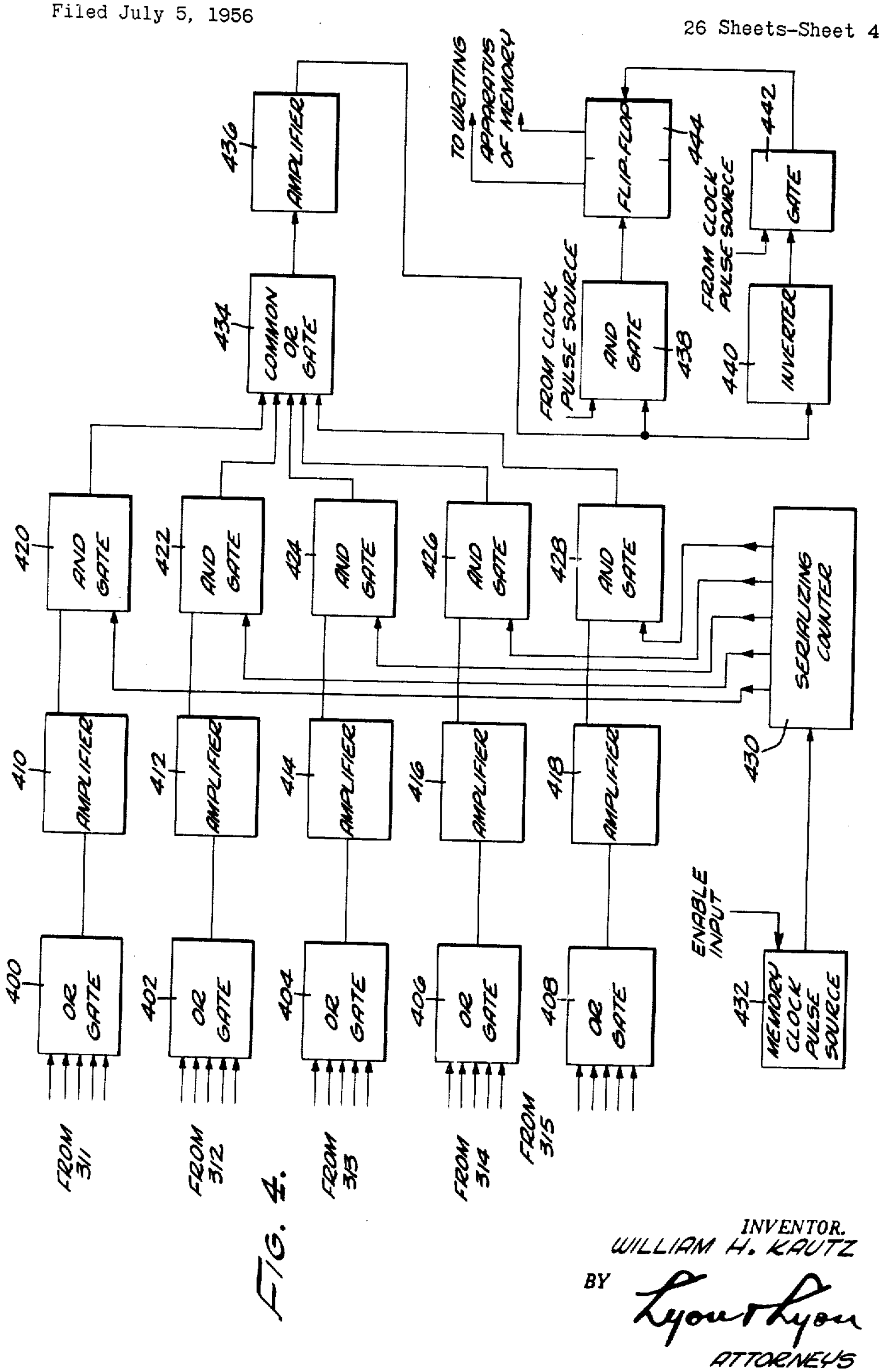
FIGURE 4 is a block diagram of an arrangement for serializing the data received from the code converter of FIGURE 3.

By way of illustration of apparatus representative of a keyboard-to-computer code converter and serializing register, FIGURES 3 and 4 are shown. These correspond to FIGURES 3 and 4 of the previously noted application for patent by Bonnar Cox et al.

As is well known, the keyboard contains a number of columns of ten keys in each column. One of the type of apparatus shown in FIGURE 3 is required for each column of keys. Conversion is made by the apparatus shown in FIGURE 3 from the decimal code which exists in the keyboard to an excess-three code. The output of the apparatus shown in FIGURE 3 consists of five digits, respectively labeled V, W, X, Y, and Z. The V digit is a parity-checking digit. By "parity" is meant the arrangement whereby the number of ones in a binary number are added, and, if this number is odd, a one is placed in the parity position to make the total number even. Subsequent apparatus may be employed to determine whether a number is correct by adding the number of ones in the number. The most-significant digit of the excess-three output is in the W-digit position, and the least-significant digit is in the Z-digit position. It should be appreciated that if, for example, the keyboard has three decimal-digit positions wherein it is capable of representing a number in the hundreds, each decimal-digit position will be represented by a binary number. Thus, the total number of binary-number digits required to represent a decimal number in the hundreds will be in accordance with the code adopted herein, i.e., 15 binary digit numbers. The subsequent sequencer performs the function of preserving the significance of the binary number, as well as the significance of the series of binary numbers which represent the original decimal number.

Each column of the keyboard has as its output ten leads, only one of which, however, will be energized by the depression of a key in that column. These ten leads are respectively connected with a separate relay coil, respectively designated as 300, 301 through 309, to show correspondence with leads from the column of a keyboard. Each relay coil drives six normally open contacts A, B, C, D, E, F. These contacts are interconnected in a manner so that when any one of the coils 300 through

309 is excited responsive to a key on the keyboard being depressed the contacts closed as a result of such excitation enable the application of potentials to the terminals 311, 312, 313, 314, and 315, which have also been designated by the letters V, W, X, Y, and Z. Potentials at these terminals are representative of the excess-three code and parity digit corresponding to the decimal digit indicated by the depressed key. A zero on any one of the output terminals is signified by the existence of a negative voltage which is applied to the converter at the terminal 316.

In order to insure the proper significant position of the coded number for a column as described previously, as well as the significant position of the ones in a binary number, after one of the relay coils 300 through 309 has been closed, the converter networks are read in a serial sequence corresponding to a digit significance. Actually, the reading of each converter network consists of applying a pulse simultaneously to three output lines 321, 322, 323 from a column-sequence pulse source 320. This serves to provide a binary number output at the V, W, X, Y, and Z terminals.

The nomenclature adopted in describing the code converter network is as follows. Each relay coil 300–309 controls six normally open contacts A, B, C, D, E, F. These are more specifically designated by the coil number and contact letter. Further, each contact consists of a swinger and a terminal. Thus, exciting coil 303 causes swingers S303A through S303F to respectively make contact with terminals T303A through T303F.

The connections to the relay contacts from the negative-voltage terminal 316 are made as follows: From terminal 316 to terminals T300B, T300C, and T300D. From terminal 316 to terminals T301C, T301E, and T301F. From terminal 316 to terminals T302B, T302C, and T302E. From terminal 316 to terminals T303B, T303C, and T303F. From terminal 316 to terminals T304B and T304C. From terminal 316 to terminals T305D, T305E, and T305F. From terminal 316 to terminals T306B, T306D, and T306E. From terminal 316 to terminals T307B, T307D, and T307F. From terminal 316 to terminal T308D. From terminal 316 to terminals T309B, T309E, and T309F.

Output from the column-sequence pulse source 320 occurs on three output lines. The first 321 of these three output lines connects to terminals T305C, T306C, T307C, T308C, T309C. The second output line 322 connects to terminals T300F, T302F, T304F, T306F, and T308F. The third output line 323 connects to the swingers S300A through S309A. Terminal T300A connects to terminal T300E. Terminals T301A, T301B, and T301D are connected together. Terminals T302A and T302D are connected together. Terminals T303A, T303D, and T303E are connected together. Terminals T304A, T304B, T304C, T304D, and T304E are connected together. Terminals T305A and T305B are connected together. Terminals T306B, T306D, and T306E are connected together. Terminals T307A and T307E are connected together. Terminals T308A, T308B, and T308E are connected together. Terminals T309A and T309D are connected together. Output terminal 311 connects to the swingers S300B through S309B. Output terminal 312 connects to swingers S300C through S309C. Output terminal 313 connects to swingers S300D through S309D. Output terminal 314 connects to swingers S300E through S309E. Output terminal 315 connects to swingers S300F through S309F.

To illustrate the operation of the code-converter network, assume that the five-key in a column is depressed. The number five in the excess-three code, plus the parity digit, is represented by 11000. By depressing the number five key in the column, the relay coil 305 is energized, closing all the relay contacts controlled thereby.

Output from the column-sequence pulse source may be traced over line 321 to terminal T305C and through swinger S305C to output terminal 312, thus representing a one at the W position. Output over line 322 is not applied to any of the contacts of the 305 relay. Output over line 323 from the column-sequence source is applied to swinger S305A, through terminal T305A, to terminal T305B, thence through swinger S305B to output terminal 311. Thus, there is a one at the V position. Swinger S305D connects to the negative-voltage-source terminal 316 when it closes, thereby applying a zero signal to output terminal 313. Swingers S305E and S305F are similarly connected to the negative-voltage source, also thereby applying zero-signal outputs to terminals 314 and 315. Thus, the number 11000 is generated by the code converter in response to an excitation of a lead by the five-key on the keyboard. The manner of operation of the converter network in response to depression of others of the keys should be apparent now.

From the above, it may be seen how, by depressing a key on the keyboard, a relay in the code converter associated therewith is actuated to close contacts. These contacts are interconnected in a manner whereby at the proper time in a columnar-sequencing arrangement signals appear at output terminals, which signals are a representation in an excess-three binary code of the decimal-digit signal received from the keyboard. As previously stated, there is one of the code converters shown in FIGURE 3 required for each separate column. The outputs of all the code converters are applied to a serializing-logic network, which is shown schematically in FIGURE 4.

Five OR gates 400, 402, 404, 406, and 408 are employed as the input to the serializing-logic arrangement. Input to OR gate 400 consists of the output from the terminals 311, or the binary digits in the V position, of each one of the code converters employed. OR gate 402 has the output from all of the 312 terminals, or the W-digits, applied thereto. The input to OR gate 404 is the output from all the 313 terminals, or the X-digit positions. The input to OR gate 406 is the output from all of the 314 terminals, or the Y-digit positions. The input to OR gate 408 is the output from all of the 315 terminals, or the Z-digit positions.

From the previous description, it will be appreciated that the signals from the various code converters are sequenced so that at no time are there more than one of the V, W, X, Y, or Z-digit present as input to the respective OR gates. The OR gate outputs are amplified by amplifiers 410 through 418. The amplifier outputs are applied to respective AND gates 420 through 428. A second input to the respective AND gates is derived from a serializing counter 430. The AND gates do not provide an output unless both of their inputs are excited simultaneously. Accordingly, the serializing counter enables each one of the AND gates to provide an output in sequence if their other input leads are excited from the OR gates.

As the counter is sequenced, output is received from each one of the AND gates 420 to 428, to which a pulse representative of a one is applied, which output is applied to a common OR gate 434. Output from this OR gate is amplified by an amplifier 436 and then applied to a flip-flop 444, through an AND gate 438, and through an inverter 440 and a gate 442. The AND gate 438 receives as its second input signals from the clock-pulse source. When a "one" pulse is received from the amplifier 436, the flip-flop 444 is driven to its set condition through AND gate 438. Inverter 440 inhibits, or holds closed, gate 442. When no "one" pulse is received, gate 442 can reset flip-flop 444 when a clock pulse occurs and since it is no longer inhibited. The flip-flop 442 will be set or reset, in accordance with the ones and zeros of a number. The output from the flip-flop is then applied to the writing apparatus, which may be through amplifiers to the proper writing head of magnetic tape or drum.

The AND gates and OR gates are well-known circuits, being otherwise respectively known as coincidence gates and buffer gates. Suitable circuitry is described, for example, in chapter 4 of High-Speed Computing Devices, a book by Engineering Research Associates, which was published by the McGraw-Hill Book Company in 1950.

Thus far there has been described apparatus for converting the input data into a serialized form so that it may then be properly entered into its assigned position on the drum. The timing for the entry of this data onto the drum at the proper position along the track may be performed with the information supplied from the last-item-marker track.

It will be recalled that this track is one which has a pulse laid down therein at a position indicative of the position where the last item had been written. This pulse may be employed through suitable circuitry to enable the counter 320 in FIGURE 3, which is designated as pulse inputs from column-sequence-pulse source, and the memory-clock-pulse source 432 in FIGURE 4, to provide the pulses required to drive the output flip-flop 444 in FIGURE 4 in accordance with the data. This enabling pulse is provided by apparatus which is represented by the rectangle 240, labeled "write command." This write-command apparatus has as its input the ten lines from the keyboard-data entry apparatus which are assigned to indicate to which of the ten tapes the data will eventually be written on. As its second input, the write-command apparatus has as its input the output of the read-head which is positioned over the last-item-marker track.

Reference is now made to FIGURE 5, where there is shown a block diagram of an arrangement for deriving a properly timed enabling pulse so that data may be written at the proper time onto the drum, and also an arrangement whereby the old last-item-marker pulse is erased and a new one is laid down to show the new position of the last item which has been written. It should be recalled at this time that the last-item-marker track is one which has two heads, one a reading head and the other a writing head. The heads are spaced one sector distance plus five digit positions apart. The reading head is in advance of the writing head and accordingly last-item-marker pulses pass under the reading head first and then under the writing head. It should also be recalled that ten positions have been allotted in each sector along the last-item-marker track. Each sector is aligned with the sectors in the data tracks. Each sector is divided into ten recording areas. A pulse, for example, in recording area 5 in a sector represents the fact that the last word of data appears in the corresponding sector of the track associated with tape 5 on the drum. Thus, the last-item-marker pulse indicates where the next word of data or item should be written on the drum. As may be seen in FIGURE 5, there are provided drum-section selectors comprising ten relay coils 501 through 510, any one of which may be selected as the result of the actuation of the key to which it is connected in the input keyboard. As previously stated, such actuation occurs as a result of entering into the input keyboard an account number, one digit of which is employed for identifying the relay-drum section and final tape on which such account number and the accompanying data will finally be stored. There is a pair of contacts on each relay, respectively designated as 501 through 510, which are included in the last-item-marker timing circuitry designated by the rectangle 20. Also included in the timing circuitry are the counter 512 and the AND gate 514. The counter 512 comprises any well-known type of ring counter, or cyclic counter, having a capacity at least equal to the number of last-item-marker pulses. Clock pulses are derived from the drum in a manner well known in the art. By way of illustration, one arrangement obtaining clock pulses from the drum is shown in a patent to Brustman et al., No. 2,702,380. These pulses occur substantially simultaneously with the desired magnetic-pulse location in a magnetic drum. Thus, a selection is made of eleven clock pulses, the last ten of which occur at the ten locations desired for the ten last-item-marker pulses in each sector. The first, or zero, pulse occurs at the beginning of a sector. The second of these clock pulses and the first location selected for a last-item-marker pulse should be the same location as that in which the first magnetic pulse representative of the first binary digit of the data being entered in the data track will be stored in the sector. Expressed more simply, the first last-item-marker pulse is positioned in the same location as the first digit will be positioned in the corresponding sectors axially displaced along the drum. The first clock pulse applied to the counter energizes the zero-count stage of the counter to provide an output. A second clock pulse applied to the counter turns off the zero-count stage and turns on the one-count stage. This progression occurs in response to the sequence of the eleven selected clock pulses within the sector. The last stage of the counter is turned off and the zero-stage of the clock counter is turned on in response to the clock pulse occurring at the beginning of the next sector on the drum.

From the above discussion, it should become apparent that when any one of the contacts 501 to 510 are closed a pulse will be applied to these contacts from the stage of the counter to which they are connected when that counter stage is energized. Such energization occurs in response to a clock pulse occurring at the time the last-item-marker pulse passes under the last-item-marker read-head 122. Thus, if contacts 503 were closed, then a pulse would be applied from the third stage of the counter 512 through these contacts to the AND gate 514. At this time, the third marker pulse would be passing under the last-item-marker read-head 122. This would then be amplified by the amplifier 513 and applied to the AND gate 514. Upon the presence of the coincidence of inputs to AND gate 514, an output is applied from this AND gate to two succeeding AND gates, respectively designated as 516 and 518.

From the above, it is apparent that the output from AND gate 514 occurs only when the last-item-marker pulse selected by means of the relays in the drum-section selector passes under the last-item-marker read-head 122. This read-head will thus have only one output per revolution of the drum corresponding to the fact that the last-item-marker pulse occurs only once in the last-item-marker track of the drum. The structure to be described now is that of the circuit for selecting the correct data writing time. This includes a flip-flop 519, which is turned over or driven from one stable condition to a succeeding stable condition upon an output being received from AND gate 516. The output of this flip-flop is applied to a resetting AND gate 520, the output from which is applied back to the flip-flop 519 to reset it, as shown, and also is applied to a succeeding AND gate 522, the output from which is employed to set or drive a flip-flop 524. Upon the occurrence of the next sector location into which the data which has been converted by the keyboard-to-computer code converter 12 is to be written, AND gate 522 applies an output to flip-flop 524, and AND gate 520 applies an output to flip-flop 518 to reset it.

The second required input to the two AND gates 520, 522 is derived from the zero-count stage of the counter 512, which provides an output at the beginning of the location in each sector wherein there should be written the first bit of data. Thus, flip-flop 524, when turned over, applies its output to the writing amplifier 526, which will simultaneously have applied thereto data from the data serializer 204. The writing amplifier is thus gated open to write data onto the drum through the head-selecting circuits 212, 214. Thus, the write-command apparatus 240 is described and shown.

AND gate 525 has as one of its inputs the output of flip-flop 524 when in its set condition and as its other required input output from the zero-count stage of the counter 512. AND gate 525 is then able to produce an output to reset flip-flop 524 at the beginning of the next sector of the drum. This occurs because AND gate 525 does not receive one of its required inputs from the flip-flop 524 until the beginning of the preceding sector on the drum. When flip-flop 524 is reset in response to the output of AND gate 525, it removes the enabling input from the write amplifier 526 and thus no further data can be entered onto the drum until a subsequent writing cycle occurs.

The output of flip-flop 524 when in its set state is also applied to a flip-flop 530. This flip-flop and its subsequent circuitry are included in the rectangle designated as the inspect-track circuit 220 on FIGURE 2. Flip-flop 530 is set when it receives the output from flip-flop 524 and is reset upon the occurrence of the next zero-count of the counter 512. The output of flip-flop 530 in its set condition is applied to an AND gate 532. As a second required input to AND gate 532 is the begin-band pulse. The output of AND gate 532 is applied to another flip-flop 528. From the above, it should be noted that flip-flop 530 provides an output for a time lasting until the beginning of the next sector on the drum following the one which was written into. If a begin-band pulse occurs prior to the occurrence of the following sector, an output is obtained from AND gate 532 and this serves to turn over flip-flop 528. The output of flip-flop 528 is employed for the purposes of requesting Sequencer A to provide a new track assignment for the same tape assigned data. If no begin-band pulse occurs prior to the occurrence of the next sector, then there is no output from the AND gate and the apparatus can continue to function as has been previously described.

Flip-flop 534 is employed for the purpose of insuring that the operation of flip-flops 518 and 524 does not recur for every cycle of the drum. At the time the data is entered in the keyboard, the operator pushes what is commonly known as a data-entry key (not shown), which is to signal the following information-handling machine that the data is all on the keyboard and should be entered into the system. This data-entry key initiates a signal which turns over flip-flop 518. The output of this flip-flop is applied as a second required input to the following circuitry to operate. When flip-flop 524 is driven by the output of AND gate 522, its output is also applied to reset flip-flop 534. This blocks AND gate 516 and no further signals are emitted therefrom until the next time that a data-entry signal from the keyboard is received to set flip-flop 534. Of course, the next data-entry signal from the keyboard is not received until the new data is entered into the keyboard. The arrangement described does insure that the dtta-writing-time-selecting circuits do not operate cyclically with the drum.

After the data has been written onto the drum, it is necessary to move the last-item marker to signify the end of the data which has just been written to enable tacking any new incoming data on the end of the data which has just been written. AND gate 518, upon receiving all its required inputs, provides an output to turn over flip-flop 536 at a time when the last-item-marker pulse occurs the first time after writing data. To insure that the last-item-marker is not erased until after the new data has been written on the drum the output of flip-flop 524, when in its set state, is applied to a flip-flop 538 to put it in its set state. The output of flip-flop 538, when in its set state, is applied to AND gate 518. A second required input is provided from flip-flop 540. A third required input, which then causes AND gate 510 to drive flip-flop 536, is obtained from AND gate 514 when the last-item-marker pulse is read after the data has been written. The output of flip-flop 536 is applied to an OR gate 538, to an AND gtte 540, a second AND gate 542, and also resets flip-flop 538. The output of flip-flop 536 is also applied through the OR gate 538 to an AND gate 544.

At this time, it should be recalled that there are two heads over the last-item-marker track. The first one of these heads 122 in the direction of rotation of the drum is the last-item-marker reading head and, at a distance of one-sector space plus five last-item-marker spaces, later on along the drum is found the second or last-item-marker writing head 120. A second required input to AND gate 544 is derived from the counter 5 count intervals, or clock pulses, away from the time of the reading of the last-item-marker pulse. This is insured by another set of contacts 551 through 560, which are energized simultaneously with the contacts 501 through 510. Each one of these second set of contacts is connected to receive the output from the counter state five counts later than the one with which the associated first set of contacts receives an output. Thus, the pair of contacts 551 applies an output from counter state 5 to AND gate 544. The pair of contacts 552 would apply the output of counter stage 6 to AND gate 544, etc. The pair of contacts 560 would apply the output of counter stage 4 to AND gate 544. Thus, AND gate 544 is enabled to provide an output to the writing amplifier 546 five count intervals after the last-item-marker pulse has been read. At this time, reading head 120 is over the old last-item-marker pulse. Write amplifier 546 is designed so that when an input is received on one of its input leads it will write a "zero" and when an input is received on both of its input leads it writes "one." In the present instance, AND gate 544 applies an input to only one of its input leads, and, therefore, the write amplifier causes the writing head 120 to write a zero over the position of the old last-item-marker. This effectively erases the old last-item-marker. The output of AND gate 544 is simultaneously applied to AND gates 540 and 542. The AND gate 540 has now the two inputs required to provide an output to reset flip-flop 536. AND gate 542 at this time also has the three required inputs for it to provide an output to set a succeeding flip-flop 548. Flip-flop 548 applies its output to OR gate 538 again, and to the second input of write-amplifier 546. OR gate 538 also applies its input to AND gate 544.

When the counter 512 has cycled around back to the five count again, indicative of the fact that one complete sector space has passed, AND gate 544 is again enabled. Its output is applied to the write amplifier 546. This time, in conjunction with the output from flip-flop 548, write amplifier 546 is enabled to write a one over the last-item-marker space in the new sector, which corresponds to the last-item-marker space in the sector in which the last-item-marker was just erased. The output from AND gate 544 is also employed this time to reset flip-flop 548 through AND gate 549, which has as its second required input the output from the set side of flip-flop 548. Thus, after writing the one to indicate the new last-item-marker position, write amplifier 546 is disenabled and the circuitry contained in rectangle 28 is restored to its standby condition. A flip-flop 541 is employed to prevent the cyclic operation of this last-item-marker advancing circuitry. This flip-flop 540 is set when the data-entry key at the keyboard is depressed to signify that data should be entered and is reset when flip-flop 548 is set. Thus, AND gate 518 is held open for the time required to complete one cycle of operation. After that, the AND gate is maintained closed until the data-entry key on the keyboard is depressed once again.

Thus far there has been described how the input information to the present invention is derived. This input information consists of the data being entered and the identification of the tape on which it will eventually be recorded. Also, there has been provided a general description of how the embodiment of the invention handles the input information. Before proceeding to a detailed description of the invention, it is believed that this can be simplified to a degree by an explanation of how a crossbar-switching arrangement may be employed for indicating the status of the band-pairs on the drum as well as the band-pair-to-tape assignments.

FIGURES 6 and 7 are schematic representations of the decks of each of the crossbar switches employed in Memory I and Memory II, respectively. It will be recalled that Memory I stores the condition of filling of each of the band-pairs and Memory II stores the band-pair-to-tape assignments. Assume for the purposes of illustration that there are eighteen band-pairs, eight drum tracks to each band-pair, and ten magnetic tapes for permanent storage. The rows and columns of rectangles in FIGURES 6 and 7 represent the pairs of contacts of one crossbar switch deck or layer. The fact that a pair of contacts is closed is represented by an X in that rectangle.

Thus Memory I has 18 columns, corresponding to 18 band-pairs, and 9 rows, corresponding to 8 tracks for each band-pair. The ninth row represents the fact that a band-pair has been filled. Thus, the X for closed contacts in column 3, row 5, represents the fact that track 5 of band-pair 3 is now connected for filling, tracks 1 through 4 having already been filled. The X for closed contacts in column 11, row 9 represents the fact band-pair 11 is completely filled and is unavailable for emptying of data.

FIGURES 6A, 6B, and 6C are schematic diagrams of the data paths to and from the drum. This involves the band-pair selecting relays 212, track-selecting switch circuits 214 (in effect, one deck of Memory I), the fill-empty switches 218, and band-pair selecting switches 232. As shown in FIGURE 6A, the output of the serializing register is connected to a pair of contacts on each one of the band-pair selecting relays 1102–1136. The details of the operation of these relays is shown and described for FIGURE 11 subsequently. One of these is closed to select the band-pair into which the data is to be written. Each of the contacts shown on the band-pair select relays is connected to a separate column bus. The level, or deck, shown is deck 5 of Memory I. Each column bus is connected to one contact of all the pairs of contacts in its column. The other of the pairs of contacts are brought out by separate leads. Thus, eight separate leads are brought out. Each lead corresponds to a separate head on the drum. Eight leads from one column go to one band-pair on the drum. The only contacts closed in each column, as may be seen in FIGURE 6, are the ones representative of the track that is filling. Thus, the incoming data is steered into one of eighteen columns and into one of the eight outgoing leads from that column.

FIGURE 6B represents schematically what happens at the drum. There are at least 18 fill-empty relays 1401–1418, which can be connected as shown for single-ended operation. The details of these relays and their operation are described in connection with FIGURE 14. Each relay has eight of its single-pole, double-throw contacts connected so that each common movable arm or swinger is connected to a separate magnetic head $601_1$–$601_8$ to $618_1$–$618_8$. The magnetic heads $601_1$–$601_8$ constitute the heads over one band-pair; the magnetic heads $602_1$–$602_8$ constitute the heads over a second band-pair; and the heads $618_1$–$618_8$ constitute the heads over the eighteenth band-pair.

For each band-pair, the eight leads from each column shown in FIGURE 6A are connected to the respective 8 contacts of each associated fill-empty relay. Thus, the eight leads from column 1 are connected to the respective one of the eight contacts of relay 1401. The positions of the fill-empty relays shown in FIGURE 6B are the ones assumed when de-energized—this is the "fill" position. In this position, the eight leads are connected to the eight magnetic heads to write or fill the drum with data. However, only one head in a band-pair is connected at a time, by the track-selecting switch or deck 5 of Memory I, to receive data from the serializing register.

When any one of the fill-empty relays is energized, the movable arms connect to their second contact position, thus disconnecting the magnetic heads from the data input and enabling them to read the data written on the drum 110. One complete band-pair at a time is switched from write to read. Thus, output is presented from eight tracks simultaneously by an operated fill-empty relay.

The selection of which of the filled band-pairs is to be emptied first is performed by Sequencer D, which controls the band-pair-selecting-switch apparatus 232. A schematic diagram of this apparatus is shown in FIGURE 6C. It comprises 4 decks, *c* through *f*, of four stepping relays 2410*c–f*, 2412*c–f*, 2414*c–f*, and 2416*c–f*. The details of the operation of these are shown in FIGURE 24. The eight leads from the fill-empty switch 1401 connected to the first band-pair are connected to the number 1 terminals of the stepping switches, so that, for example, lead 1 is connected to terminal 1 of switches 2412*c* and 2416*c*, lead 2 is connected to terminal 1 of switches 2412*d* and 2416*d*, lead 5 is connected to terminal 1 of switches 2410*c* and 2414*c*, and lead 8 is connected to terminal 1 of switches 2410*f* and 2414*f*. The eight leads from each band-pair are thus connected to the correspondingly numbered terminals on the stepping switches. The positioning of the selector arms of these switches is the function of Sequencer D, but the output from these selector arms is the data being read from the selected band-pair on the drum. This output is applied to subsequent tape-writing apparatus.

In FIGURE 7, as in FIGURE 6, the X representing closed contacts in column 2, row 6 is indicative of the fact that band-pair 2 will empty its contents onto tape 6. The X for closed contacts in column 16, row 10, represents the fact that band-pair 16 is assigned to tape 10.

Connection is made from the tape-assignment-recognition circuit, as represented in FIGURE 2, to the corresponding ten rows of contacts in FIGURE 7. Thus, when one of the ten output leads is energized, the voltage is applied via a common lead to the whole corresponding row of contacts, but only the pairs of contacts which are closed in the corresponding row enable outputs to be derived at column busses. These column busses, or common leads, are each eventually connected to operate one of the band-pair-selecting relays seen in FIGURE 6A which is in the band-pair-selecting-switch apparatus 212. This band-pair-selecting relay is then closed. As an added decoding feature, the connections between the column contacts of Memory No. II and the band-pair-selecting switches is made through an extra position on the fill-empty switches 218, which are assigned to a band-pair. More specifically, each of the column leads on one deck of Memory II, which is the band-pair-to-tape assignment crossbar, is connected through a pair of contacts on an associated fill-empty relay to the corresponding band-pair relay. If the fill-empty relay is in the fill condition, the contact is closed, and the band-pair relay may be operated. If the fill-empty relay is in the empty condition (empty drum onto tape) the contact is open and the band-pair relay is not operated.

It will be recalled that the fill-empty relays serve the function of switching the magnetic transducers on the drum for each band-pair to the write amplifiers for write-in or to the read amplifiers for read-out. Thus, a band-pair relay will not be operated for entry of data into the band-pair of the drum if the band-pair is being emptied. Only a band-pair which is available for write-in is selected.

The track-selecting switches 214 are closed when the contacts of Memory I are closed. Actually, as shown in FIGURE 6A, the track-selecting switches 214 is another crossbar deck of Memory I, in which contacts are closed to duplicate those shown by way of example in FIGURE 6. Thus, a data path from serializing register 204 to drum 110 may be traced through the closed contacts of one of a plurality of parallel contacts of a plurality of band-pair relays, through a closed pair of track-selecting-switch contacts in Memory I and through a closed pair of contacts in the fill-empty switches.

*Sequencer A*

In the description and drawings that follow a large number of relay coils and their contacts are referred to. In order to maintain order in the description, the coils are given reference numerals and the relay contacts actuated by these coils are given the same reference number and a letter. All relay contacts are shown in the unoperated position. In the crossbars, the contacts will be designated first by the number of the memory in which they are found, second by the row number, third by the level or deck, and fourth by the column number. Thus, MI3D5 means the contacts are those of Memory I, deck D, or fourth deck at the intersection of row 3, column 5.

Reference is now made to FIGURE 8, which is a circuit diagram showing the interconnection of relays in Sequencer A with a crossbar level for controlling Memory I to advance to the next track of a band-pair in response to an output from the inspect-track circuit 220, indicative of the fact that a track which has been written into is filled.

It will be recalled from the previous description that the one of the band-pair selecting switches 212 which is closed is the one corresponding to the band-pair on the drum in which the information which is coming in is to be written. Memory I is a crossbar-switching arrangement which has a number of levels or decks of contacts. One of these levels may be employed for switching of the magnetic-drum writing heads. A third is used for switching from one track to the next of a band-pair in response to signals from Sequencer A. In FIGURE 8, for simplicity, there is shown only a representative portion of this third level, or deck, employed in conjunction with relay contacts from Sequencer A to perform the operation of advancing to the next track within a selected band-pair. In practice, 19 columns and 9 rows per level are required for the crossbar switch used in Memory I. One of the contacts at a row and column intersection is connected to a common lead for that row, known as a row bus 810—the other of the contacts at the intersection is connected to a common lead for that column, known as a column bus 812. To close the contacts at an intersection, first it is necessary to excite a row solenoid and then, while it is still excited, a column solenoid. The contacts are maintained closed by maintaining the column solenoid excited. Furthermore, for each row solenoid there is provided two sets of contacts known as "off normal" contacts which are closed every time a row solenoid is excited. There are also several sets of "off normal" contacts provided for each column solenoid which are closed each time a column solenoid is excited. The first set of contacts in the crossbar switch level shown in FIGURE 8 is designated as the zero column of contacts. A column bus 818 connects the zero column of contacts to a source of power. The actuating solenoid for this column of contacts will be designated as $816_0$.

Let it be assumed that on the drum, track 3 of band-pair 5 had been previously connected for filling. As a result, contacts MI3B5 at the intersection of row 3, column 5 were connected. Let it further be assumed that the track 3 has just been filled and the track inspection circuit has made a request that the next empty track in that band-pair be assigned. To advance to the next track, row 4, column 5 contacts MI4B5 must be closed and row 3, column 5 contacts MI3B5 must be opened.

In response to a signal from the inspect track circuit, Sequencer A, in the portion of the circuit shown in detail in FIGURE 9, starts a sequence of operation of a plurality of relays. As shown in FIGURE 9, flip-flops 528 operates relay 901, which, in turn, operates relays 902 and 903. The first effect upon Memory I is that when contacts 902A and 903A, on relays 902 and 903, close, they enable the application of power via normally closed contacts 2602J (Relay shown in FIGURE 26) and a closed relay-contact pair 1110C to the column bus 812. At this point, it should be noted that each row bus is connected to the row solenoid for the next higher row. Thus, row bus 810 for row 3 is connected to solenoid $\mathbf{814_4}$ for row 4. The solenoid $\mathbf{814_1}$ is connected elsewhere. From column bus 812 the power is connected through contacts MI3B5 to row bus 810 and then to solenoid $\mathbf{814_4}$ of row 4, thus applying power to that solenoid. Contacts 1110C belong to a band-pair-selecting relay which is in the band-pair-selecting mechanism 212. (Also shown in FIGURE 11.) There is a band-pair-selecting relay associated with each column and band-pair. Relay 1110 was operated, as previously generally described, for the purpose of enabling data coming in from the remote keyboard to pass to the proper band-pair corresponding to the tape on which that data will eventually be recorded (band-pair 5 in the example selected by way of illustration).

Upon the operation of the row 4 solenoid, the associated off-normal contacts 834A are closed. The closure of off-normal contacts 834A applies ground to the zero-column solenoid $\mathbf{816_0}$ over a bus lead 836, which is common to all the row off-normal contacts, through a contact pair 903B. Contact pair 903B was closed previously when relay 903 (FIGURE 9) was operated. Power can thus be applied to operate solenoid $\mathbf{816_0}$, thus closing its off-normal contact 840A. This also causes contacts MI3B0 at column zero, row 3 on the crossbar-switching apparatus to be closed, since the row 4 solenoid was operated previously. Contacts MI3B0 hold the row solenoid for row 4 closed, even though contacts MI3B5 are subsequently opened.

As may be seen in FIGURE 8, all but the zero-column solenoid have one side grounded and the other side connected through one of the associated column "off-normal" contacts of the column solenoids of Memory II crossbar to a source of operating potential. Another set of contacts 1110D on each associated band-pair-selecting relay are each connected from the side of the column solenoid closest to the potential supply through a common bus 842 and contacts 904A and 840A (off-normal contact for column zero) to ground. The next operation that occurs is a momentary opening and closing again of column solenoid $\mathbf{816_5}$, whereby a transfer of contact closure for contacts MI3B5 to contacts MI4B5 is made to occur. This is performed by providing a momentary shorting path for column solenoid $\mathbf{816_5}$ through contacts 1110D (on band-pair-selecting relay 1110), via bus 842, zero-column off-normal contacts 840A, relay contacts 904A to ground. Relay 904 is operated when contacts 902A and 903A are closed. Column solenoid $\mathbf{816_5}$ is thus disenabled, thus opening all the associated contacts in the column as well as its off-normal contacts.

Referring now to FIGURE 9, it may be seen that relay 902 at the outset will have a first energization path which includes normally open contacts 901A and normally closed contacts 903C. When relay 901 is operated, its contacts close, permitting relay 902 to be operated. With the closure of relay 902, relay 903 can be energized via contacts 902C. This opens the normally closed contacts 903C, but relay 902 is held closed by a latch path through contacts 902D, 844B, 1110B, and 1140H after relay 903 is operated. This, in turn, also closes relay 904, and closes row solenoid $\mathbf{814_4}$ and column solenoid $\mathbf{816_0}$ in succession, as previously described. This establishes a short on solenoid $\mathbf{816_5}$, whereby it causes the opening of closed contacts MI3B5. Row solenoid $\mathbf{814_4}$ is held operated over contacts MI3B0, even though contacts MI3B5 are opened. Relay 902 is disenabled at this time by the opening of contact 844B on column solenoid $\mathbf{816_5}$, so that no excitation will be applied through its contacts 902A to excite row solenoid $\mathbf{814_5}$ through contacts MI4B5 when closed. The opening of relay 902 causes relay 904 to open by contact 902E, which in turn removes the short from column solenoid $\mathbf{816_5}$ by the opening of contact 904A. The reclosure of solenoid $\mathbf{816_5}$ allows contact MI4B5 to close.

The next function which must be accomplished is the de-energization of the zero-column solenoid $\mathbf{816_0}$. This is accomplished by means of a shorting path for the solenoid which may be traced through contact 902B, which is a normally closed contact on the relay 902, through a bus lead 845 through contacts 844A, which are off-normal column contacts on solenoid $\mathbf{816_5}$, through a pair of contacts 1110E on the band-pair-selecting relay, and then through a second bus lead 846 to the other side of solenoid $\mathbf{816_0}$. When relay 902 was operated at the outset of the operation of Sequencer A, normally closed relay contact 902B was opened, thus opening the shorting path. Subsequently, relay 902 opened, with the opening of hold coil $\mathbf{816_5}$. This closes the shorting path again, whereby column solenoid $\mathbf{816_0}$ is disenabled as just described. This opens up the contacts MI3B0. This, in turn, breaks the current path which previously was energizing row solenoid $\mathbf{814_4}$, whereby it is de-energized.

Following this operation, relay 903 (FIGURE 9) which has been holding contacts 903A closed, is de-energized. This occurs because an alternate latch path for relay 903 (to one through contacts 902C) was created by a second set of off-normal contacts for the row solenoids being connected in parallel and to ground. When row solenoid $\mathbf{814_5}$ was energized, its associated off-normal contact 834B was closed, holding relay 903 operated. With its opening by reason of the de-energization of the row solenoid, relay 903 is de-energized. It should be noted that flip-flop 528 was reset when relay 903 was operated by the closing of contacts 903D. This also released relay 901.

Thus Memory I has been operated by Sequencer A in response to a track-filled indication from the inspect-track apparatus to advance to the next track. Using another crossbar level which is operated in parallel with the level shown in FIGURE 8, the contact pairs of this level are placed in the paths between the band-pair-selecting switches and the fill-empty switches, and thus serve as the track-selecting switches.

When the last track of a band-pair is filled, which would be track eight, the operation of the arrangement shown in FIGURES 8 and 9 is the same as has been described. A ninth row of contacts is provided on the memory level of the crossbar-switch arrangement. Any one of these ninth contacts for a specific column is closed in the same manner as was described previously, representing the fact that the band-pair has been filled. Also, when the ninth row solenoid $\mathbf{814_9}$ is operated, a relay 1005 (FIGURE 10) is caused to be operated. This relay 1005 initiates a sequence of operations in Sequencer B, causing an advance to the next band-pair which is assigned to the tape for the incoming data.

It was pointed out above that normally closed contacts 2602J are in the path of the power that is applied to the contacts 832A et seq. This relay, to which these contacts belong, is in Sequencer D. When a band-pair on the drum, which had been previously selected for read-in, is also attempted to be selected for read-out, relay 2602 is operated and functions to bypass further selection of that band-pair for read-in. Its contacts 2602K are closed, whereby a signal is applied to the row 9 solenoid $\mathbf{814_9}$ through closed contacts 902G which operates, as previously described, to close the contacts in row 9 and in the column having a pair of contacts which were previously closed. This, in turn, sends a signal to Sequencer B through contacts 902F, 903E, and 2706AA (to relay 1005), requesting another band-pair be made available to receive incoming data. It is to be further noted that in order to insure the operation of the relay 902, when relay 2602 is operated a third contact 2602F closes, providing an auxiliary path by means of which relay 902 may be energized.

Thus, there has been described an arrangement whereby a crossbar-switch memory stores the filling conditions of the tracks of a drum, in response to a signal indicative of a filled track advances its indication to the next track, and, in response to all tracks in a band-pair being filled, stores that indication and issues a request for the assignment of a new band-pair.

*Sequencer B*

Figure 10:
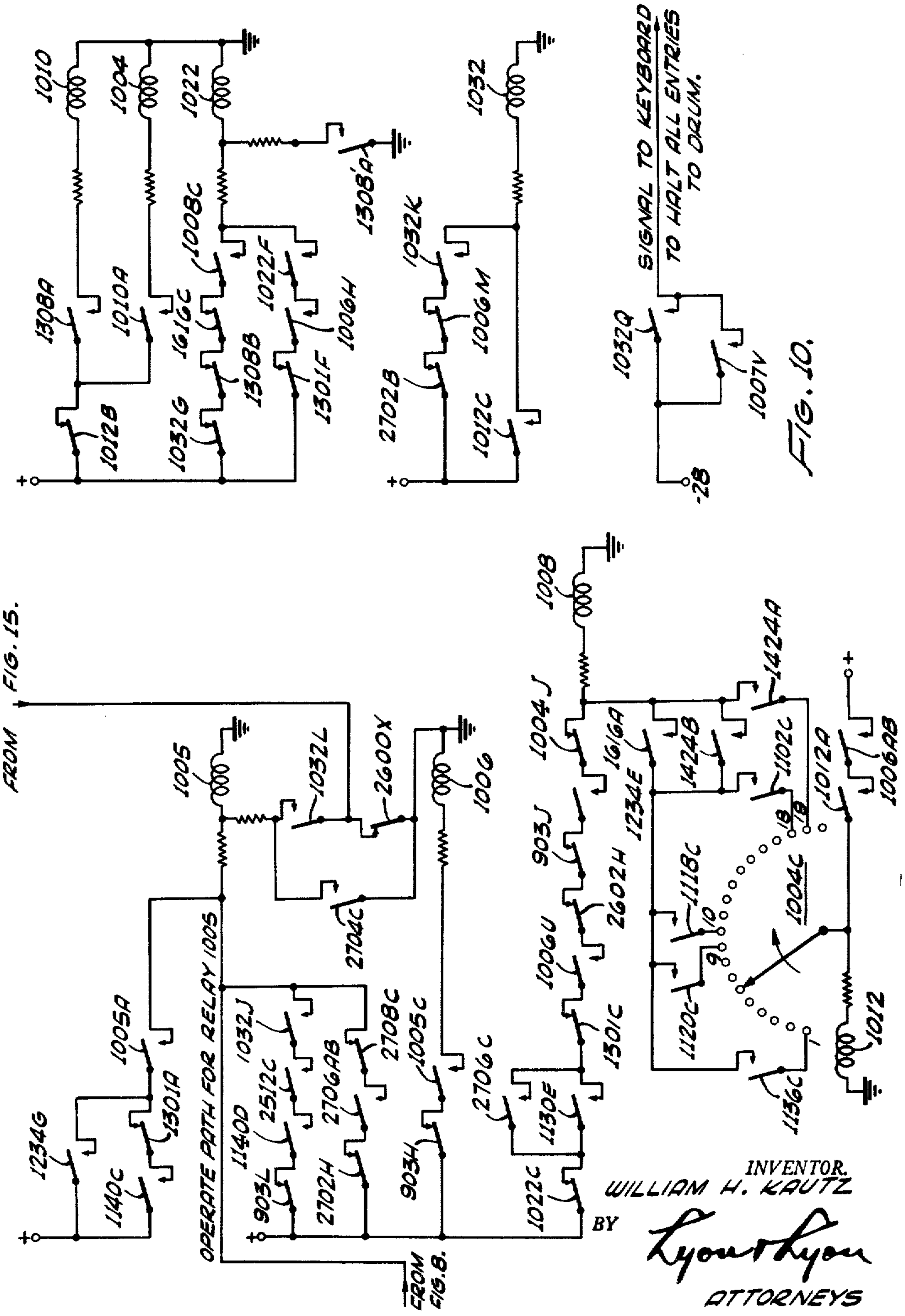
Figure 11:
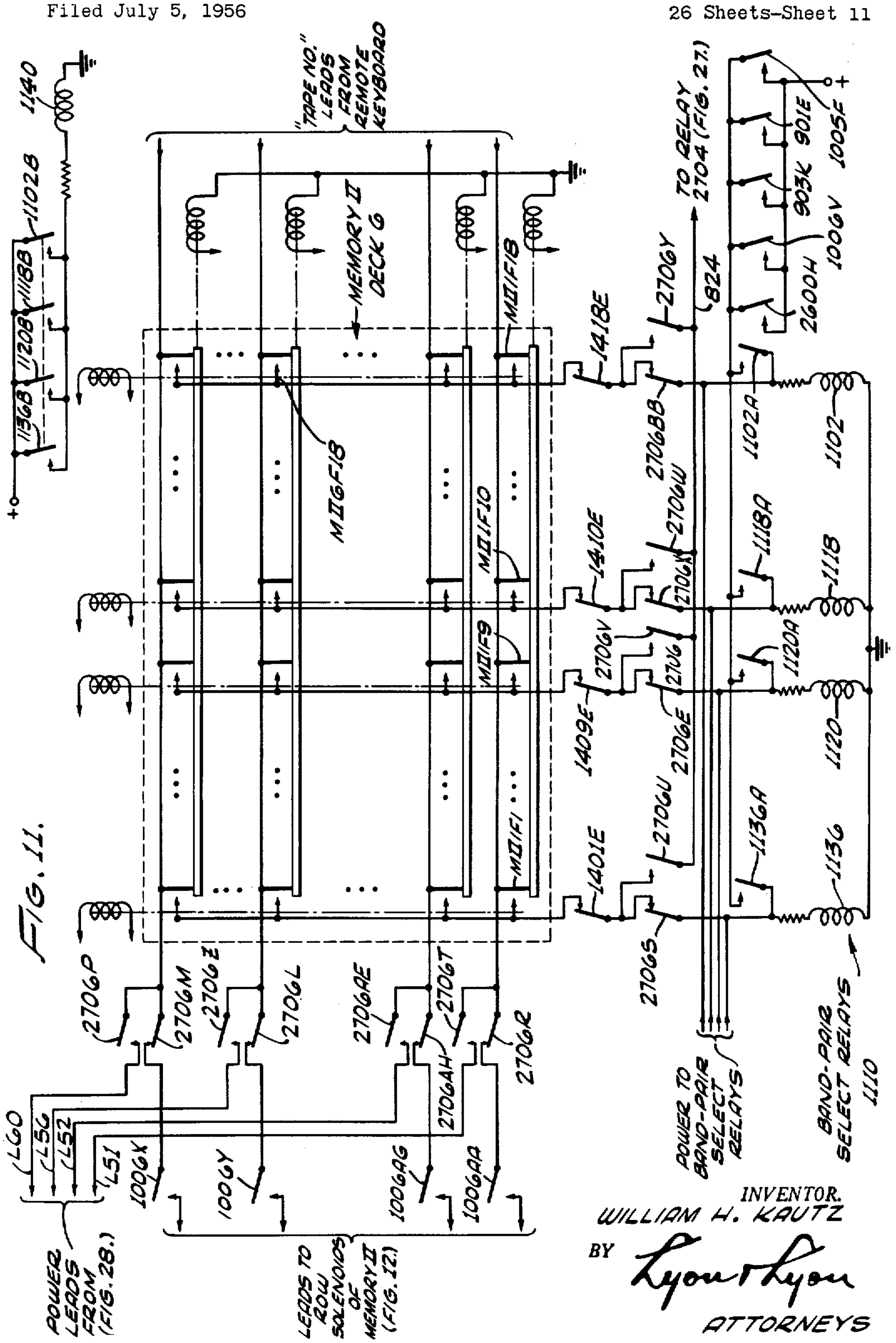

Sequencer B, in response to a signal from Sequencer A, functions to assign a new band-pair for entry of new data and changes the indicating status of Memory I to be representative of the situation. It also switches the fill-empty switches for the filled band-pair heads to the emptying position. Referring to FIGURES 10 and 11, which show a portion of the circuit of Sequencer B and one deck of Memory II, the operation of Sequencer B is initiated by a signal from Sequencer A, which energizes relay 1005 which is, in effect, requesting the assignment of another band-pair, or is initiated by a signal from Sequencer E, which provides the initial band-pair-tape assignment, and which apparatus will be described subsequently.

The apparatus in Sequencer B principally involves a stepping switch 1004, having eight separate decks, respectively designated as 1004A–1004H. This stepping switch operates or advances from whatever position it happens to be at at the time a signal is applied thereto, until it reaches a position which corresponds to the band-pair which has just been indicated as having been filled. While at this position, Sequencer B initiates a signal to the fill-empty switches 218 to instruct them to operate the relays for the band-pair which has just been filled from the filling to the emptying position. Then the stepping switch proceeds to search for another available band-pair for assignment for filling, in place of the one which has just been filled. After finding an available band-pair for assignment, Sequencer B initiates signals to Memory I and II, which insure that that band-pair is assigned to the tape concerned and, further, that that band-pair will be filled by data which will eventually be written on the tape to which the assignment is made. The stepping relay 1004 then stops at this position.

It will be recalled from the description of FIGURE 8 that one of the 18 band-pair-selecting switches 1110 was assumed closed in order for Sequencer A to operate. This relay remains closed throughout the operation of Sequencer B.

Let us assume, for the purposes of illustration, that the band-pair which has just been filled is band-pair 18 and that the next free band-pair for assignment is band-pair 9. With the above assumption, relay 1102, corresponding to the previously selected band-pair, is closed. This relay is latched closed over contacts 903K and its own contacts 1102A. The manner of selection of band-pair relay 1102 will be shown later. However, it should be noted that relays 1102–1136 comprise the band-pair-selecting switches 212.

As was described in FIGURE 8, a conductive path for power is provided over contacts 902F and 903E to relay 1005 when the row solenoid 9 of the crossbar-switching apparatus was energized.

It should be noted that relay 1140 (shown on top of drawing 11) will operate whenever any one of the band-pair-select relays 1102–1136 is operated. In the hypothesis, which has been used for purposes of illustration here, relay 1102 is the one that is operated, and, therefore, its contact 1102B will close to operate relay 1140. Upon the completion of operation of Sequencer A, it was previously mentioned that relay 903 was disenabled. When this occurs, the normally closed contacts 903H shown on FIGURE 10 provide a path through contact 1005C to operate relay 1006. When relay 1006 closes, it applies power to row solenoid 6 (FIGURE 12) of Memory II. In FIGURE 11, Deck 6 of Memory II is shown vestigially. Its contacts are operated in parallel with those of Deck 1. Column and row busses are provided interconnecting the respective row contacts and the respective column contacts.

Figure 12:
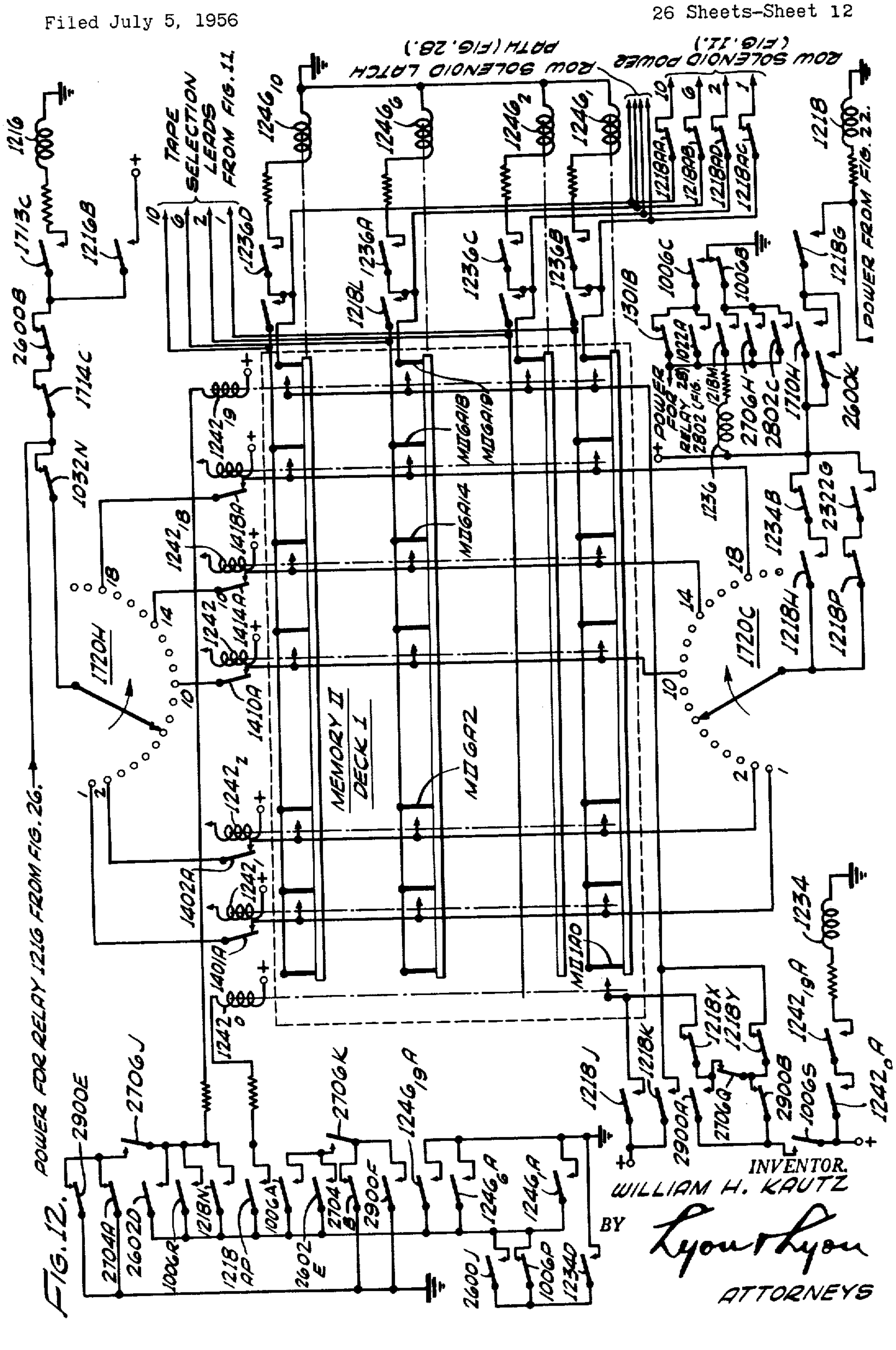

Referring to FIGURE 11, the enabling path for the row solenoid goes through contacts 1006V, which incidentally latches up relay 1102 through contacts 1102A. From contacts 1006V through contacts 1102A, normally closed contacts 2706BB, 1418E, crossbar contacts MII6F18, which are the contacts which connect the number 18 column bus with the number 6 row bus, which also goes to the keyboard. The row bus passes the current through normally closed contact 2706L, contacts 1006Y, along lead 6 to FIGURE 12. FIGURE 12 is a circuit diagram of the portion of Memory II used for signaling the proper tape into which data is to be emptied. FIGURE 12 also includes parts of Sequencers B and C. From lead 6 to contact 1218AB, contact 1236A, and to the row solenoid $\mathbf{1246_6}$ of Memory II.

It is to be noted that relay 1236 was maintained closed by a path through contacts 1006C and 1301B. Upon operation of the row solenoid $\mathbf{1246_6}$, off-normal contacts $\mathbf{1246_6A}$ are closed, which provides a path to supply power to solenoid $\mathbf{1242_0}$, which is the zero-column solenoid, and solenoid $\mathbf{1242_{19}}$, which is the column 19 solenoid, via relay contacts 1006Q and 1006R (Memory II has 20 columns and 10 rows). The operation of the zero-column solenoid and the 19-column solenoid pulls in the corresponding contacts 1296 at the co-ordinate points with the crossing points in row 6 in the respective crossbar-switching apparatuses, whereby the contacts at these crosspoints are closed, whereby 1296 provides a latching path via contact 1236A for the row solenoids $\mathbf{1246_6}$. This path is completed through the No. 19 column bus through contacts 1218Y, 2900B, 1006S, to the B+ supply. Closure of off-normal contacts $\mathbf{1242_0A}$ and $\mathbf{1242_{10}A}$ by the operation of respective zero and nineteen column solenoids also closes a path to enable operation of relay 1234.

When relay 1234 is operated (referring to FIGURE 8), it enables the operation of the first row solenoid $\mathbf{814_1}$ on Memory I over a path established through normally closed contacts 2706N, contacts 1234L, and contacts 1006Z. Another result achieved by the operation of relay 1234 is to provide (see FIGURE 10) an alternate latch path for maintaining relay 1005 operated, over contacts 1005A and 1234G. Another result achieved by relay 1234 is to complete an operating path to relay 1008 over a chain of contacts which are designated respectively contact 1022C, 1130E, 1301C, 1006U, 2602H, 903J, 1234E, and 1004J. Relay 1008 is the first to operate in a chain, which initiates the stepping of the stepping switch 1004.

Figure 13:
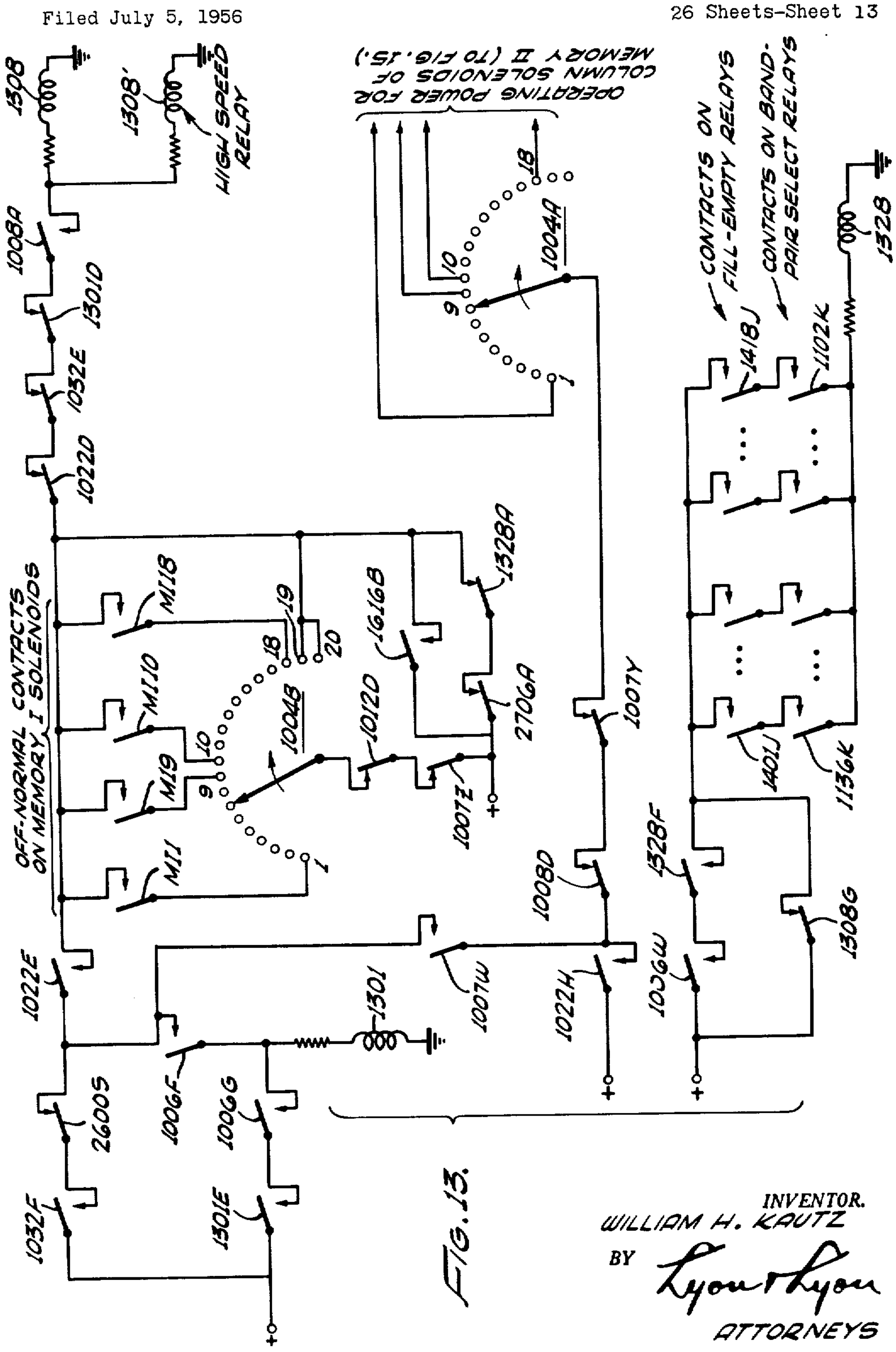

To see the operation of the stepping relay 1004, consideration should be given to FIGURE 10 and FIGURE 13. FIGURE 10 includes the circuit for two of the relays involved, namely, relays 1008 and 1010 and for deck C of stepping relay 1004, and FIGURE 13 shows the remaining relays involved, namely, 1308 and 1308′. FIGURE 13 also shows the connections for decks A and B of the stepping relay 1004. It should be appreciated that the stepping relay requires first an energization, then a de-energization, before it steps forward one step.

Figure 14:
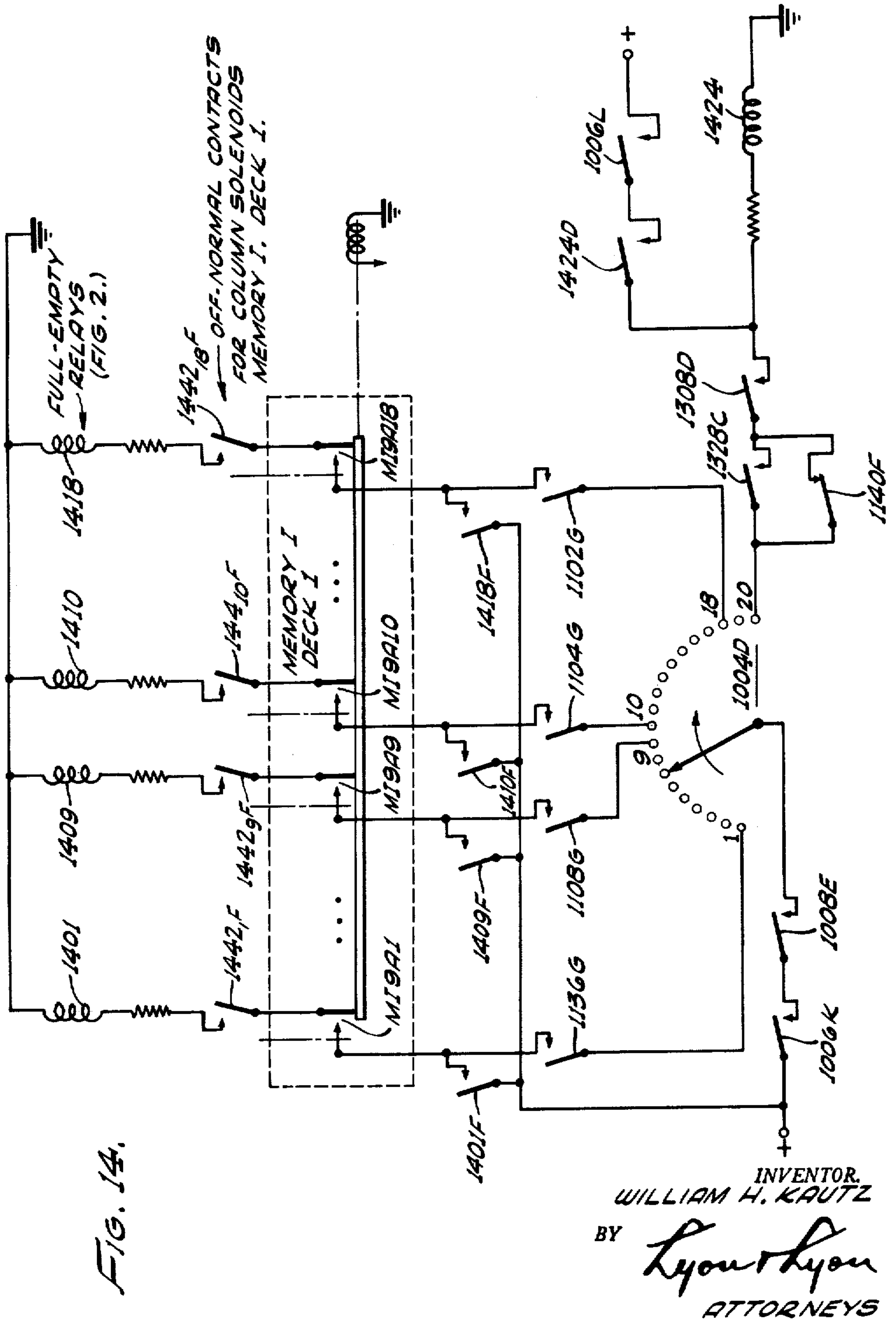

When relay 1008 is energized, an energization path to relay 1308 is actuated over contacts 2706A, 1328A, 1022D, 1032E, 1301D, and 1008A. Also operated is high-speed relay 1308′. An energization path to relay 1010 is then made through contacts 1012B and 1308A. Operation of relay 1010 closes a path to the stepper solenoid 1004 through contacts 1012B and 1010A. This, in turn, opens normally closed contacts 1004J, thus de-energizing relay 1008. This de-energizes relay 1308 and 1308′ when normally open contacts 1008A are opened. This, in turn, opens contacts 1308A, thus de-energizing relay 1010. This causes contacts 1010A to open, thus de-energizing the stepper solenoid 1004. This permits the stepping relay to advance one step. This relay-operation sequence continues and the stepping switch continues to advance until it reaches the position of band-pair 18, which has just been declared as filled by Sequencer A. This may be seen by referring to FIGURE 14, showing the deck 1004D of sequencing relay which is concerned with this operation, as well as the fill-empty relays 218 and deck 1 of Memory I.

There are 18 fill-empty relays, each controlling the connections to and from the recording heads of a band-pair. The coils of these relays are respectively connected through one of the off-normal contacts of the column solenoids for Memory II, deck 1, through one of the row 9 contacts in Memory II, deck 1, through contacts at one of the band-pair-selecting relays to a terminal on deck D of stepping relay 1004.

Upon reaching position 18, a path is completed from the source of power to a fill-empty relay 1418, through the following contacts: 1006K, 1008E, position 18 of 1004D, contacts 1102G, contacts MI9A18 of row 9 of crossbar-switching apparatus (deck 1 of Memory I), and $1442_{18}$F. Thereby, relay 1418 is operated. This results in the heads on the drum over the eight tracks allotted to bandpair 18 being switched to the read-out position for emptying the filled band-pair. A latching path is provided for relay 1418 through contacts $1442_{18}$F, the row 9, column 18 contacts MI9A18 in the crossbar-switching apparatus, and contacts 1418F.

The next time relay 1308 releases it completes a path through its normally closed contacts 1308G (FIGURE 13) through contacts 1418J and 1102K to operate relay 1328. Relay 1328 then latches up over contacts 1102K, 1418J, 1328F, 1006W to the source of power. When relay 1328 operates, it opens up its normally closed contact 1328A (FIGURE 13), which opens up one of the paths by which relay 1308 is energized. This would prevent further operation of the stepping switch except that a parallel energization path is provided through one of the terminals (18) of the B deck of stepping switch 1004 and through another off-normal contact MI18 for the columns of Memory I, deck 2 (as shown in FIGURE 8). The stepping switch will then continue to advance as long as an energization path for relay 1308 is provided through normally closed contacts 1007F and 1012D, the B deck moving arm of the stepping switch 1004, and a closed one of the column off-normal contacts of Memory I, deck 2, which are respectively designated as M1 through M18, which are closed when the corresponding column solenoids for Memory I are closed, which thereby provides the path through the chain of contacts 1022D, 1032E, 1301D, 1008A to maintain relay 1308 closed. As soon as the stepping switch advances to off-normal column contacts which are not closed, its further advance is prevented.

Referring to FIGURE 10, as the stepper switch 1004 continues to advance, an energization path to the coil of relay 1022 is continually made and broken, except that each time the path to relay 1022 is made, contact 1308'A, which is a contact on a high-speed relay 1308', which is in parallel with relay 1308, operates in advance of the making of the path to shunt the coil of relay 1022. Thereby, relay 1022 is prevented from operating as long as relays 1308 and 1308' operate together in the manner described. However, when in the course of the operation of the stepper relay, relays 1308 and/or 1308' are not operated, then relay 1022 can operate over a path which includes the contacts 1032G, 1308B, 1616C, and 1008C. A latch path for relay 1022 is provided over contacts 1022F, 1006H, and 1301F.

It should be noted at this point that, in Memory I, for every assigned band-pair there is an energized column solenoid maintaining its off-normal contacts closed, and when there is an unassigned band-pair its column solenoid is not energized and, therefore, its off-normal contacts (MI1 to MI19, FIGURE 13) are not closed. Therefore, in accordance with the method of operation described previously, the stepping switch will be brought to a halt at the first such position which is reached. Relay 1308 is then no longer operative. At such time, relay 1022 can operate, and thereby it breaks the path through its contacts 1022D and 1022C through which relays 1308, 1308', and 1008 were operated.

As shown on FIGURE 13, when relay 1008 is rendered inoperative, its normally open contacts 1008D can close and, over a path including relay contact 1022H and manual switch 1007Y, can apply power to the terminals of the A deck 1004A of stepping switch 1004. In accordance with the illustration assumed and the explanation above, the first next available band-pair is band-pair 9, and the stepping switch 1004 will be stopped at position 9. Thus, power will be applied to the lead 9 connected to the ninth terminal on A deck 1004A. The power then goes out over the lead 9 to the lead corresponding thereto in FIGURE 15 to energize a solenoid $1442_9$, which is the solenoid for column 9 of Memory II crossbar-switching apparatus. This then closes the off-normal contact $1442_9$A, thereby latching column solenoid $1442_9$.

It should be recalled that previously in considering the row solenoids for Memory II on FIGURE 12 the row 6 solenoid $1246_6$ was energized. Thus, the energization of the column solenoid $1442_9$ shown in FIGURE 15 pulls in all the contacts on all the decks of Memory II which are located at the intersection of row 6 and column 9. This insures the assigning of band-pair 9 to tape 6. Through off-normal contacts $1442_9$B (FIGURE 8), which is closed by the operation of the column solenoid $1442_9$, power is applied to energize the column 9 solenoid shown in drawing 8, designated as $816_9$. This solenoid is in Memory I. It should be recalled that the row solenoid 814 in row one in Memory I was held operated. Thus, with the row 1 solenoid operated and with the column 9 solenoid operated thereafter, the contacts at the intersection of this row and column are closed. This assures that the next time data is entered which is assigned to tape 6, it will be entered into track 1 of band-pair 9.

As soon as the column 9 solenoid $816_9$ is operated, it closes its off-normal contacts M19 (FIGURE 13). Thereby, an energization path is closed over normally closed contacts 1012D, 1004B, terminal 9 of the selecting switch 1004B, through the M19 contacts, contact 1022E, 1006F to operate relay 1301. Relay 1301 then latches closed through contacts 1301E and 1006G.

Referring now to FIGURE 10, when relay 1301 is operated it opens its normally closed contacts 1301F, whereby the latch path to relay 1022 is broken. Relay 1022 is de-energized and, as may be seen in FIGURE 12, relay 1236 is released, since the latch paths which are provided through contacts 1301B and 1022A are now opened. This opens the energization paths which holds row solenoid 6 ($1246_6$) operated. This opens the off-normal contacts $1246_6$A, whereby the energizing path to the column zero solenoid $1242_0$ and to the column 19 solenoid $1242_9$ is opened. This, in turn, opens the path holding relay 1234 operated (lower left-hand corner of FIGURE 12).

Referring now to drawing 8, when relay 1234 opens up, it opens up contacts 1234L, which opens the energization path for row solenoid one $814_1$ for Memory I. The latch path to relay 1005 over contacts 1234G is opened when relay 1234 is de-energized, thus de-energizing relay 1005. This results in contacts 1005C opening the operation, thereby de-energizing relay 1006. The de-energization of relay 1006 breaks the latch path for relays 1328 and 1120 (FIGURES 10, 13, and 11, respectively). In FIGURE 11, when band-pair-selecting relay 1120 is rendered inoperative, it renders relay 1140 inoperative. Finally, when relay 1006 releases, it also opens up the latch path to relay 1301, whereby it is rendered inoperative. Thus, all the relays which were operated when Sequencer B first began to operate are now released. It can be seen from the above that a next available band-pair has been made available for filling upon notification from Sequencer A that another band-pair is required for incoming data.

The description which follows is that of the operation which occurs when no band-pairs are found available for assignment for filling. Under such a circumstance, the stepping relay 1004 (see 1004B, FIGURE 13) will continue to advance from whatever position it occupied indicative of the band-pair which was just filled (position 18) until it reaches terminal position 20. At this position (see FIGURE 14), relay 1424 is energized over a path consisting of contacts 1006K, 1008E, the stepping switch 1004D, terminal 20, contacts 1328C, and 1308D. Relay 1424 then latches up over a path including contact 1424D and 1006L. The above is shown in FIGURE 14. The stepping switch then passes terminal 20 and continues stepping or advancing along until it reaches the position of terminal 18 again. This corresponds to the position of the band-pair which was just previously filled. Since the data entry indicates an association with tape 6, the band-pair-selecting relay 1102 was operated prior to the start of Sequencer B, as may be seen on FIGURE 11. Thus, as may be seen in FIGURE 10, contact 1102C is closed when the terminal 18 position is reached by 1004C, whereby there is provided a path through contacts 1424B to operate relay 1012 simultaneously with the operation of relay 1008. Relay 1012 latches closed over a path including contacts 1012A and 1006AB. The operation of relay 1012 enables relay 1032 to be operated over contacts 1012C. A latch path is provided over relay contacts 1032K, 1006M, and 2702B. Contacts 1032Q are closed and send a warning signal and inhibition command to the keyboard to halt all further entries to the drum.

Referring now to FIGURE 13, the operation of relay 1012 opens normally closed contact 1012D, whereby relay 1308 is prevented from operating. Thereby, the stepping switches will not advance any further, since the relays which step them along are prevented from functioning. The operation of relay 1032 also opens the normally closed contacts 1032G, whereby relay 1022 is prevented from operating.

In FIGURE 10, when relay 1032 is operated, it closes a contact 1032L, which shorts the coil for relay 1005, whereby it is released. The release of relay 1005 causes the opening of its contact 1005C, which releases relay 1006. When relay 1006 is rendered inoperative, it opens up its contact 1006C, whereby relay 1008 is released. Relay 1006, as a result, releases all the relays which were energized when it was operated except relay 1032, as described above for the normal release sequence.

In the embodiment of the invention which was constructed, one of the conditions which was laid down was that the order of the incoming data be preserved. This requires that the order of the filling of the band-pairs be preserved. Therefore, when the stepping switch moves from the position which it last assumed when a band-pair for filling was assigned, forward to seek out the next available band-pair for assignment, this next available band-pair must occur before the next-filled band-pair which is assigned to the tape. Otherwise, the order of the filling of the band-pairs may be destroyed. In this search, the band-pairs which are in the process of emptying are discounted. Stated in other words, the filling of the band-pairs which are assigned for any given tape must occur in the order of their assigned numerical significance. Thus, if at some particular time, band-pairs 1, 3, 7, and 9 are assigned to tape 6, with band-pair 3 filling, previous filling must have proceeded in the order 7, 9, 1. When band-pair 3 becomes full, then the next one to be filled must be an available band-pair between band-pairs 3 and 7.

As a further detailed illustration of the principles involved herein, let it be assumed that there are 18 band-pairs available for assignment to the various tapes. Band-pairs 3, 5, 7, 12, 15, and 18 are assigned to tape 6. Band-pairs 3, 5, 7, 12, and 15 are already filled, and band-pair 18 is in the process of filling. Band-pairs 9, 11, and 16 are free and unassigned. The order of the filling of the band-pairs is that of their numerical sequence. It is now desired to find the next available band-pair for assignment for filling. As described above, our stepping relay has come to rest on position 18, which was the last band-pair which was assigned for filling. Upon reactivation of this stepping relay, it will cycle from band-pair 18 to the positions 1, 2, 3, 4, 5, 6, and 7. Positions 3, 5, and 7 are filled band-pairs. Position 9 is the first available empty band-pair after the filled band-pairs. If the switch assigns band-pair 9 to be filled, then upon subsequent emptying operation, the sequence of the filling of the band-pairs would not be maintained, since the apparatus which performs the emptying would empty band-pairs 3, 5, 7, and 9 in that order. It will be appreciated that band-pair 9 should be emptied only after band-pair 18 is emptied. Therefore, the operation of the Sequencer B must be such that if it does not find an empty band-pair before the next-filled band-pair which is assigned to the tape, then it must operate just as if there were no free band-pairs available for assignment and prevent further data entry to the drum.

Figure 16:
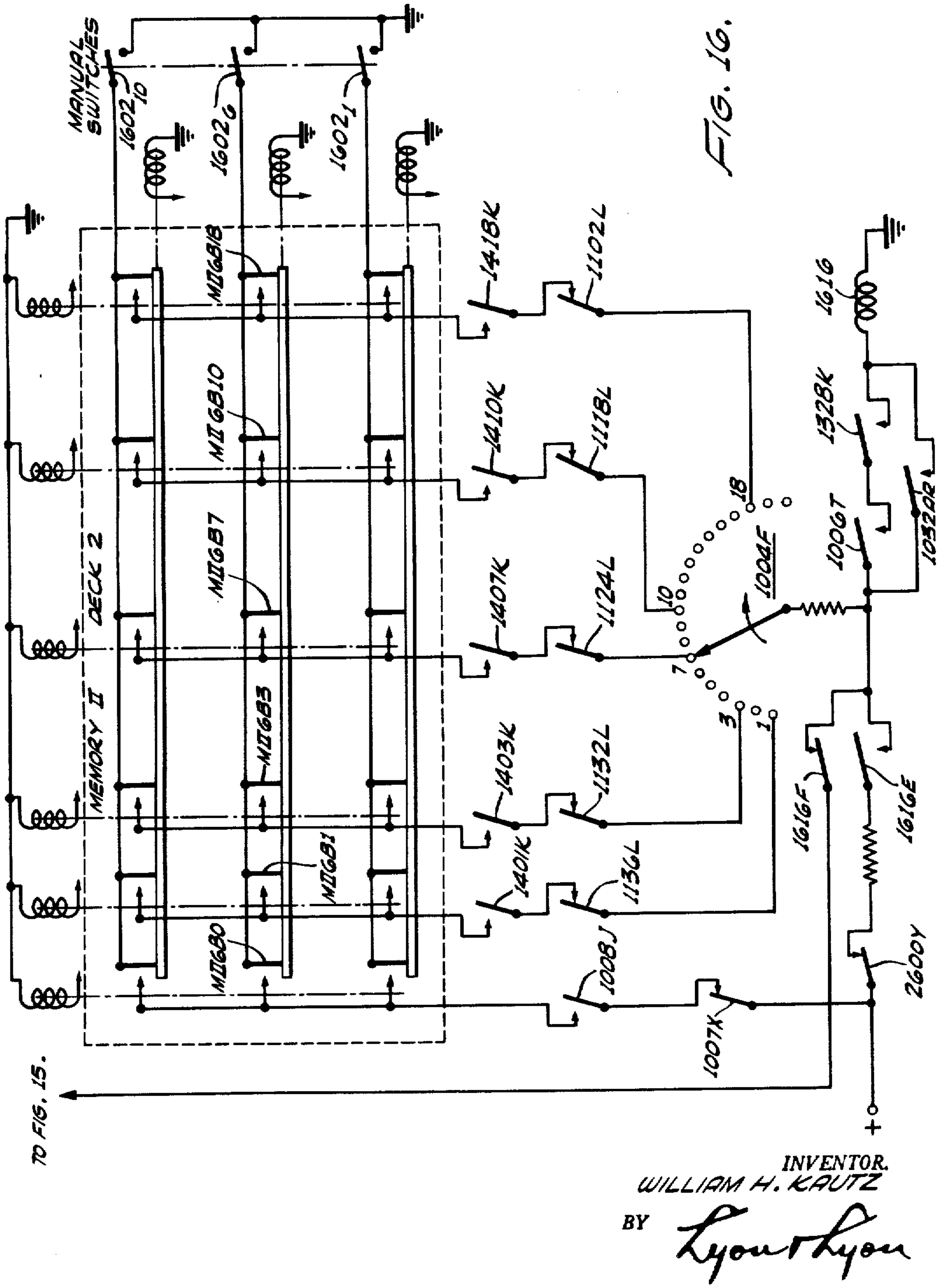

In the following description, it will be assumed that band-pairs 3 and 5 are in the process of emptying, due to an operation of Programmer B, and that band-pair 18 has just had the fill-empty switch connected thereto operated so that it is in condition for emptying when the tape is ready. In FIGURE 16, relay 1616 functions to inhibit further search as soon as it is discovered that there is no free band-pair available for assignment which would preserve the order of filling. In the illustration used, this means that there is no available band-pair between the band-pair which has just been filled (No. 18) and the next-filled band-pair which is not emptying and which is assigned to the same tape (No. 7). The second deck of Memory II has its column and row busses connected to the respective columns and rows of contacts, as previously described. The row busses are connected to ground over individual manual switches $\mathbf{1602}_1$–$\mathbf{1602}_{10}$. The column busses are connected through relay contacts to the terminals of deck F of the stepping switch.

First in the course of the search stepping relay 1004 has been stepped from the last position, which is position 18, to position 3. At this position, considering FIGURE 16, a path is completed to relay 1616 as follows: through contacts 1328K and contacts 1006T, up through position 3 of the stepping switch 1004F, deck F, through contacts 1132L, 1403K, through the bus for column 3 up to the cross contacts MII6B3, which connects the No. 3 column bus to the No. 6 row bus, along the row bus and down through cross contacts MII6B0, which connects the No. 6 row bus to the column zero bus, and then down through the now-closed contacts 1008J and normally closed manual contacts 1007X to the source of potential. It should be recalled from the previous description that the contacts MII6B0 were closed by virtue of the previous assignment to tape 6 of band-pair 3. Contacts MII6B0 at column zero, row 6, are closed in accordance with the operations occurring when Sequencer B started operating, as was previously described. However, despite the application of power to relay coil 1616, it is prevented from operation by the presence of a shorting path across its coil.

Figure 15:
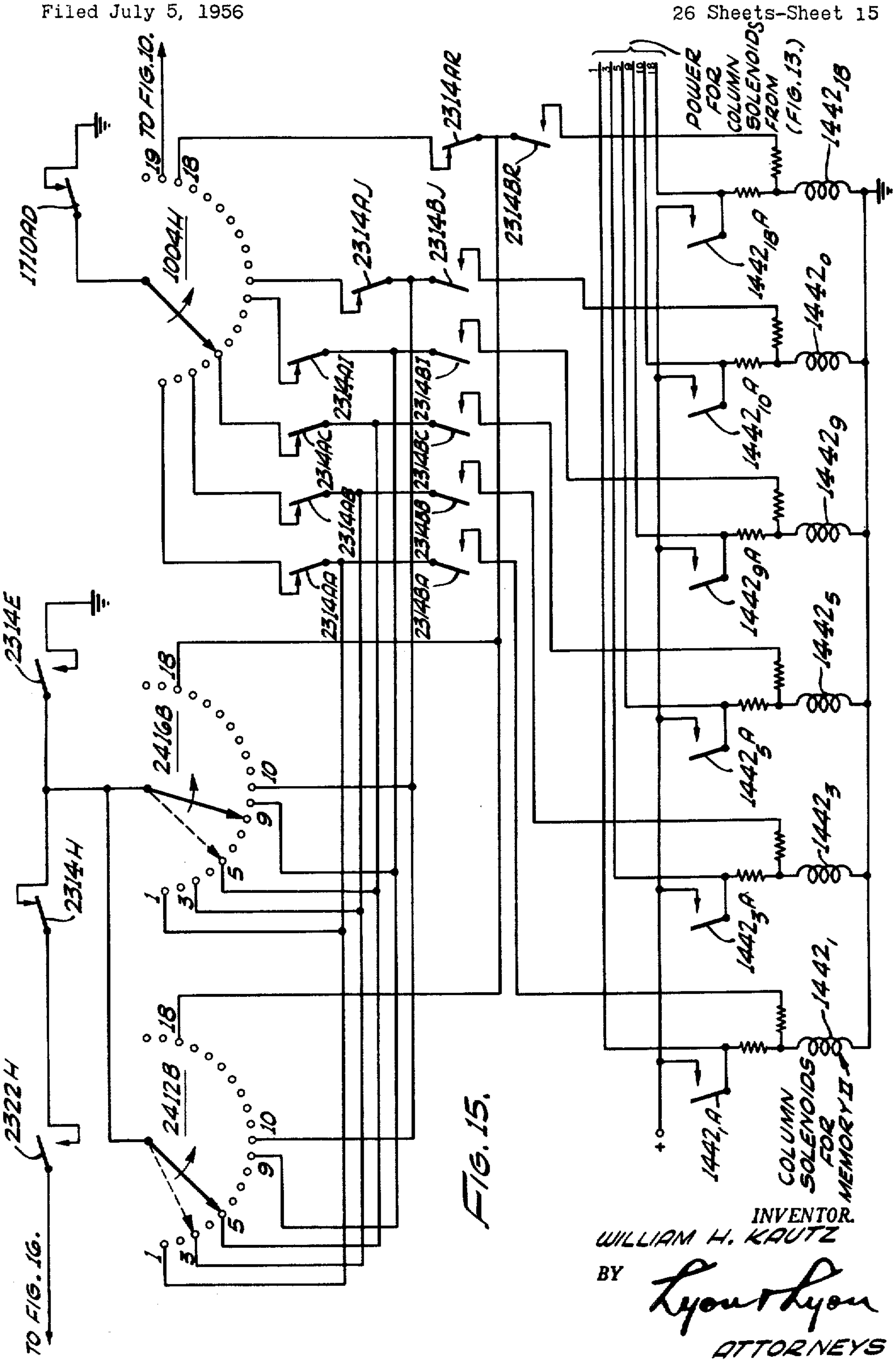

Two decks of two selector relays 2412B and 2416B shown in FIGURE 15 have their selector arms connected in parallel as well as the terminals on these decks. These selecting switches 2412 and 2416 are part of Sequencer D, to be described later. These stepping relays respectively assume positions which are representative of the two band-pairs which are emptying. By the example assumed, these are respectively band-pairs 3 and 5. Thus, the shorting path for the coil of relay 1616 may be traced as follows: over contacts 1328K, 1006T, 1616F, to FIGURE 15, contacts 2322H, which are now closed, normally closed contacts 2314H, through deck B of position 3 of stepping switch 2412B, over contacts 2314AB, which are normally closed contacts, to position 3 on stepping switch 1004H (deck H), through normally closed contacts 1710AD to ground. When position 5 is reached by the stepping switch 1004, relay 1616 is again prevented from operating by a shorting path across its coil provided by the enumerated contacts, except that the path is through stepping relay 2416B at position 5, instead of 2412B at position 3.

The stepping switch 1004 continues stepping along until it reaches position 7. This is another filled band-pair position which is assigned to tape 6. However, this time no shorting path is provided through either stepping switches 2412B or 2416B, since they remain on positions 3 and 5. Relay 1616 receives power through the contacts MII6B7, which serves to connect column 7 with bus 6, and through contacts 1008J and 1007X to the source of B+.

When operated, relay 1616 performs three functions. First, as shown on FIGURE 10, its normally closed contacts 1616C are opened, whereby relay 1022 will be prevented from operating. Relay 1022 is one of the relays which assists in the function of assigning a new band-pair for filling. Secondly, by the closure of its contacts 1616B, shown on FIGURE 13, stepping switch 1004B is permitted to continue stepping, although it is no longer performing a search operation. This occurs because the path through the deck B contacts is effectively shorted out. It will be recalled that previously stepping switch 1004 searched the MI1 to MI18 off-normal contacts to determine by the one of these that was open that there was an available open band-pair for assignment. The shorting out of these contacts effectively prevents the stepping switch from detecting any open MI1–MI18 contacts.

The third function which is performed by relay 1616, as may be seen on FIGURE 10, is that of closing a path via contact 1616A to operate relay 1012 through the C deck of stepping switch 1004 when this C deck reaches position 18. As previously described, the operation of relay 1012 causes relay 1032 to become operative over contact 1012C. When relay 1032 becomes operative, it releases all the other sequencing relays except 1616 and itself, and it also provides a signal over its contact 1032Q to the keyboard to halt all further entries to the drum.

The next time Sequencer D clears out, as indicated by the closure of relays 2512, conditions for the closure of which will be described subsequently under the heading "Sequencer D," a path is provided to close relay 1005, by the sequence of contacts 903L, 1140D, 2512C, and 1032J. The closure of relay 1005, it will be recalled, starts Sequencer B. The clearing out of Sequencer D is occasioned by previous operation of Sequencers C and D, such operation having been initiated by a release of band-pairs from assignment. The mechanism for release of band-pairs is described infra. These released band-pairs are available for reassignment. Since relay 1032 closed to indicate a shortage of band-pairs for assignment, this restarting of Sequencer B is for the purpose of carrying out the search for free band-pairs a second time. As Sequencer B starts up, the proper band-select relay is operated by a path (FIGURE 26) through contacts 1830R, 1032D, deck E of stepper 1004 (which stepper was stopped at the position of the just-filled band-pair when relay 1032 closed), through one of the contacts on relay 2600 to the corresponding band-select relay (FIGURE 11). As soon as relay 1006 closes near the start of Sequencer B, relay 1032 releases, since its latch path involving contact 1006M is broken. The released band-pairs are made available for reassignment by Sequencer B, thus providing more buffer storage space for incoming data.

Sequencer B is also restarted by the same mechanism if Sequencer C clears out after an unsuccessful search, such a condition being indicated by the closure of relay 1911, the path for which is described in the description of Sequencer C. The closure of relay 1911 causes relay 2512 to close, just as if Sequencer D has cleared out, by the path through contacts 1032R and 1911 F. Relay 2512 then latches through contacts 2512D and 1032R, releasing relay 1911 by the opening of contact 2512E, which with 1032S latched relay 1911. The sequence continues as just described.

If manual switch 1007 is closed, indicating that all entries to the drum are completed and that the drum should be emptied to the tapes, Sequencer B operates as usual to close the fill-empty relays, but the operation of the sequencer to search for a free band-pair and to set up Memory I and Memory II accordingly is bypassed, as follows: It may be noted (FIGURE 13) that normally closed contacts 1007Z and 1007Y are located in series with the band-pair searching circuit involving relay 1308, and the Memory II column solenoid circuit involving deck A of stepper 1004, respectively. Thus, when switch 1007 is operated, these circuits are broken. Instead, a path is provided directly to relay 1301, whose closure initiates the clear-out of Sequencer B, through contacts 1022H, 1007W, and 1006F. Relay 1022 closes as soon as relay 1308 fails to operate during the advance of the stepper, as was described previously; the path to relay 1308 is broken, in turn, by the closure of relay 1328, indicating that the fill-empty relays have been closed, also as described previously. Also, another normally closed contact 1007X in the circuit of relay 1616 (FIGURE 16) prevents this relay from closing during this mode of operation. Thus, with switch 1007 operated, Sequencer B clears out as soon as the task of closing the fill-empty relays has been accomplished, without searching and without assigning the next free band-pair as usual.

Further entries to the drum are inhibited by contact 1007V (FIGURE 10), which supplied a signal to the keyboard.

*Sequencer C*

The function of Sequencer C is to survey all the band-pairs to see which one of the band-pairs should be emptied next. This decision is normally made on the basis of which tape has the greatest number of assigned band-pairs which are ready to be emptied. Sequencer C may be instructed to commence tape-surveillance operation either by a manually generated signal or by a signal from tape-control apparatus 220, indicative of the fact that the preceding drum band-pair emptying operation has been completed and a new emptying operation should commence. In response to this signal, Sequencer C operates to quiz two levels of the crossbar apparatus, forming Memory I and Memory II, which are allocated for the purpose of co-operating with Sequencer C. The logic of the quizzing here is to apply voltages in a predetermined sequence to the crossbar levels which are assigned for being quizzed and which are connected up in a certain manner so that a signal is derived as a result of the application of these voltages, which indicates the band-pair satisfying the requirements which are set forth below.

There are two sequences in each quizzing operation. In the first sequence, there is sought, for example, two or more full band-pairs which are assigned to a single one of the output tapes. The identity of this tape is retained. In the second sequence, the filling band-pair is located which is assigned to the tape whose identity has just been determined. Both Memory II, which stores the band-pair to tape assignments, and Memory I, which stores the state of filling of these band-pairs, are surveyed. In the performance of the first sequence, first a survey is made to note whether or not there are any band-pairs in excess of two assigned to a tape, two of which are full. If no such band-pairs are found, then a survey is made to determine whether or not there are any one and one-half band-pairs which are full and which are assigned to a tape. This sequence is repeated for one band-pair and then for one-half band-pair. The search sequence progresses only if the preceding search is not successful. Transition from the first to the second sequence occurs upon a successful search. If the search is completely unsuccessful, then the Sequencer clears out and will not function unless it is manually started thereafter. The operation of quizzing is carried on by employing sequencing relays for applying voltages successively to column busses in the crossbar memory levels assigned for being quizzed.

The following description describes the circuitry and operations thereof in the event of unsuccessful searches.

Figure 20:
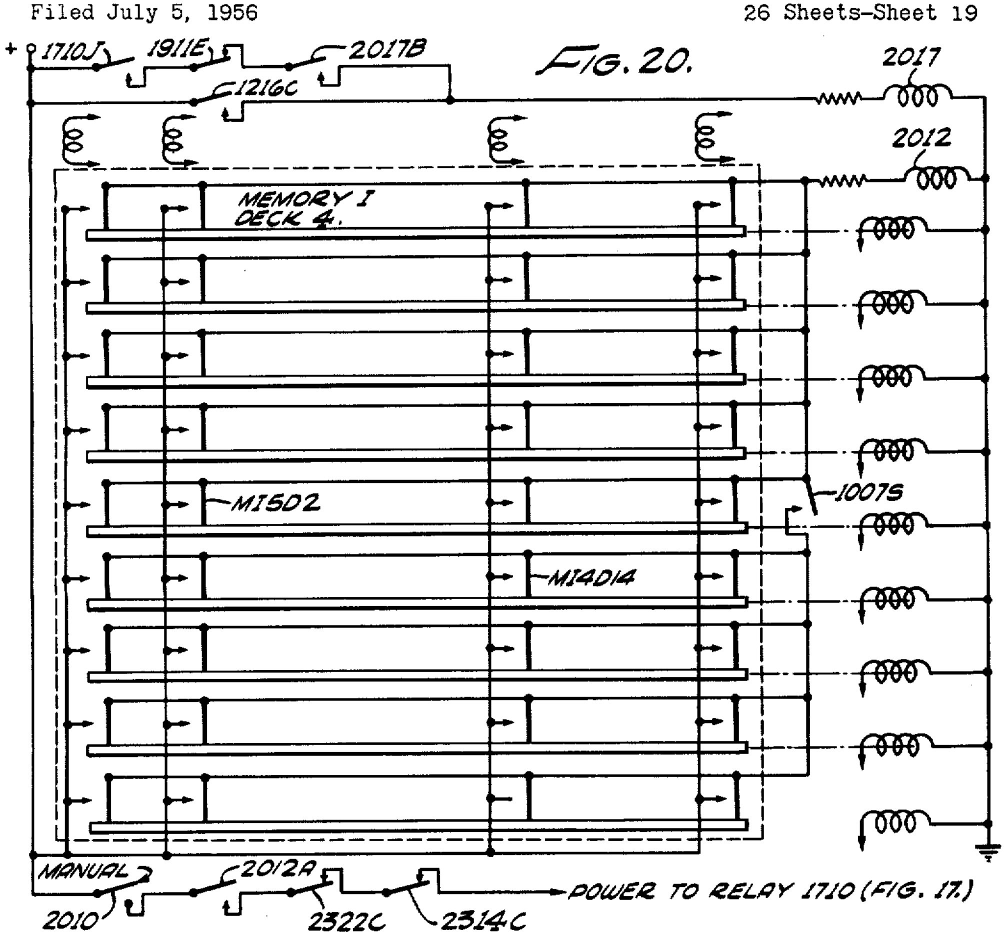

In response to a signal requesting a drum surveillance and read-out operation caused, for example, by closing a switch 2010, FIGURE 20, a relay 1710 closes to initiate the surveillance operation. This is shown on FIGURE 17. The operation of the Sequencer C is centered around the operation of a stepper relay 1720, which moves continuously during the sequences performed by Sequencer C, to apply quizzing voltages and locate the band-pair for emptying. Relay 1710 closes to initiate the sequence. Its contact 1710A is then closed and power can then be applied to relay 1713 through a chain of closed contacts comprising 2017C, 903P, 2702M, 2314E, 1710A, 1911A, and 1720J. Closure of contacts 1713A enables the operation of relays 1714 and 1714' which is connected in parallel therewith. Contacts 1714A are thus closed, enabling the application of operating power to relay 1715 through contacts 1216A, 2017A, and 1714A. Thereby, contacts 1715A are closed, enabling the energization of the stepping relay 1720.

The stepping relay 1720 is the same type as is used in Sequencer B. Thus, it does not advance until the solenoid is de-energized. When the stepping-relay coil is energized, it opens up a pair of associated normally closed contacts 1720J. Thus, relay 1713 is de-energized, which, in turn, de-energizes relays 1714 and 1714', which, in turn, de-energizes relay 1715, which, in turn, de-energizes the solenoid of the stepping relay 1720, enabling the relay to advance one step. Thereafter, normally closed contacts 1720J are again closed, initiating again the sequence of operation of relays 1714, 1714', 1715, and 1720. Thus, it will be seen that the stepping relay steps along by the sequential operation of relays 1713, 1714, and 1715.

The cycle of operation of the stepping relay will continue until any one of the following happens; either (1) relay 1710 is de-energized, opening contacts 1710A, or (2) relay 1911 is energized, opening contacts 1911A, or (3) relays 1216 and 2017 are energized, opening normally closed contacts 1216A and/or 2017A. The circumstances under which the above or any one of the above will happen will be described subsequently. Relay 1720 has eight banks, or tiers, of contacts 1720A–H. Connection is made successively by a separate selector arm for each bank which is advanced from contact to contact in response to the previously described operation of the solenoid and advancing mechanisms. Each bank of the relay will be designated by a different letter of the alphabet; thus, bank 1720C will be the third bank of relay 1720.

A second stepper relay 2410A is employed in conjunction with stepper relay 1720. This second stepper relay is a part of Sequencer D, and the details of its operation will be described subsequently.

Figure 18:
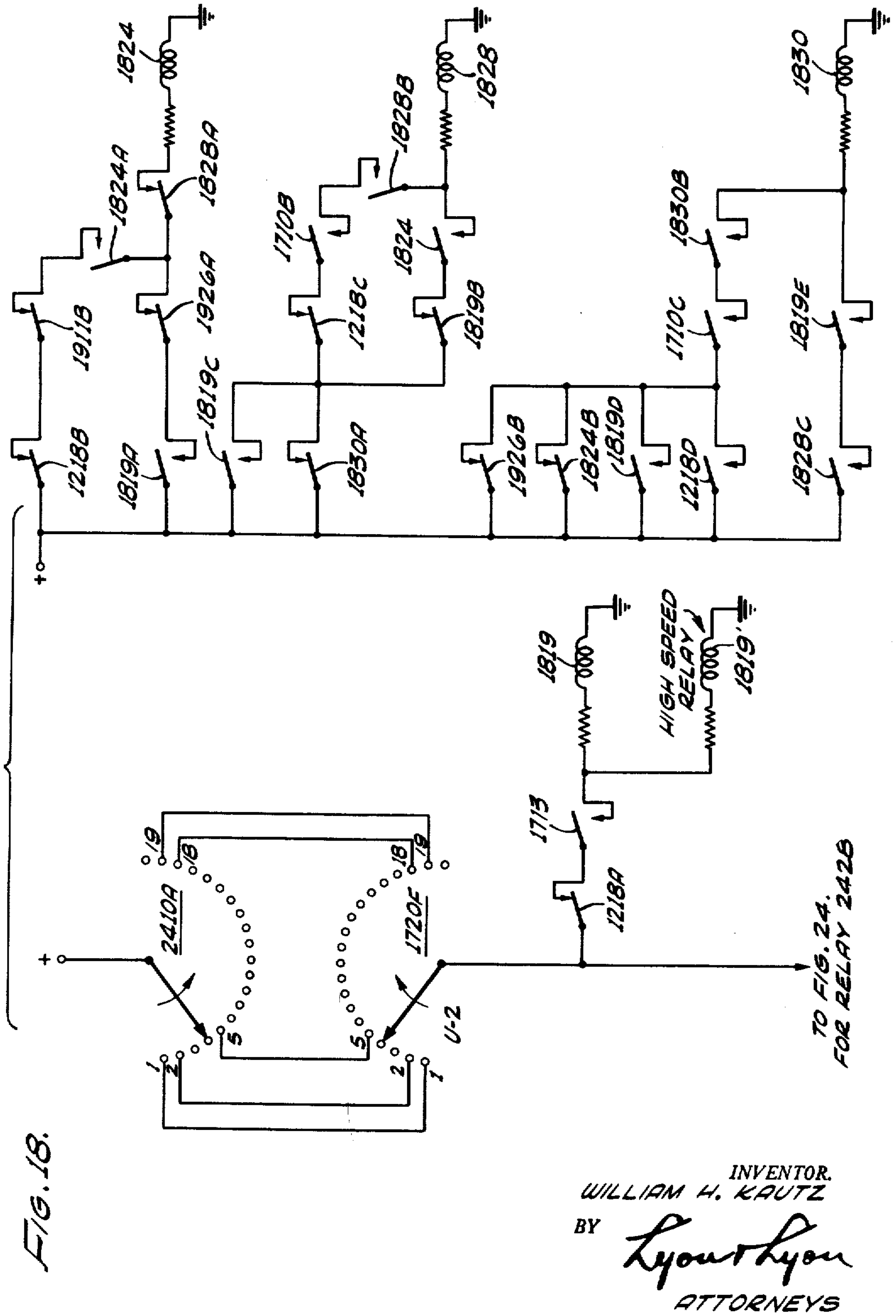

As shown in FIGURE 18, the selector arm of deck A of relay 2410 is connected to a source of potential. Corresponding terminals of 2410A and 1720F are connected together. The stepper relay 1720 continues to advance until its movable arm on the bank F finds the same position as the movable arm in 2410A. When this happens, a path is made between the stepper arm 1720F through normally closed contacts 1218A of relay 1218 and contacts 1713B, whereby relays 1819 and 1819' connected in parallel therewith, are energized. Relay 1819 closes contacts 1819A, which provide an energization path for relay 1824 through a normally closed contact 1926Q of a relay 1926 and through a normally closed contact 1828A of a relay 1828. Also closed is a latching path through contacts 1218B, 1911B, and 1828A.

It will be recalled that relay 1713 and, therefore, its contacts are periodically operated for stepping the sequencing relay 1720. Therefore, the next time relay 1713 opens, contact 1713B will open, which de-energizes relay 1819. When this happens, normally closed contact 1819B will be permitted to close. Upon such closure, an energization path for relay 1828 is set up over the contacts 1830A, 1819B, and 1824E. This sets up a latching path for relay 1828 over its own contacts 1828B, contacts 1710B, normally closed contacts 1218C, and contacts 1830A. Relay 1824 is opened by virtue of the operation of relay 1828, since one of the energization paths to relay 1824 is through a normally closed contact 1828A. The closure of relay 1828 is maintained over the first cycle of operation of the stepping switch 1720 if no success is had for the searching operation. At the end of the first unsuccessful search cycle, a path is made whereby relay 1819 and 1819' can be closed again, since the stepping switches continue around until this energization position is reached again. When this happens, a path is provided to energize relay 1830 over contacts 1828C and contacts 1819E.

When relay 1830 is operated, it opens the normally closed contacts 1830A, which were holding relay 1828 operated. However, a latch path over contacts 1819C, 1819B, and 1824E is still provided for relay 1828. Relay 1830 latches up through its own contacts 1830B, contacts 1710C, and contacts 1824B, which are normally closed contacts, and in parallel therewith contacts 1926B, which are also normally closed contacts. As the stepping switch continues to function, contacts 1713B again open, which renders relay 1819 inoperative, whereby contact 1819C opens. Since contacts 1830A are still maintained open, relay 1828 will be de-energized. This leaves relay 1830 operated and relays 1819, 1824, and 1828 not operated.

Figure 19:
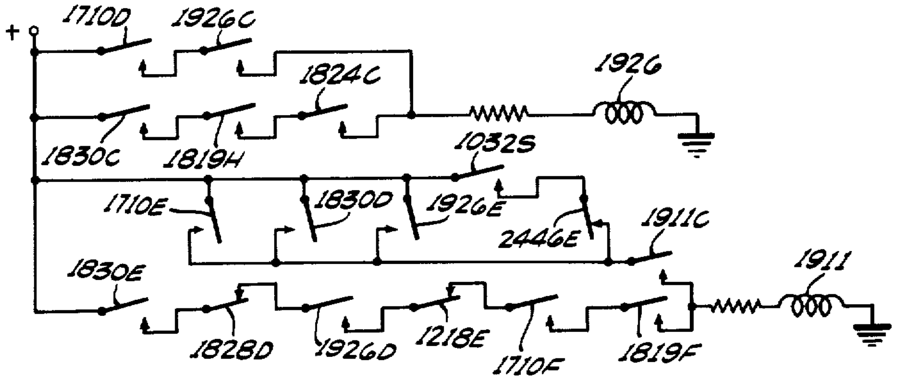

The search continues. The stepping switch 1720 continues around in its cycle back to the position for operating relay 1819 unless in the interim there is found what it is looking for. Relay 1819 is operated again and this time relay 1824 is closed, since contacts 1819A close an energization path through contacts 1926Q and 1828A. Relay 1824 is then enabled to latch through contacts 1828A, 1824A, 1911B, and 1218B. Referring now to FIGURE 19, relay 1926 will then be operated through a path provided by contacts 1830C, 1819H, and 1824C. The relay will latch up over the path provided by contacts 1926C and 1710D. The next time relay 1819 opens in response to the opening of relay 1713, the contact 1819D opens. Thus, the latch path for relay 1830 is now no longer closed. It will be recalled that this latch path consists of either contact 1926B or contact 1824B, or contact 1218D, or contact 1819D. Since relays 1926 and 1824 are now operated, their normally closed contacts 1926B and 1824B are now opened. The release of relay 1830 permits normally closed contacts 1830A to close, whereby a path is provided to operate relay 1828 over normally closed contact 1819B and contacts 1824E. Of course, the latching path for relay 1828 is also closed via contacts 1828B, 1710B, 1218C, and 1830A. Relay 1824 is now de-energized, since the normally closed contacts 1828A, which are in the path to that relay coil, are now open. Thus, relays 1824 and 1830 are both rendered inoperative, and relays 1828 and 1926 are maintained operative for the next cycle of search.

If a successful search is made during the next search cycle, alterations occur to the circuitry which will be described subsequently. However, if no successful search occurs, then relay 1819 will close for the fourth time when the sequencing relay 1720 reaches the position at which it corresponds with 2410A. The next time the relay 1819 closes, it will cause relay 1830 to be operated over the path made by contacts 1828C and 1819E. Relay 1830 will then latch up over contacts 1830B, 1710C, and normally closed contacts 1824B. As a result of the operation of relay 1830, one latching path through contacts 1830A to relay 1828 is opened. When relay 1819 opens again, as the stepping switch sequences, contacts 1819C open and relay 1828 is released. Over the fourth search relays 1830 and 1926 remain operated, and relays 1824 and 1828 are not operated.

Again, if the search is not successful, relay 1819 will be operated for a fifth time. This time, a path is completed to energize relay 1911 through contacts 1830E, normally closed contacts 1828D, contacts 1926D, normally closed contacts 1218E, contacts 1710F and 1819F. A latching path is then provided through contacts 1911C and any one of the parallel contacts 1710E, 1830D, and 1926E. As soon as relay 1911 closes, it opens contact 1911A in the path to relay 1713, which prevents further stepping action of the relay 1720. It also opens normally closed contact 1911D in the latching path for relay 1710, which causes relay 1710 to become inoperative. When this occurs, the latching path to relay 1830 is opened, since contacts 1710C are opened. The latching path for relay 1926 is opened, since contacts 1710D are opened. Since relays 1830 and 1926 are now no longer operative, the latching path to relay 1911 is opened, and, therefore, relay 1911 is now rendered inoperative. Accordingly, it will be seen that upon conclusion of the fourth search without finding any of the sought-for information the sequencer switches are no longer sequencing and all the relays are rendered inoperative, indicative of the fact that no band-pair in the drum is available for emptying.

Referring again now to FIGURE 17, it will be seen that contacts 1824D, 1819G, 1830F, and 1828E provide auxiliary latching paths through contacts 1714B for relay 1714. The purpose of these contacts is to insure that relay 1714 does not release before the release of the relays, the contacts of which provide the auxiliary locking paths for relay 1714. Thereby, assurance is made of the fact that the sequence of operations, described above for relays 1824, 1828, 1830, 1926, and 1911, takes place.

The previous description was for the sequence of operations when a search was unsuccessful. In the event that a successful search occurs, as a result of the application of voltages through appropriate paths which are created in the assigned levels of the crossbar-switching apparatus, a relay 1218 (FIGURE 12) is operated. These paths are described later. Relay 1218 latches through contacts 1710H and 1218G. The operation of relay 1218 also opens up the normally closed contacts 1218A shown in FIGURE 18, whereby despite the fact that the stepper relays continue to operate, relays 1819 and 1819′ are not operated and the relays operated responsive thereto accordingly are not operated. Contacts 1218E, which are normally closed contacts shown in FIGURE 19, also open to prevent operation of relay 1911. Operation of relay 1218 also opens normally closed contacts 1218B (FIGURE 18), which provide an auxiliary latch path for relay 1824. Normally closed contacts 1218C are opened to eliminate the auxiliary latch path for relay 1828. Contacts 1218D are closed, so that, when required, an auxiliary latch path is provided for relay 1830.

Contacts 1218M of relay 1218 are also closed, thereby enabling the operation of relay 1236. With contacts 1236A and 1218L (FIGURE 12) closed as a result row solenoid $\mathbf{1246_6}$ is excited. This row 6 solenoid is associated with row 6 in the crossbar apparatus employed in the Memory II, deck 1. The path which permits this excitation may be followed from the power source through the normally closed contacts 1234B, contacts 1218H, stepping relay 1720C, through the column bus which is connected to the No. 2 terminal on deck C, through contacts MII6A2 and the row 6 bus through contacts 1218L and 1236A. Stepping relay 1720 has stopped at the second contact position, because there were at least two full band-pairs assigned to the tape (tape 6) to which band-pair 2 is assigned. The setup of the crossbar apparatus to provide the path described significant of this fact will be described later.

The application of an energizing current to row solenoid $\mathbf{1246_6}$ results in the off-normal contact $\mathbf{1246_6A}$ being closed. This enables the application of current to zero column solenoid $\mathbf{1242_0}$ over the path provided by relay contacts 1218AP. Also, through contacts 1218N the column 19 solenoid $\mathbf{1242_{19}}$ is energized. The energization of column solenoid $\mathbf{1242_{19}}$ causes closure of the contacts $MII6A_{19}$ at the co-ordinate intersection between column 19 and row 6. This represents the fact that tape 6 is the one for which the two or more full band-pairs have been found. These contacts $MII6A_{19}$ provide a latch path for the row solenoid $\mathbf{1246_6}$ through relay contacts 1236A, contacts $MII6A_{19}$, the column 19 bus, and over to relay contacts 1218K. The column 19 bus is connected to assist in providing latching paths for all the even-number row solenoids when the associated column 19 crossbar contacts are closed. The zero-column bus provides latching paths for the row solenoids in the odd-numbered rows.

With the operation of solenoids $\mathbf{1242_0}$ and $\mathbf{1242_{19}}$ the off-normal contacts $1242_0A$ and $1242_{19}A$ are closed, thereby energizing a path for relay 1234. When relay 1234 operates, it opens contact 1234B, through which power was applied to the stepper arm 1720C. Accordingly, even though the stepper switch 1720C may be moved further in other sequences, no power will be applied to the column busses of deck 1 of Memory II. Referring to FIGURE 18, further advance of the stepper 1720 beyond terminal 2 was prevented because relay 1218 was operated and through its contacts 1218F (FIGURE 17) held relay 1714 latched up. Now, with relay 1234 being operated, its normally closed contacts 1234A, which are in the latching path for relay 1714, are opened, thus enabling the release of relay 1714. When relay 1714 opens, the resumption of a stepping operation may then proceed. The stepping sequence is described in the description of FIGURE 17.

The stepper 1720 then continues to advance for the purpose of finding the filling band-pair which is assigned to the tape onto which it has been determined to empty the filled band-pairs. This is the second sequence previously mentioned. It will be recalled that Memory II represents the band-pair-to-tape assignments by the closed contacts. It was shown above that contacts $MII6A_{19}$ are closed in column 19 of deck 1 of Memory II, which are representative of the tape upon which it is desired to empty the band-pair. It will be recalled that a latch path is provided for holding energized the row solenoid for row 6. The same latch path will also energize the row 6 bus. From the row 6 bus, current will flow to all the column busses which are connected to the row busses by closed contacts at the intersection of the column and row which represent the assigned band-pairs to tape 6. Thus, contacts $MII6A_2$ are closed, contacts $MII6A_{14}$ are closed, and contacts $MII6A_{18}$ are closed. These three closed contacts are indicative of the fact that band-pairs 2, 14, and 18 are assigned to tape 6.

The column busses are each connected between corresponding terminals of decks C and H of relay 1720 respectively through normally closed relay contacts 1401A through 1418A of the fill-empty switch relays. It was described previously that whenever a band-pair was filled the fill-empty relay for that band-pair is energized, thus switching the magnetic transducer heads for that band-pair from the fill to the empty position. When a fill-empty relay is not energized, the magnetic transducer heads are connected for writing data. Using the hypothesis represented in FIGURE 6 which is indicative of Memory I, all the tracks of band-pairs 2 and 14 are filled, and band-pair 18 is filling. Therefore, fill-empty relays 1402, 1414 are operated and their normally closed contacts 1402A and 1414A are open, whereas fill-empty relay 1418 is unoperated and its normally closed contacts 1418A are closed.

Figure 17:
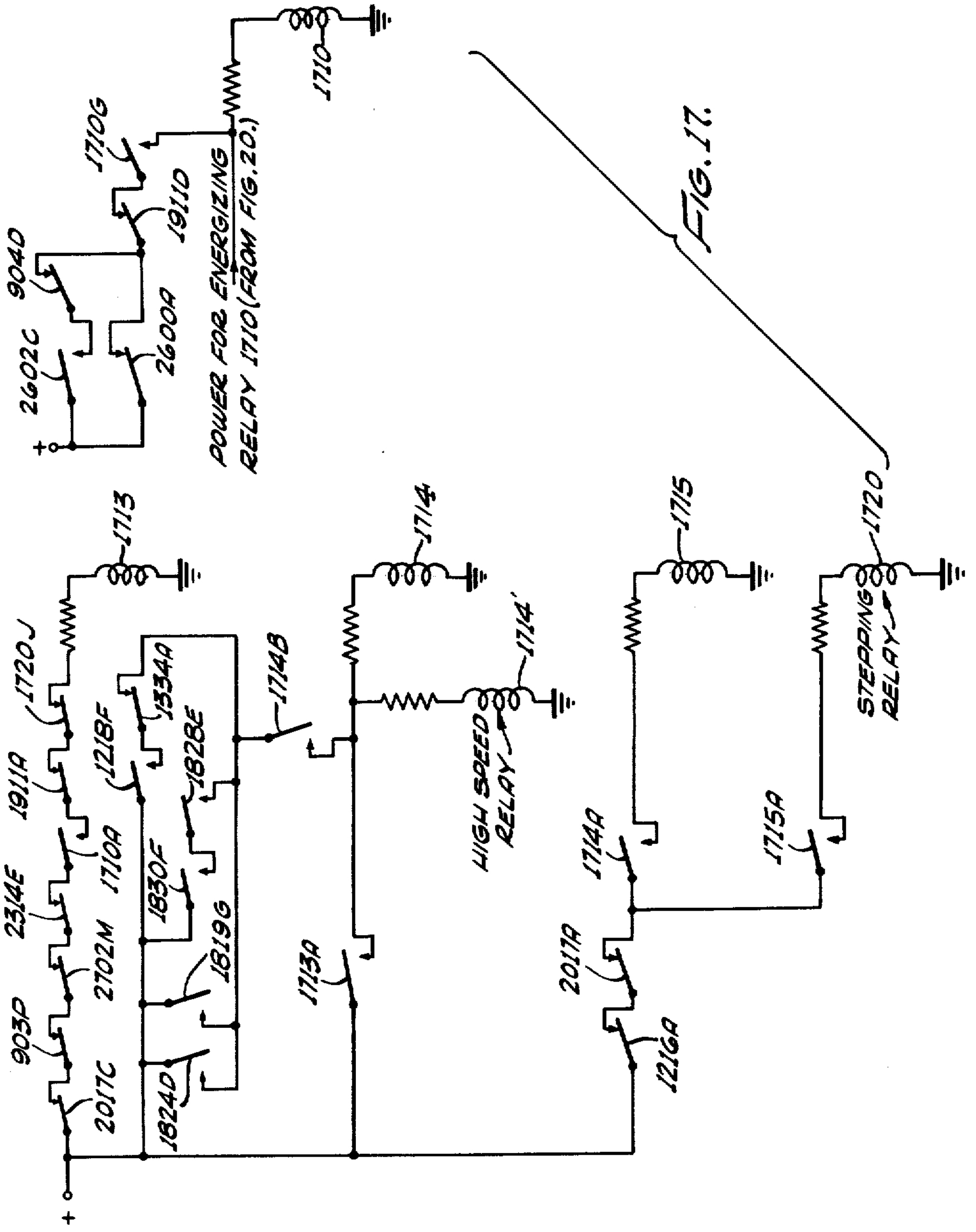

In the course of its stepping operation, deck H of relay 1720 will sense the energized column bus 18 and will pass over busses 2 and 14. Power will then go through the movable arm 1720H through contacts 1032N, 1714C, and 2600B and also through contacts 1713C, which are now closed, to energize relay 1216. A latching path for relay 1216 is provided through contact 1216B. The first result of energizing relay 1216 is to open normally closed contacts 1216A (FIGURE 17) to prevent further stepping pulses being applied to the solenoid of relay 1720. A second result which occurs when relay 1216 is operated is to energize relay 2017 (FIGURE 20) through contacts 1216C, whereby a latching path is also provided through contacts 1710J, 1911E, and contacts 2017B. In FIGURE 17, normally closed contacts 2017A and 2017C are opened as a result of the operation of relay 2017 to further insure that stepping relay 1720 will not be energized in the event relay 1216 is subsequently de-energized and to de-energize relay 1713 by opening the energization path thereto. Since, referring again to FIGURE 12, contacts 1713C are opened by the de-energization of relay 1713, relay 1216 is now de-energized. The energization of relay 2017 also serves to close a pair of contacts as will be described later, which provides a signal to Sequencer D to enable it to function to connect one or two band-pairs for emptying. What has been described is the operation sequence whereby the stepping relay 1720 is stopped at a position representative of a filling band-pair.

Figure 21:
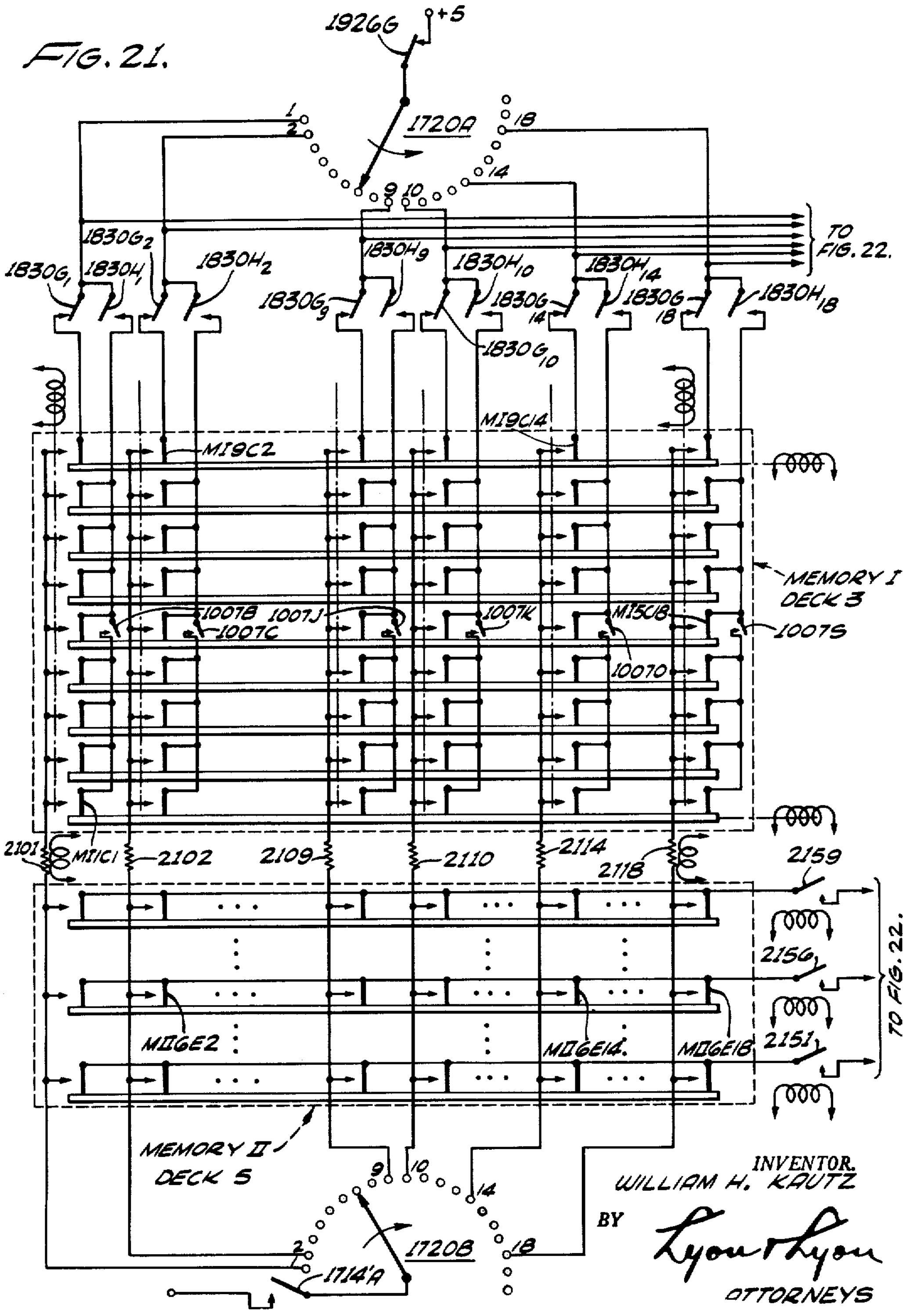

The apparatus to be described now is that which is involved in the actual scanning or quizzing of the information which is stored in the crossbar-switch apparatus. That is, since the switching crossbar apparatus contains information as to the state of fullness of the various allotted storage areas on the drum, the apparatus to be described now is that which actually searches through that information. The result of a successful quiz will be to apply power to operate relay 1218, shown in FIGURE 12. As shown in FIGURE 21, decks 5 of Memory II and 3 of Memory I are involved in the first phase of the search. Deck 5 of Memory II has column busses and row busses which may be interconnected via any of the contacts at the intersection being closed. Each column bus has one end connected to an associated terminal on deck B of relay 1720. The other end of each bus is connected through a resistor 2101–2118 to one end of an associated column bus on deck 3 of Memory I. It is to be assumed that deck 5 of Memory II is a representation of the illustration of Memory II shown in FIGURE 7. Thus, the closed contacts shown on deck 5 of Memory II represent that band-pairs 2, 14, and 18 are assigned to tape 6. For simplicity in drawing and explanation, only a few of the rows and columns are shown here. Deck 3 of Memory I has no row busses, only column busses. However, the contacts for this deck are closed to represent the configuration shown in FIGURE 6 for Memory I. Thus, contacts at row 1, column 1 (MI1C1) are closed, indicative of the fact that track 1 in band-pair 1 is filling on track 1, also contacts at row 9, column 2 (MI9C2) are closed, indicative of the fact that band-pair 2 is filled, etc. Thus, all the tracks are full for band-pair 2. The band-pair conditions with which we are concerned here and concerning which the explanation that follows will be made by way of illustration is band-pair 14. For band-pair 14 it will be seen that since all its tracks are full, the contacts MI9C14 will be closed. It should be further noted that band-pair 18, which was also mentioned previously, is now in the process of filling on track 5, and the contacts at column 18, row 5 (MI5C18) will be closed.

In FIGURE 21, it will be seen that contacts 1714'A couple a −28 volt source to the selector arm 1720B. Therefore, every time that relay 1714' operates, which is once for every successive step of the selecting switch, its contacts 1714'A apply −28 volts to the selector arm of the B deck of stepping relay 1720. Relay 1714' is in parallel with relay 1714. It is a high-speed relay and operates to open or close ahead of relay 1714. Accordingly, in being stepped around, each terminal of 1720B will apply −28 volts to each one of the columns in sequence.

Stepping arm 1720B is shown in a position wherein the voltage is applied to terminal 2, which is distributed by means of the second column bus. Through the closed contacts MII6E2, corresponding to tape 6, band-pair 2, the voltage is applied to the row bus, and through contacts MII6E14 and MII6E18, representing the assignment of band-pairs 14 and 18, voltages are distributed to the column bus 14 and the column bus 18. These voltages which are applied to the column busses, in turn, are applied through resistors 2102, 2114, and 2118, which are in series with each of these column busses, respectively, to the corresponding columns 2, 14, and 18 of Memory I, deck 3. The contacts in deck 3, Memory I, which are closed along the columns which have been energized, will pass voltages therethrough to the subsequent apparatus. As pointed out previously, deck 3 of Memory I has no row busses. However, the contacts in rows 1 through 4 for each column are connected instead to one terminal of an associated manually operated switch 2131–2148. The row contacts 4 through 8 in each column are respectively connected to the swinger arm of each switch 2131–2148 and also to the normally open contacts $1830H_1$–$1830H_{18}$ of relay 1830. The ninth row contacts are each respectively connected to the normally closed contacts $1830G_1$–$1830G_{18}$ of relay 1830. Each of the contacts $1830G_1$, $1830H_1$–$1830G_{18}$, $1830H_{18}$ is connected to an associated terminal of the selector relay 1720A, the selector arm of which is connected through normally closed contacts 1926G to a +5 volt source. For the position shown for selecting relay 1720, +5 volts is applied through normally closed contacts $1830G_2$ and through contacts MI9C2 to the second column bus to the top of resistor 2102. Thus, current can flow through this resistor since its other side is connected through the column bus and relay 1720B and through contacts 1714'A, when closed, to the −28 volt source.

Figure 22:
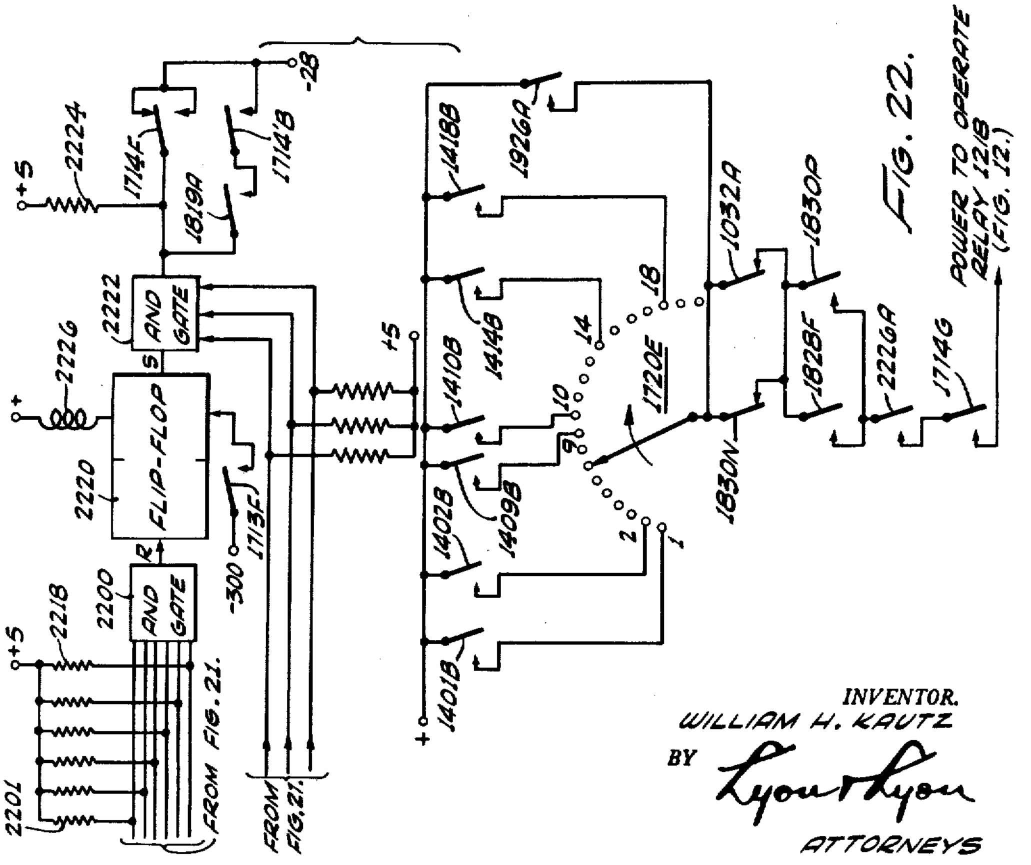

At this time, it should be noted that each one of the terminals on deck A of relay 1720 is also connected through leads L1 through L18 to an AND gate 2200 shown on FIGURE 22. Each one of these leads is connected to a +5 volt source through a different resistor 2201–2218. AND gate 2200 does not open to apply a reset signal to flip-flop 2200 unless all the inputs are positive. All the leads which connect to contacts in the ninth row of deck 3 of Memory I, which are open are at +5 volts. For example, in column 18, contacts MISC18 are closed and thus lead L18 is at +5 volts. Lead L2 is at +5 volts also, despite the fact that contacts MI9C2 are closed because it is connected via terminal 2 of 1720A to the +5 volt source. However, lead L14 is not positive, since it is connected to the −28 volt source via contacts $1830G_{14}$, MI9C14, the column 14 bus, resistor 2114, contacts MII6E14, the row 6 bus, contacts MII6E2, and through 1720 B and contacts 1714'A to the −28 volt source. The values of the resistors 2201–2218 are chosen large compared to the value of resistors 2101–2118, so that when current flows through any of the resistors 2201–2218 the value of the voltage at the corresponding lead is nearer the −28 volt value than the +5 value. Accordingly, with the connections shown, lead L14 is negative and AND gate 2200 is not opened to reset AND gate 2220. Thus, with the conditions shown AND gate 2200 will not be able to reset flip-flop 2220 at any position of sequencing relay 1720.

Each one of the row busses on deck 5 of Memory II is connected through separate contacts 2151 through 2160 and through separate leads L21 through L30 to an AND gate 2222. The contacts 2151 through 2160 and their operation will be described subsequently herein. The leads L21 through L30 have +5 volts applied thereto through separate resistors. The voltage level on all the leads L21–L30 when the contacts 2151 through 2160 are open is positive. However, there is still another input to AND gate 2222. This other input applies −28 volts to the AND gate through a normally closed contact 1714F of relay 1714. Also, +5 volts are applied to the same input through an isolating resistor 2224 having a high resistance value. It will be noted that contact 1714F is a single-pole, double-throw contact. Therefore, when relay 1714 is not operated, a connection is made through the normally closed contacts of the relay and when relay 1714 is operated a connection is made through the other, or normally open, contacts of the relay. However, during the transition between the normally closed and normally open contact positions there is an interval during which no connection is made to the −28 volt source. During the interval the eleventh input to AND gate 2222 will be biased positive through the +5 volt source. At that time an output from AND gate 2222 is obtained which serves to set flip-flop 2220.

Relay contacts 1713F, when closed, are connected to a −300 volt source. The contact 1713F is not closed until just prior to the operation of relays 1714′ and 1714. This can be seen if reference is made to FIGURE 17 and to the description of the stepping sequence of these relays. When −300 volts is applied to the flip-flop 2220, it drives it to the reset condition, so that upon an output being received from AND gate 2222 it can be subsequently set. It should also be appreciated that since it is a higher speed relay, relay 1714′ operates prior to relay 1714. Thus, the output from AND gate 2200, which is normally positive, or resetting, is cut off just prior to the application of the setting input from AND gate 2222.

In summary, an output is derived from AND gate 2200 in the absence of a negative voltage being applied to the selector arm of deck B of selecting switch 1720. Thus a reset output is derived normally from AND gate 2200. Also, whenever relay 1713 operates, it closes its contact 1713F to insure that the flip-flop 2220 is in its reset condition. Thereafter, if an output is received from AND gate 2222 as a result of the subsequent operation of relay 1714, the flip-flop is driven to its set condition. In its set condition, it operates a relay 2226.

Reference is now made to deck E of stepping switch 1720 shown in FIGURE 22. The terminals of deck E are each connected through the respective fill-empty relay contacts 1401B–1418B to a source of potential. Contacts 1402B, which are part of the fill-empty switch circuit relay for band-pair 2, are in the closed position, since band-pair 2 is ready for emptying. Thus, power is applied through contacts 1402B, selector arm 1720E, normally closed contacts 1830N, through contacts 1828F of relay 1828, which, it should be recalled, is kept operated during the first searching cycle, through contacts 2226A of relay 2226, which has just been closed, and through contacts 1714G, which are closed with the stepping along of the stepping switch relay. The contacts 1714G are connected to relay 1218 (FIGURE 12), and thus power is applied to operate relay 1218.

Reference is now made to FIGURE 21. The contacts 2151 through 2160 are respectively associated with the 10 magnetic tape transport apparatuses in a manner so that if the tape transport is busy being used for other operations the associated contact is closed. This applies an inhibiting voltage to AND gate 2222, thus preventing flip-flop 2220 from being set and relay 2226 from being operated. It should be noted that this occurs only when the particular busy tape transport is required by reason of the selection of that tape through stepping switch 1720.

Attention is now directed to relay contacts 1714′B and 1819′A in FIGURE 22, which provides an auxiliary path from the −28 volt source to the input to AND gate 2222. These contacts are used to prevent an erroneous successful surveillance type of operation from occurring during the intervals when the selecting switches are changing over from the first to the second cycle of the search sequence, or from second to third, or from third to fourth. Relay 1714′ is in parallel with relay 1714 and relay 1819′ is in parallel with relay 1819. Both relays 1714′ and 1819′ are high-speed relays and both close and open before relays 1714 and 1819 can do so. This assures that when the decks F and A respectively of stepping switches 1720 and 2410 are lined up, there will be no inadvertent operation of AND gate 2222 to set flip-flop 2220.

In the first search cycle, it is necessary to find at least two band-pairs which are filled and which are assigned to a single tape. If during this first search cycle the two band-pairs are not filled, no path will be provided from the −28 volt source through the B deck of relay 1720 through the crossbar-switching apparatus of Memory II, deck 5, and Memory I, deck 3, along the leads L1 through L18 to AND gate 2200. Thus, flip-flop 2220 remains held at reset and immediately returns to the reset condition, no matter what other operations are applied thereto. Even though flip-flop 2220 may be driven to a set condition, there is a further requirement before relay 1218 becomes operative indicative of a successful surveillance that a path be provided through deck E of stepping switch 1720 from the positive potential source through one of the fill-empty switch contacts 1401B through 1418B and through the subsequent relay contacts in series with the selecting arm of deck E to relay 1218.

The description that follows will cover the second searching cycle of operation wherein it is desired to find at least one and one-half band-pairs assigned to a tape which are in condition to be emptied. By one and one-half band-pairs in condition to be emptied is meant that one complete band-pair consisting of eight tracks is filled and ready to be emptied and the second band-pair has more than four tracks filled. The data may still be in the process of being applied to the remainder of the tracks in that second band-pair. Referring to FIGURE 21, assume, for the purposes of illustration, that contacts MI9C2 and MII6E2 are open and the other contacts previously mentioned, namely, MII6E14, MI9C4, MII6E18, and MI5C18, are closed. This is the situation which occurs when band-pairs 14 and 18 are assigned to tape 6 but only band-pair 14 is filled, band-pair 18 is now filling on track 5.

The stepping switch 1720 steps along and no other operation occurs until its contacts are positioned at terminal position 14. At this time, the same operation as was previously described occurs, with the exception that at this time relay 1830 is operated or closed. Therefore, its normally closed contacts are all open and its normally open contacts are all closed. Therefore, a negative bias will be applied to AND gate 2200 through lead L18. With the selecting arm 1720E of the relay stepping switch also on position 14 and with fill-empty switch 1714B closed, power will be applied through the following contact sequence to operate relay 1218. This sequence includes contacts 1032Q, which is a normally closed contact, 1830P, which is now operated closed, contacts 2226A and 1714G. Thus, the operation which occurs when a successful surveillance happens during the second cycle has been described.

Next, assume the situation where the second cycle of the search has been unsuccessful and it is desired to look for one band-pair which is filled. For these conditions, assume that band-pair 14 is not filled and is not assigned to tape 6 and that band-pair 18 is assigned to tape 6 but is filling on some track lower than the track 5. Thus, contacts MI9C14 and MI5C18 are open, also, contacts MII6E14 are open. However, contacts MII6E2 and MI9C2 are closed, representative of the fact that band-pair 2 is filled, and contacts MII6E18 are closed, representative that band-pair 18 is still filling. Now, when the stepper switch 1720 reaches the second contact position −28 volts will be applied through the selecting arm 1720B up through contact MII6E2 to both the column and row bus. The row bus will apply this voltage to contact MII6E18, which, in turn, connect to the column bus. But there are no other closed contacts connected to that column bus, and so nothing occurs at column bus 18.

Closed contacts MI9C2 through normally closed contacts $\mathbf{1830G_2}$ (since relay 1830 is not operated during this search cycle, these contacts are closed) applies a negative voltage to the lead L2 to AND gate 2200. Thus, the inhibit output of AND gate 430 is removed and flip-flop 2220 can be driven.

Since relay 1926 is operated during the third cycle of search, the +5 volts is not applied but a negative voltage exists at terminal 2 of deck A of stepping switch 1720 by virtue of the fact that the normally closed contacts 1926G, through which +5 volts are applied, are now open. Referring now to deck E of stepping switch 1720 (FIGURE 22), since relay 1926 is operated, then contact 1926H is closed. Therefore, all the fill-empty switches are bypassed and an operating potential is applied directly through the contacts 1032Q, 1828F, 2226A, and 1714G to apply power to operate relay 1218.

A fourth search cycle is instituted after three unsuccessful search cycles. In the fourth cycle, what is being sought is a more than half-filled band-pair which is assigned to a tape. For the purpose of such condition, let it be assumed that tape 6 has only band-pair 18 assigned thereto, which is filling on track 5. Therefore, contacts MII6E18 and MI5C18 are closed, and, although other band-pairs are filling, all of them are less than half full. Nothing occurs until stepping switch 1720 arrives at its position 18, at which time −28 volts is applied to the selector arm on deck B through terminal 18 up through the column connected to switch contact MII6E18. Since no other contacts are connected to the row bus, the voltage does not go any further than that row bus. However, the −28 volts is applied through contacts MI5C18, contacts $\mathbf{1830H_{18}}$ (relay 1830 being operated during this cycle), to lead L18. Since relay 1926 is also operated during the fourth searching cycle, holding open contacts 1926G, no +5 volts are received. Thus, AND gate 2200 will have its output inhibited and then flip-flop 2220 can be set by AND gate 2222 to operate relay 2226. Since relay 1926 is operated during this cycle, relay contacts 1926H bypass the selecting switch deck E of stepping switch 1720, and the operating voltage to relay 1218 is applied through contacts 1032Q, 1830P, 2226A, and 1714G.

At the end of the day, or at any given period of time, it may be desired to empty the contents of the drum onto tape, regardless of what the condition of the various band-pairs and their respective tracks may be. To achieve this, the manual switch 1007, which has ganged contacts 1007B through 1007S, is operated. This serves the function of connecting one side of the contacts on deck 3 of Memory I, which are representative of tracks 1 through 4, to one side of the contacts 5 through 8. Thus, the apparatus can proceed to empty these tracks in sequence, as the stepping switches progress, onto the tapes to which the band-pairs are assigned. After the drum has been emptied onto the assigned tapes, the manual switch is opened.

Figure 23:
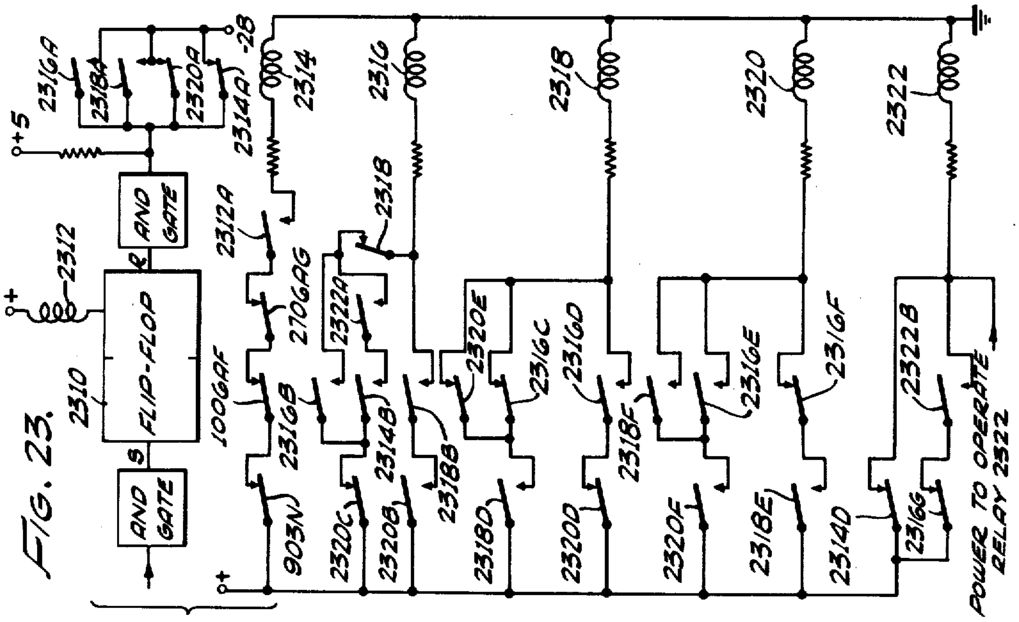

The description that follows is that of the operation whereby band-pairs which have just been emptied are released from their assignment so that they may be re-assigned in the future when required, either by the operation of Sequencer B or Sequencer E. Referring now to FIGURE 23, a signal for initiating reassignment originates in the tape control apparatus 228 when the writing from the drum has been completed, which is at the end of a transfer operation from drum to tape. This signal is applied to a flip-flop 2310. The flip-flop then operates relay 2312. The operation of relay 2312 closes contacts 2312A, thus causing relay 2314 to be operated. It will be recalled that the column solenoids in Memory II are latched in by an auxiliary latch path, once the column solenoids are excited. This may be seen in FIGURE 15, for example, where coils $\mathbf{1442_1}$–$\mathbf{1442_{10}}$ represent column solenoids in Memory II. Assume that band-pairs 9 and 10 have just been emptied onto the tapes. Therefore, these band-pairs are ready for reassignment. Column solenoid $\mathbf{1442_9}$ is latched through a path including its off-normal contact $\mathbf{1442_9}$A; solenoid $\mathbf{1442_{10}}$ is latched through a path including its off-normal contact $\mathbf{1442_{10}}$A. Two stepping relays 2416 and 2412 are located in Sequencer D. These stepping relays are always at the position of a band-pair which has just been emptied out. In other words, they are located at the position of that band-pair at the time Sequencer D is operated. Consequently, since band-pairs 9 and 10 have just been emptied, the movable arm at deck B of relay 2416 will be on contact 10 and the movable arm at deck B of relay 2412 will be on contact 9. A shorting path is thus provided when relay 2314 is operated for the power-holding solenoid coils $\mathbf{1442_9}$ and $\mathbf{1442_{10}}$ from the source of holding potential through contacts $\mathbf{1442_9}$ and $\mathbf{1442_{10}}$ through contacts 2314BI and 2314BJ through the respective 9 and 10 terminals on relays 2412B and 2416B through contacts 2314L to ground. Thus, the solenoid column coils are rendered inoperative and the column crossbars 9 and 10 are released. When the column solenoids in Memory II are no longer excited, they, of course, open all of the off-normal contacts associated with them. It should be recalled that in previously describing the latching path for the column solenoids in Memory I in FIGURE 8, these paths involved the off-normal contacts of associated solenoids in Memory II. Thus, the release of solenoids in Memory II open associated off-normal contacts which, in turn, opens the latching paths for the correspondingly associated column solenoids in Memory I. In the illustration provided above, when column solenoids 9 and 10 in FIGURE 15 are released, there is a corresponding release of the associated column solenoids 9 and 10, which are shown in FIGURE 12. Band-pairs 9 and 10 are now released and may be reassigned by Sequencer B as required for incoming data.

The description that follows is the operation for initiating a surveillance operation when any band-pairs are only more than half filled. Referring back to FIGURE 23, the operation of relay 2314 also starts a relay-timing operation which involves a sequence of relays 2316, 2318, and 2320. Relay 2316 is closed first over a path which involves normally closed relay contacts 2320C, relay contacts 2314B, normally closed relay contacts 2318C, and relay contacts 2322A. Relay 2322A is operated at this time. This relay is a part of Sequencer D, and its operation will be explained subsequently. When relay 2316 operates, its latches up over a latch path involving contact 2316B and normally closed contacts 2320C and 2318C.

Relay 2322, which had been closed previously, was latched through a path involving contacts 2322B and normally closed contacts 2316G. The normally closed contacts 2316G are now opened by the operation of relay 2316, thus releasing relay 2322 and opening its contacts 2322B. Relay 2318 is operated over the path involving contacts 2320D and 2316D, thereby enabling a latch path through contacts 2320E and 2318D. When relay 2318 operates, it breaks the latch path for relay 2316 by opening the normally closed contact 2318C. When relay 2316 opens, a path to operate relay 2320 is completed through contacts 2318E and normally closed contacts 2316F. A latch path for relay 2320 is provided through contact 2318F and contacts 2320F. Relay 2320 closes its contacts 2320B, thereby operating closing relay 2316 through contacts 2318B. This breaks the latch path for relay 2318, since it opens the normally closed contacts 2316C. By releasing relay 2318, relay 2316 is rendered inoperative, since contacts 2318B are opened. Contacts 2318F and 2316E are now open, as well as contacts 2318E. Thus relay 2320 is now released.

The reset input of flip-flop 2310 may have −28 volts applied thereto via normally closed contacts 2314A and 2320A or via normally open contacts 2316A and 2318A. This holds the flip-flop in the reset condition. In the sequence of operation which has just been described, a condition will arise where the normally closed contacts are open and the normally open contacts remain open. At this time, the −28 volt source is disconnected from the flip-flop and the flip-flop is reset by the +5 volt being applied from the source connected thereto. This situation arises just before relay 2320 is released in the previously described cycle. Reset of flip-flop 2310 renders the relay 2312 inoperative, which, in turn, renders relay 2314 inoperative.

Upon the reset of the flip-flop 2310, which renders inoperative relay 2312 and relay 2314, all conditions but two are met, which will enable power to be applied to relay 1710 (FIGURE 17), the energization path for which is shown on FIGURE 20. It will be recalled that relay 1710 is the relay which initiates the operation of the Sequencer C quizzing cycle. These two further conditions will now be described. The first of these two further conditions is the operation of a manual switch 2010, as shown in FIGURE 20, after which the sequencer is enabled to operate automatically. The second condition is the operation of relay 2012 so that contact 2012A should be closed. This operation of relay 2012 occurs as a function of the energization of the row busses 5 through 9 of the crossbar-switching apparatus for Memory I, deck 4. Thus, a path is provided for energizing relay 1710, which starts the Sequencer C quizzing cycle. Deck 4 of Memory I has all the columns of contacts connected to column busses and all the rows of contacts connected to row busses. All the column busses are brought out to a source of power. Row busses 5 through 9 are brought up to relay 2012. Therefore, closure of any contacts in these rows and columns energize relay 2012 and indicate that a band-pair is filling on tracks 5 through 8 or has already been filled. These connections are made in the event that it is desired to initiate a surveillance operation when any band-pairs are more than half filled to provide for the emptying of those band-pairs.

Rows 1 through 4 of Memory I, deck 4, have their row busses connected in common and brought out to manual switch contacts 1007T, the other side of which is connected to the busses for rows 5 through 9. Switch contacts 1007T are part of manual switch 1007, having contacts 1007B through S shown in FIGURE 21. When the switch is closed, it enables the complete emptying of the band-pairs from the drum to tape.

*Sequencer D and Band-Pair Selecting Switches*

If Sequencer C has made a successful search, it issues a signal to Sequencer D 230 in response to which Sequencer D operates proper ones of the band-pair-selecting switches 232 on the tape side of the drum to empty the selected band-pair onto tape. If the band-pair selected for emptying was only partially filled, then Sequencer D emits a signal to Sequencer A, telling it to assign another band-pair to the incoming data. It was stated previously that when relay 2017 was operated, this provided a signal which initiated the operation of Sequencer D. Sequencer D first functions to connect the drum heads for obtaining readout of the band-pairs which are the next to be emptied onto a tape. The relay circuits for Sequencer D are shown in FIGURES 24 and 25, to which reference is now made. First, stepping switches 2410 and 2412 are advanced to the position of the first band-pair to be emptied and then stepping switches 2414 and 2416 are advanced to the position of the next band-pair to be emptied.

It will be recalled that stepping switch 1720 was left, at the end of its operation in Sequencer C, at the position of the filling band-pair, which is assigned to the tape onto which a band-pair is to be emptied. Stepping switches 2410 and 2412 are stepped past this position of the filling band-pair to the position of the filled band-pair, which is to be emptied onto this tape. It should be noted that the reason for seeking the first filled band-pair after the one that is filling is that in this manner the band-pairs are emptied onto the tape in the same sequence as the one in which they were filled on the drum. Following out the requirement for emptying band-pairs in the sequence in which they were filled, stepping switches 2414 and 2416 are stepped through the positions occupied by stepping switches 2410 and 2412 to seek the next filled band-pair positions after the band-pair selected to be emptied onto that tape. This completes the operation of Sequencer D.

Considering FIGURE 24, relay 2420 is operated over a path from a source of potential through contacts 2017J, contacts 2422A, contacts 2424A, contacts 2412K, contacts 2410K, to the coil of relay 2420. This closes contacts 2420A, which completes a path to operate relay 2424. Relay 2426 is next operated over the path including now closed contacts 2424C and normally closed contacts 2430A and 2422B. The operation of relay 2426 enables the application of power to the two stepping relays 2412 and 2410 through contacts 2426A and through contacts 2430A and 2422B. The operation of solenoids 2412 and 2410 of the stepping relays causes the opening of normally closed off-normal contacts 2412K and 2410K, which are associated therewith. This, in turn, opens the power path to the coil of relay 2420, whereby it is released. The de-energization of relay 2420, in turn, causes the de-energization of relay 2424, whereby power is then removed from relay 2426, which, in turn, removes power from the solenoid coils 2410 and 2412, thus permitting the stepping switches to advance one step. The cycle of operation which has just been described will continue in the manner described until the stepping switches reach the position which is representative of a band-pair which is filling.

Referring back now to FIGURE 18, it will be seen that when the moving arm 2410A of stepping relay 2410 attains a position corresponding to the band-pair which is being filled, a path is completed through the connection with the F deck of relay 1720, back to relay 2428 (FIGURE 24). This completed path may be traced through contacts 1830Q, 2420C to the coil of relay 2428. When relay 2428 operates, it is latched up over contacts 2428A and 2017C to the power source. The stepper relay 2410 continues to advance, however, until it reaches the position of the first band-pair, which is filled after the filling band-pair. At this time, relay 2430 is operated over a path which is as follows (FIGURE 24): the contacts 2017K, contacts 2428A, 2420C, 1830Q, 2420B, through the solenoid of relay 2430 to contacts 2428B, contacts 2448B, to B-deck selector of switch 2410 (2410B), through the terminal 2 for this illustration of the operation down through fill-empty contacts 1402G to crossbar column bus 2 for Memory II, deck 3, contacts MII6C2, which are at the intersection of row 6, column 2. The row 6 bus then connects to ground via the contacts MII6C0 which are connected to the column zero bus, which is connected to ground. It should be recalled at this time that contacts MII6C0 on row bus 6, column zero, were closed previously when relay 1218 was closed during the operation of Sequencer C. Thus, relay 2430 is operated when sequencer switch 2410 reaches the filled band-pair position assigned to the tape. It should be noted here that the terminals on deck B of stepper 2410 are connected to the corresponding terminals of deck B of stepper 2412. These are then connected through fill-empty relay contacts to corresponding column busses of Memory II, deck 3. Relay 2430, when operated, opens up the normally closed contacts 2430A, whereby the power path to the stepping relays 2410 and 2412 is opened and further advance is prevented. When operated, relay 2430 operates relay 2422 over its contacts 2430B. Relay 2422 latches up over contacts 2422C and 1710M. The operation of relay 2422 opens its normally closed contacts 2422B in series with the stepper switch solenoids 2410 and 2412, thus further assuring that they will not operate, even in the event that relay 2430 may be rendered inoperative, which would close its normally closed contacts 2430A.

Upon the completion of the operation just described, stepping switches 2414 and 2416 are operated to find the next band-pair which is filled after the one which is indicated by the position of the stepping switches 2410 and 2412. The operation of the stepping switches to step forward is performed by an arrangement of relays which are the counterpart of the ones already described for causing the stepping operation of relays 2410 and 2412. Thus, relay 2440 is the counterpart of relay 2420. Relay 2444 is the counterpart of 2424. Relay 2446 is the counterpart of relay 2426, and relay 2510 is the counterpart of relay 2422.

Relay 2440 thus is closed initially by a power path through contacts 2510A, 2422D, 2414L, 2416K, 2414K, to the relay coil. Relay 2444 is energized next through contacts 2440A. This energizes relay 2446 through normally closed contacts 2450A, 2510B, and contacts 2444C. This closes contacts 2446A, energizing solenoids 2414 and 2416. This opens normally closed contacts 2414K and 2416K, thus de-energizing relay 2440. This causes relay 2444 to release, then relay 2446, which de-energizes solenoids 2414 and 2416. The stepping switches 2414 and 2416 thus continue to advance until they reach the position which was attained by the stepping switches 2410 and 2412, at which they stop until paths are completed to cause relay 2448 to be operated. This may be traced over the path through contacts 1926M, contacts 1830T, contacts 2017M, through the A deck of relay stepper 2412, which has its terminals connected to corresponding terminals on A deck of stepper 2416, through the second terminals of these steppers. From there the path continues through contact 1830U, 1926N, 2440C to the relay coil 2448. The relay then latches up through contacts 2448A and 2017K.

Steppers 2414 and 2416 then continue to advance in their search for the next full band-pair to be emptied onto the same tape. In the example chosen, this is band-pair 14. At position 14 for the stepping switches 2414 and 2416, relay 2450 is operated. This stops the further operation of the stepping switches. A path for operating relay 2450 may be traced as follows: through relay 2448 latch path (contacts 2017K and 2448) over contacts 2440C, 1926N, 1830U, 2440D, relay coil 2450, through contacts 2442A, and the arm of stepping switch 2414, deck B, through the terminal position 14, relay contacts 1414G, column 14 of Memory II, deck 3, contacts MII6C14 along the row 6 bus, which connects over contacts MII6C0 to the zero column bus which is grounded.

The closure of relay 2450 also closes contacts 2450B, thus energizing relay 2510. Relay 2510 latches up over the contacts 2510F and 1710V. The operation of relays 2510 further insures that the steppers 2414 and 2416 will not advance further, since contacts 2510B are in series with the power path to these solenoids. It should be further noted that normally closed contacts 2510A and 2510B are also open, thus further insuring the nonoperation of the stepping relay. It should be noted that when relay 2448 was operated, a path was set up for operating relay 2442 over contacts 2017Q and 2442B.

It should be pointed out at this time that as shown in FIGURE 6C additional decks to those shown are employed on each of the four stepping switches 2410, 2412, 2414, 2416 for the purpose of routing data from the selected drum band-pairs to tape. The terminals on these decks are connected to the fill-empty switches, and the selector arms are connected to the subsequent tape-writing apparatus 234. Thus, the reading heads over the selected band-pair on the drum are connected through the fill-empty switches through the selector switches to the tape-writing apparatus for the tapes, into which this data is to be written.

The above description shows how the band-pairs selected for emptying are connected to the external tape-writing apparatus. The actual signal for commencing the emptying operation must now be given. This is shown in FIGURE 26. Relay 2600 is operated when either contacts 2602A or 2512B are closed. This, in turn, closes contacts 2600C and thereby supplies power to relay 2322 shown in FIGURE 23. Relay 2512 is closed by the application of power through contacts 2510G and normally closed contacts 1830W. The operation of relay 2600 also opens its normally closed contact 2600A, whereby relay 1710 is rendered inoperative. When it is operated, relay 2322 closes its contacts 2322F (FIGURE 26), and since normally closed contacts 1710W are now closed, a signal can be applied to tape-writing apparatus, to instruct it to commence the emptying operation.

The operation of relay 2322 provides a signal to the tape-selection leads over contacts 2322G, as may be seen in FIGURE 12. Closure of contacts 2322G enables the application of power through normally closed contact 1218P through the selector arm of the C deck of relay selector 1720, which is now at position 18, that of the band-pair now being filled, up through column bus 18 of Memory II, deck 1, through contacts MII6A18 to the lead, which energizes the selection apparatus to select tape 6. When relay 1710 becomes inactivated, all the relays which are in Sequencer C and Sequencer D, which were previously closed and latched, are opened and restored to the nonoperative condition, except relay 2322, which is maintained closed and latched during the entire band-pair emptying operation.

The descriped operation of Sequencer D is the one which occurs when, as a result of a first cycle of a surveillance operation, two band-pairs are found for emptying which are assigned to a tape, upon which it is desired to empty. The next operation cycle to be described is the one which occurs when, during the second cycle of the surveillance operation, one and one-half band-pairs are found for emptying onto a desired tape. For the purpose of explanation, let it be assumed that the second assumption made in the previous surveillance explanation holds. In other words, band-pairs 14 and 18 are the respective one and one-half band-pairs which it is desired to empty. The operation of stepping switches 2410 and 2412 and their attendant relays is identical with the one described previously; namely, they will move until they reach the position of a filling band-pair and then move beyond that and stop upon reaching the position of the first filled band-pair after the filling band-pair. This will be band-pair 14.

Selector switches 2414 and 2416, however, have a slightly different mode of operation, since they will have to stop at the more than half-filled band-pair 18—that is, the band-pair which has more than four tracks filled.

Relay stepping switches 2414 and 2416 start advancing and continue to advance as before. However, relay 2450 will be energized over a different path than the previous one. It should be recalled at this time that since a successful surveillance has been made during the second cycle, relay 1830 is held operated. Thus, referring to FIGURE 25, a path is provided from the power source over contacts 1926M, 1830X, stepping switch 1720G, position 18, stepping switch 2416A, through contacts 2440D through relay coil 2450. The other side of the relay coil 2450 is connected to ground over contacts 1830Y. The closure of relay 2450 prevents further operation of the relays which cause the stepping switches to advance. Thus, relay steppers 2414 and 2416 are stopped at position 18.

Relay 2510 is operated, as before, through contacts 2450B of relay 2450. A latching path is set up as before through contacts 2510F and 1710V. However, this time relay 2512 is not operated, since relay 1830 is maintained operated. Its normally closed contacts are open, thus preventing the operation of relay 2512. Instead, a path is completed to operate relay 2602 over paths set up by the normally closed contacts 903M, 1140A, and now closed contacts 1830Z and 2510H. A latching path for relay 2602 is established through contacts 2602B over normally closed contacts 1006D and contacts 902K. When operated, relay 2602A enables relay 2600 to be operated over contacts 2602A. The closure of relay 2602 also enables the operation of relay 902 through a path which may be seen on FIGURE 9, comprising contacts 2702L, 1710Y, 1830AB, 2602F, 903C, 1005B, 2706AD, and 1032M. It should be recalled that relay 902 is the one whose operation starts Sequencer A operating to go from a filling track to a position which is indicative of the fact that the band-pair is filled.

The mode of operation just described is one which occurs when it is desired to empty a band-pair which is partially filled. For this reason, it is necessary, as far as the Memory and Sequencer A operation are concerned, to initiate an indication that that band-pair appears like one which has been previously filled. The operation which is now to be described is one which occurs in Sequencer A, following such signal. In order to perform the operation of indicating a partially filled band-pair as a filled band-pair, the operation of Sequencer A must be re-initiated and it must be instructed as to which band-pair is the one to be changed to have a filled indication. Referring to FIGURE 26, a path is presented to the band-pair selecting switches from a source of potential, contacts 1830AA, 1032A through the selecting arm of stepping switch 1720, deck D, via its terminal 18. The terminals of 1720D are respectively connected to the terminals of stepping switch 1004E and through contacts 2600D–2600U to the band-pair selecting relays 1102–1136, shown on FIGURE 11. Thus, the band-pair-selecting relay 1102 for band-pair 18 is energized just as if the band-pair were filled.

In the course of the operation of Sequencer A for the above routine, relay 904 is operated. When this happens, its normally closed contacts 904D (shown in FIGURE 17) open, whereby relay 1710 is rendered inoperative. In view of the fact that relay 2600 has been previously operated, its normally closed contacts 2600A which provided an alternate power path are also open. Thus, a release sequence is initiated, which causes all the relays in Sequencers C and D to release except relay 2322, which remains operated during the band-pair emptying operation.

Sequencer A continues to operate, and when it completes the operation of indicating that a half-filled band-pair is to be emptied in the same manner as a filled band-pair, it signals Sequencer B to selected the next band-pair for filling with incoming data. In the course of such operation, relay 1006 is operated, which opens up its normally closed contacts 1006D (FIGURE 26), whereby the latch path of relay 2602 is opened. When relay 2602 is rendered inoperative its normally open contacts 2602A which provide a latch path to relay 2600 are opened, and thus relay 2600 is inactivated.

The description that follows is that of the operation of Sequencer D, assuming a successful search has been made during the third cycle of the searching operation by Sequencer C. The same assumptions are to be used here as were made in the description of Sequencer C to illustrate the third cycle of operation. Thus, band-pair 2 is a filled band-pair, band-pair 14 is unassigned, or assigned to another tape, and band-pair 18 is filling on a track lower than track 5. It is therefore required to advance stepping switches 2410 and 2412 to the position of band-pair 2. Since only band-pair 2 will be emptied on tape, it will next be required to advance stepping switches 2414 and 2416 to a neutralized, or dead, position, which is position 19 on the stepping switches.

The operation of stepping switches 2410 and 2412 to the band-pair 2 position occurs in the same manner as was described previously for going to the first band-pair to be emptied after a filling band-pair. After this, relay stepping switches 2414 and 2416 are stepped and continue to advance in the manner previously described. However, their stopping relay path is a bit different. Relay 2450 performed the stopping operation previously. It should be recalled at this point that in a successful third cycle of search, relay 1926 is closed but relay 1830 is not closed. A path is provided from a source of potential through relay contacts 1926P through terminal 19 of the deck A of selector switch 2416, through its selector arm via contacts 2440D to relay coil 2450, and to ground over contacts 1926Q. Thus, relay 2450 is operated when a contact is made with position 19 of the selecting switch 2416A. In turn, as before, relay 2450 prevents further operation of stepping relays 2414, 2416. Relay 2450 also operates relay 2510 over contacts 2450B, thus setting up its previously described latching path. The release of relay 1710 and the operation of relay 2512 occurs in the same manner as was described previously for a successful search during the first cycle. In addition, power is applied through contact 2510C and position 19 of deck A of stepping switch 2414 (FIGURE 25) to operate relay 2534, which latches through contacts 2534A and 2314Q. Contacts 2534B provide a signal to Programmer B to indicate that only one band-pair, instead of two, is being emptied.

The above describes the operation of Sequencer D as a result of a successful search during a third search cycle. The following description is that of Sequencer D as a result of a successful search during the fourth search cycle. It will be recalled that in the fourth cycle it is sought to find a band-pair which is more than half filled and which is assigned to a tape into which it is desired to be emptied. In accordance with our previous assumptions during the fourth cycle of search, band-pairs 2 and 14 were assigned to other tapes and band-pair 18 was filling on track 5. Accordingly, it is desired to operate the selector switches 2410 and 2412 until they come to rest on terminal 18, which corresponds to the filling band-pair it is desired to empty. It is desired to operate selector switches 396 and 398 until they come to rest on the dead position, which is terminal 19. Selecting switches 2410 and 2412 are stepped along in the manner previously described. However, the stopping path is different. With reference to FIGURE 18, when the selector arm of deck A of selecting switch 2410 reaches terminal 18, it completes a path from a potential source through deck F of stepping switch 1720, position 18 to contacts 2420B (FIGURE 24) to relay 2430. The other side of the coil of relay 2430 goes through contacts 1926R and 1830AC to ground.

Following the operation of relay 2430, the stepping switches 2410 and 2412 are stopped on the terminal at which this operation was initiated. Stepping relays 2414 and 2416 will continue to operate in the manner previously described until they reach the dead position on contacts 19, at which time they will be stopped. When relay 2450 operates, stopping the further movement of the stepper switches 2414 and 2416, relay 2510 is operated and initiates a sequence of relay operations in the same manner to send a signal to Sequencer A, to instruct it to indicate that the band-pair 18 is to be considered as filled and to ask Sequencer B to assign another band-pair for filling for the data which would normally have been recorded on band-pair 18 on the drum.

*Sequencer E*

Sequencer E is used at the beginning of an operating day to initially assign to each of the ten tapes one band-pair for filling. It may also be used following power failure or another similar malfunction to make certain at any time during daily operations that each tape has assigned to it a band-pair for filling. Sequencer E is started manually and accomplishes the assignment of band-pairs to tapes by repeatedly calling into use Sequencer B. Thus, at the start of an operating day Sequencer E inspects the status of Memory II for each of the ten tapes in succession. For each tape not having any band-pair assigned to it for filling, Sequencer B is initiated. At the end of each Sequencer B operation, Sequencer E is allowed to progress to an inspection of the next tape in succession.

The sequence of relay operations which accomplish this function is as follows: Referring to FIGURE 27, Sequencer E is started by depression of manual push-button switch 2700. A path to relay 2702 is then completed through normally closed contacts 903F, 2706D, 1032B, 1710L, 1006J, and 2700. Relay 2702 latches through contacts 2900C and 2702C. The closure of relay 2702 first causes relay 2704 to operate by the path through contacts 2702E, 1022B, and 2708A. Relay 2704 is a high-speed relay. The closure of relay 2702 also completes a path to the solenoid of relay 2706 by the path through contacts 1140B, 902H, 1710K, and 2702D. Relay 2706 then latches through contacts 1032C, 2802A, and 2706G.

Referring now to FIGURE 12, the closure of relay 2706 then completes a path through contacts 2706H and normally closed contact 1006B to relay 1236. A path is also provided to energize the column 19 solenoid $1242_{19}$ on crossbar Memory II, deck 1, by the path involving contact 2706J and normally closed contacts 2900E. The closure of column solenoid $1242_{19}$ then supplies power to row 1 solenoid $1246_1$ of crossbar Memory II, deck 1. The power path commences in FIGURE 28 and includes contacts 1006E, 2706B, 2900D, and 1242C, 2702J, to FIGURE 12, contacts 1236B, and then to solenoid $1246_1$.

The closure of row solenoid $1246_1$ then completes a path to relay 2708 in FIGURE 27 through off-normal contacts $1246_1$B and contacts 1006N and 2706F. Relay 2708 then latches through contacts 2702G and 2708B. The closure of relay 2708 then enables relay 2704 to release since normally closed contact 2708A, which is in the operating path of relay 2704, is opened. The opening of relay 2704 permits column zero solenoid $1242_0$ in FIGURE 12 to operate by a path involving contacts 2706K and 2704B. An alternate power path to column 19 solenoid $1242_{19}$ is also provided through the path involving contacts 2706J and 2704A; since row solenoid $1246_1$ was operated previously, the operation of column solenoid $1242_0$ now pulls in the crossbar contacts MII1A0 at row 1, column 0.

Referring to FIGURE 29, deck 6 of Memory II has its contacts MII1F0 also closed by the row 1 and column 0 solenoid operation. The closure of column solenoid $1242_0$ also completes a path as seen in FIGURE 12 to operate relay 1234 through off-normal contacts $1242_0$A and $1242_{19}$A. When relay 1234 operates, a power path is completed (FIGURE 29) to relay 2900 through contacts 1234C, MII1F0, and 2702A. Relay 2900 then latches through contacts 2706C, 2902A, and 2900K.

Closure of relay 2900 then releases relay 2702 (FIGURE 27) by opening normally closed contacts 2900C in the latch path of relay 2702. It should now be noted that when relay 1234 operates during the first operating step of Sequencer E, contacts 1234H (FIGURE 28) open, thereby introducing a resistance 2800 into the latch circuit of row solenoid 1, $1246_1$ (FIGURE 12), which, as seen in FIGURE 28, may be traced through contacts 1006E, 1234H, 2706B, 2900G, crossbar contact MII1F0 on row 1, column 0 of Memory II, deck 5, through contacts 1236B in FIGURE 12 to row solenoid $1246_1$. This resistance 2800 has a value to insure that solenoid $1246_1$, once operated, will remain latched, but if an attempt is made to operate another solenoid through this same path, insufficient current is available to operate the solenoid. When relay 2900 operates, the circuit to row solenoid 2 $1246_2$ is broken as contact 2900D opens, and reduced power is applied through contacts 1006E, 2706B, 2900G, contact MII1F0 on crossbar Memory II, deck 5, to FIGURE 12, contacts 1236C to row solenoid $1246_2$. The opening of relay 2702 allows relay 2708 to open, since contact 2702G is in the latch path of 2708. The opening of relay 2708 closes normally closed contacts 2708A, thus enabling relay 2704 to be operated again over a path involving contacts 2708A, 1022B, 2702F, provided power is supplied from a circuit chain shown in FIGURE 11, which is to be described shortly. When relay 2708 opens, a path is also completed to relay 1005 in FIGURE 10 through contacts 2702H, 2706AB, and normally closed contacts 2708C. Thus, the opening of relay 2708 completes paths to operate relays 2704 and 1005 simultaneously provided power is supplied from the circuit on FIGURE 11. Relay 2704 is a high-speed relay and its contacts 2704C are connected across the solenoid of relay 1005. Therefore, energization of relays 2704 and 1005 simultaneously prevents relay 1005 from operating, since its solenoid is shorted to ground.

Referring now to FIGURE 28, the conditions under which power is supplied to relay 2704 involves a path through contacts 2900H, crossbar contacts MII1D0 on deck 4 of Memory II, the closure of which was described previously, through lead L51 to contacts 2706T on FIGURE 11 to row bus 1 on deck 6 of Memory II. If any band-pair is assigned to tape 1 (for example, band-pair 9) contacts MII1F9 of this crossbar at row 1, column 9, would be closed. Thus, power is distributed along row bus 1 through contacts 1409E and 2706V over a lead to relay 2704 and FIGURE 27. Contacts 1409E in this chain of contacts are normally closed contacts in the fill-empty relay 1409 for band-pair 9. Thus, if band-pair 9 were full and not filling, relay 1409 would be energized and no path would be provided to relay 712, since contacts 1409E would be open. Similarly, if no band-pair were assigned to tape 1, no path would be provided from row bus 1 to relay 2704.

Therefore, if a filling band-pair is assigned to tape 1, the opening of relay 2708 will cause simultaneous energization of relays 2704 and 1005, with the result that relay 2704 operates, but relay 1005 does not operate. However, if no filling band-pair is assigned to tape 1, the opening of relay 2708 will energize relay 1005 but will not energize relay 2704.

When relay 1005 operates, Sequencer B is started and operates exactly as described previously, the only exception being that the energization path for the row solenoids 1246 in FIGURE 10 is completed through the following contacts instead of through the contacts described in the previous discussion of Sequencer B. This path may be traced in FIGURE 12 through contacts 1006S, 2900A, 1218K, contacts MII1A0, contacts 1236B, to row solenoid $1246_1$. The rest of the Sequencer B operation is just as described previously and culminated in the assignment of an available band-pair to tape 1. Such an assignment causes one of the contacts connected to row bus 1 of crossbar Memory II, deck 6, on FIGURE 11 (for example, contact MII1F1, assuming that band-pair 1 was assigned to tape 1) and contacts 1401E, contacts 2706U, thence to relay 2704. It may therefore be seen that as soon as the Sequencer B operation of assigning a band-pair to tape 1 for filling is completed, power is supplied to relay 2708, as previously described. The closure of relay 2708 then opens relay 1005, FIGURE 10, through its shorting contact 2708C. This completes the description of the first step of operations of Sequencer E, namely, that in which tape 1 is inspected to determine whether it has assigned to it a band-pair for filling, and, if not, to cause Sequencer B to assign such a band-pair.

The second step of Sequencer E operation, in which Memory II is inspected to determine if tape 2 has a band-pair assigned for filling, will now be described.

With closure of relay 2708, the path to column 19 solenoid $1242_{19}$ (FIGURE 12) is broken, since normally closed contacts 2708A are opened. Relay 1234, FIGURE 12, is now opened, since off-normal contacts 1242A open with de-energization of column solenoid $1242_{19}$. The opening of relay 1234 then allows full power to be applied to row solenoid 2 ($1246_2$), since contacts 1234H short out the current-limiting resistor 2800 again. The sequence of relay closures and openings which follows is identical to those of step 1 of the operation of Sequencer E, except that the role of solenoids $1242_1$ and $1242_2$ in FIGURE 12 are interchanged, and relay 2900, which was closed with closure of relay 1234 in step 1, is instead released at the corresponding point in step 2. Thus, closure of row solenoid $1246_2$ causes relay 2708 to close when off-normal contacts $1246_2$B close. The closure of relay 2708 opens relay 2704 since normally closed contacts 2704A open. The opening of relay 2704 applies power to column 19 solenoid $1242_{19}$ of Memory II shown in FIGURE 12, contacts 2704A. The closure of solenoid $1242_{19}$ causes relay 1234 to close through contacts $1242_0$A and $1242_{19}$A. And the closure of relay 1234 then completes a path to relay 2902 in FIGURE 29 through the path involving contacts 1234C, MII1F0, MII1B19 (which was closed when column 19 solenoid $1242_{19}$ was operated since row solenoid 2 ($1246_2$) had previously operated) to relay 2902.

Closure of relay 2902 opens the latch path to relay 2900 through normally closed contact 2902A, thereby opening relay 2900. The opening of relay 2900 then breaks the power path to row solenoid $1246_2$ by opening contacts 2900G, which, it will be recalled, are in the path. The opening of solenoid $1246_2$ then allows relay 2708 to open, since off-normal contact $1246_2$B opens. The opening of relay 2708 causes energization of relay 1005 through contacts 2708C and possible energization of relay 2704 through contacts 2708A, and through a path shown in FIGURE 11, also as previously described, except that such power to relay 2708 is now derived from row bus 2 of deck 6 of Memory II, instead of from row bus 1. This path may be traced, starting with FIGURE 28, contacts 2900J, crossbar contacts MII2D19 over lead L52, thence to FIGURE 11 and contacts 2706AE to row bus 2.

Thus, the condition maintained at the end of step 2 of Sequencer E is the same as has occurred at the end of step 1, except that the power of relay 2704 must come through closed contacts in row 2, corresponding to tape 2 of crossbar Memory II (402), deck 6. Consequently, relay 2704 will be closed only if a band-pair is assigned for filling to tape 2. If such is not the case, relay 1005 will operate, starting Sequencer B, which will assign the next available band-pair to tape 2 for filling. The path will then be completed to relay 2704, which will close, and start the third step of Sequencer E, in which Memory II is quizzed to determine if tape 3 has assigned to it a band-pair for filling.

These same steps are repeated successively for each of the remaining tape numbers. It may be appreciated from the foregoing description that relay 2900 will be operated during each step for an odd tape number and released during each step for an even tape number. Following the completion of ten steps, a path is completed to relay 2702 in FIGURE 28 which is operated just as if it were an eleventh row solenoid of Memory II. This path may be traced through contacts 1006E, 1234H (which actually causes closure of relay 2802) contacts 2706B, 2900D, contacts MII10E19 on row 10, column 19, deck 5, crossbar Memory II to one side of solenoid of relay 2802 and through contacts 1234B to FIGURE 12, contacts 2706H and 1006B to ground. Closure of relay 2802 breaks the latch path to relay 2706, as may be seen in FIGURE 27, by opening the normally closed contacts 2802A, thereby enabling relay 2706 to open. The opening of relay 2706 causes relay 1236 to open. The opening of relay 2706 causes relay 1236 to open, since contact 2706H is now open (FIGURE 12) and relay 2704 shown in FIGURE 27 opens, since contacts 2706U, V, W, Y, etc., shown in FIGURE 11, which supply power to relay 2704 are all opened. The opening of relay 2706 also removes power from column solenoid $1242_{19}$ of Memory II by opening contact 2706J (FIGURE 12). The opening of solenoid $1242_{19}$ then breaks the circuit to relay 2802 as contact MII10E19 (FIGURE 28) is opened. Relay 1236 then opens the opening of contact 2802C in FIGURE 12. When relay 1236 opens, all relays are released and the steps of Sequencer E are finished.

It should be noted that an alternate path is provided to relay 2702 (FIGURE 27), the closure of which can initiate operation of Sequencer E. Through contacts 1032H, 2600L, and (referring to FIGURE 26) position 19 of deck E of stepper 1004 through contacts 1032D and 1830R. It will be recalled that relay 2600 (whose contacts 2600L are in this power chain) is closed at the end of every Sequencer D operation. Also, contacts 1830R are closed at this time if a successful search is obtained during the first or third sequences of Sequencer C (surveillance). Contacts 1032D and 1032H will be closed, provided a previous operation of Sequencer B terminated because of an absence of any available band-pairs for assignment. The fact that stepper relay 1004 is at position 19 is indicative of the fact that this previous operation of Sequencer B was initiated by Sequencer E, rather than by Sequencer A. Thus, at the close of operation of Sequencer D, when the above-described conditions are met, a path is provided to close relay 2702, thereby starting Sequencer E. This facility is provided so that if a previous Sequencer E operation was stopped because Sequencer B could find no free band-pairs for assignment for filling, then Sequencer E will be restarted to try the same operation again as soon as some band-pairs are released from assignment by Programmer C as a result of their contents being emptied. The completion of operation of Sequencer D is indicative of the fact that some band-pairs have been released from assignment, since Sequencers C and D would not have operated without such a condition occurring. This restarting of Sequencer E also occurs if Sequencer C clears out after an unsuccessful search, as indicated by closure of relay 1911. Relay 1911 causes subsequent closure of relay 2512, as described at the end of the description of Sequencer B, which closes, in turn, relay 2600 through contact 2512B (FIGURE 26), thereby initiating Sequencer E. Relay 1032 releases as soon as Sequencer E starts, since contacts 2702B opens in the latch circuit of relay 1032.

*Summary*

There has been described above the details of the operation of the embodiment of the invention. Summarizing this description, Programmer A controls the entry of items from the input keyboards to the drum storage. With the help of the memory crossbars found in Memory I and Memory II, the appropriate band-pair and the appropriate track of this band-pair are connected in for each entry. When in the process of entry a track of a filling band-pair becomes full, the measuring circuit provides a signal to Sequencer A to supply the next track in the band-pair. Sequencer A changes the status of Memory I in selecting for filling the next track in order for the band-pair concerned. If the track which became full was the last track of the band-pair, the completion of the Sequencer A operation initiates automatically the operation of Sequencer B, which is the band-pair advance operation.

Sequencer B changes the status of Memory I by declaring the band-pair concerned as full, then switching the fill-empty switches connecting the data input to the magnetic reading heads of this band-pair to the empty position. In this position, the magnetic reading heads are connected through the fill-empty switches to terminals which, at the appropriate time, will be connected to the assigned subsequent storage section of the permanent storage apparatus. Sequencer B also assigns for filling a free band-pair to take the place of the one just filled.

When a transfer of data has been completed, Sequencer C is initiated to survey the crossbar memories to see which band-pairs should be next transferred to a tape. The completion of this survey initiates the operation of Sequencer D. Sequencer D connects the permanent storage writing apparatus to the terminals to which the band-pair magnetic heads are connected. These heads are over the next band-pair to be emptied onto a tape. If one of the band-pairs, which is connected in for emptying, is still filling, Sequencer B is re-initiated to assign a new band-pair for filling to replace the one connected for emptying. At the start of the operating day, Sequencer E may be activated to provide an initial band-pair to tape assignment to guarantee the assignment of a band-pair for filling for each tape. Sequencer E repeatedly activates Sequencer B to perform the actual assignment of band-pairs. Band-pairs whose contents have been transferred to tape are released from their previous assignment and can be assigned again by Sequencer B.

It should be appreciated that the use of the term "band-pair" to represent eight data tracks is by way of example and should not be taken as a limitation herein. From the explanation given above, it should be seen that any group of tracks may be assigned to a tape, that these groups need not necessarily be adjacent one another, but because of the flexibility provided by the relays, the group of tracks may be at any desired locations over the drum. Also, the tracks within a group need not necessarily be adjacent to one another for the same reasons.

There follows, by way of example and not by way of limitation, a list of the different types of relays and the number required in the construction of the Sequencers A through E and the switching apparatus for routing data to and from the drum.

| Unit | No. Required | Features |
|---|---|---|
| Crossbar (Memory I) | 1 | 9 rows, 19 columns, 5 decks of contacts; two off-normal contacts per row solenoid; four off-normal contacts per column solenoid. |
| Crossbar (Memory II) | 1 | 10 rows, 20 columns, 5 decks of contacts; two off-normal contacts per row solenoid; four off-normal contacts per column solenoid. |
| Stepper (Sequencer B, 1004) | 1 | 20 positions, 7 decks, one off-normal contact on magnet. |
| Stepper (Sequencer C, 1720) | 1 | 20 positions, 8 decks, one off-normal contact on magnet. |
| Steppers (Sequencer D, 2410, 2412, 2414, 2416) | 4 | 19 positions, 6 decks, two off-normal contacts on magnet. |
| Relays | 13 | 1 contact (at least). |
| Do | 8 | 2 contacts (at least). |
| Do | 9 | 3 contacts (at least). |
| Do | 6 | 4 contacts (at least). |
| Do | 4 | 5 contacts (at least). |
| Do | 6 | 6 contacts (at least). |
| Do | 3 | 7 contacts (at least). |
| Do | 2 | 8 contacts (at least). |
| Do | 2 | 9 contacts (at least). |
| Do | 22 | 10 contacts (at least). |
| Do | 1 | 11 contacts (at least). |
| Do | 2 | 13 contacts (at least). |
| Do | 18 | 14 contacts (at least). |
| Do | 1 | 17 contacts (at least). |
| Do | 1 | 19 contacts (at least). |
| Do | 1 | 28 contacts (at least). |
| Do | 1 | 30 contacts (at least). |
| Do | 1 | 35 contacts (at least). |
| Do | 1 | 44 contacts (at least). |
| Do | 1 | 55 contacts (at least). |
| Do | 1 | 72 contacts (at least). |

In order to secure the equivalent of one relay having a large number of contacts, it is a well-known expedient to operate several relays in parallel having the equivalent number of contacts.

There has been described herein a novel and useful temporary storage system which permits the inflow of data to a memory in random fashion. This data is preliminarily sorted or arranged and stored in groups of tracks on the drum employed for storage. The extent of the filling of the groups and also the assignment of these track groups to subsequent storage means in which the data stored in each track group is to be eventually stored is indicated by crossbar memories. Means are provided for surveying the extent of storage, emptying the filled track groups or track groups which are in a condition to be emptied where so indicated, and providing further track groups for storage where such further storage space is required.

I claim:

1. In an information-handling system of the type having a memory system comprising a plurality of separate storage facilities for storing each item of incoming data in a preassigned one of said separate storage facilities, a temporary storage system for said items comprising storage apparatus having a plurality of storage sections, means for assigning certain ones of said storage sections for the storage only of items destined for preassigned ones of said separate storage facilities, means for maintaining an indication of said assignments, means for directing incoming items to be stored in said storage sections in accordance with said indicated assignments, means responsive to one of said assigned storage sections becoming filled to assign another of said storage sections for filling, means to select for emptying said assigned storage sections for a separate storage facility in the order of being filled, and means to initiate operation of said means to assign for filling another storage section in place of a partially filled one which is selected for emptying.

2. In an information-handling system of the type having a memory system comprising a plurality of separate storage facilities for storing each item of incoming data in a preassigned one of said separate storage facilities, a temporary storage system for said items comprising storage apparatus having a plurality of storage sections, means for assigning certain ones of said storage sections for the storage only of items destined for preassigned ones of said separate storage facilities, means for maintaining an indication of said assignments, means for directing incoming items to be stored in said storage sections in accordance with said indicated assignments, means for maintaining an indication of the filled condition of each of said storage sections, means responsive to an indication that an assigned storage section is filled to assign another of said storage sections for filling, means for surveying said means for maintaining an indication of the filled condition of each of said storage sections for determining suitable ones for emptying into a separate storage facility to which they have been assigned, means responsive to said means for surveying to connect for emptying said suitable ones of said storage sections in the order in which they were filled, and means to initiate operation of said means to assign another of said storage sections for filling in place of a partially filled storage section which has been connected for emptying.

3. In a buffer storage system of the type having a magnetic drum which has a plurality of data-storage tracks and a magnetic transducer head over each data-storage track, apparatus for directing incoming data items onto said drum in accordance with predetermined data-storage groups comprising means for assigning different groups of said tracks for storage of different predetermined data groups, means for maintaining an indication of said track group assignments, means for directing incoming data items into the tracks in the assigned groups responsive to assignment indications by said means for maintaining a track group assignment indication, means for maintaining an indication of the filling condition of the tracks in each group, means for directing incoming data items into an available track in the assigned group responsive to the indication by said means for maintaining an indication of the filled condition of said tracks, and means responsive to an indication that all the tracks of a group are filled to initiate the assignment of another group of tracks for filling by items of the same group.

4. In a buffer storage system as recited in claim 3 wherein said means for maintaining an indication of said track group assignments and said means for maintaining an indication of the filling condition of the tracks in each group include a first and a second crossbar-switching apparatus, each having contacts disposed in intersecting columns and rows, a row solenoid at the end of each row and a column solenoid at the end of each column, the closing of a pair of contacts at the intersection of a row and column requiring the excitation of the corresponding row and column solenoid, in said first crossbar-switching apparatus each of said rows being representative of a different data-storage group and each of said columns being representative of a different group of tracks, means for exciting a desired row solenoid and a desired column solenoid responsive to said means for assigning to close a pair of contacts at the intersection of said row and column to be representative of an assignment of a group of tracks to a data-storage group, in said second crossbar-switching apparatus each of said rows being representative of a different one of the tracks in a group of tracks, each of said columns being representative of a different group of tracks, means for exciting a row solenoid and a column solenoid when a track fills to close a pair of contacts at the intersection of said row and column to be representative of the next track for filling.

5. In a buffer storage system as recited in claim 4 wherein said means for directing incoming data items into the tracks in an assigned group includes a group-selecting relay for each track group, each having a relay coil and contacts, means for coupling said group relay coils to the respective columns of said first crossbar-switching apparatus contacts for selective excitation in accordance with the group identification of an incoming item of data, and said means for directing incoming data into an available track in an assigned group includes means for coupling said second crossbar-switching apparatus contacts to the magnetic transducer heads over the associated data tracks on said drum, means for coupling each group relay contact to the respective columns of said second crossbar-switching apparatus contacts in accordance with their group representations, and means for applying incoming data to said group-relay contacts.

6. In a buffer storage system of the type including a magnetic drum having a plurality of data-storage tracks and a magnetic transducer head over each track, apparatus for routing data to and from said drum to provide a desired grouping for said data comprising means for assigning different groups of tracks for storage of different data groups, means for indicating said track group assignments, means responsive to a track group indication by said indicating means to direct incoming data to the indicated track group, means for indicating the filling condition of each group of tracks, switch means for coupling said means for indicating the filling condition of each group of tracks to the respective transducer heads over said tracks, means to apply the output of said means to direct incoming data to a track group to said means for indicating the filling condition of each group of tracks whereby said incoming data is applied to a track in said group, means responsive to a track in a group being filled to advance said means for indicating the filling condition of said track groups to indicate the next track in a group for filling, means responsive to an indication that a track group is filled to energize said switch means for said track group to be decoupled from said means for indicating the filling condition of each group of tracks, means responsive to an indication that a track group is filled to provide another track group for filling by incoming data in the same data group, means for surveying said means for indicating the assignment and for indicating the filling condition of each group of tracks to select for emptying sufficiently full track groups assigned to a data group, means responsive to a selection by said means of a partially filled track group to energize the switch means for said partially filled track group to be disconnected from said means for indicating the filling condition of each group of tracks and to initiate provision of another track group for filling by incoming data in the same data group, and means to make connections to said disconnected switch means for emptying said track groups in the order in which they were filled.

7. In a buffer storage system as recited in claim 6 wherein said means for surveying said means for indicating the filling condition of each group of tracks to select for emptying sufficiently full track groups assigned to a data group includes means for first selecting two full track groups assigned to a single data group, means for selecting secondly one and one-half full track groups assigned to a single data group, means for thirdly selecting a single filled track group, and means for fourthly selecting a track group which is at least half filled.

8. In a storage system of the type wherein there are a plurality of magnetic tapes for storing each item of incoming data in a preassigned one of said tapes, an improved temporary storage system for said data comprising a magnetic drum having a plurality of data storage tracks, means for storing said items of incoming data in different sections of said drum in accordance with the different tapes on which said items are to be stored, said means including means for assigning a different group of tracks for the storage of items to be stored on each of said tapes, means to monitor the filled conditions of the tracks in each group, and means to obtain another group of tracks for filling in place of a group of tracks that is filled; and means for reading said items of data from said drum to each of said tapes including means for surveying said means to monitor the filled conditions of said track groups to determine for emptying suitably filled groups of tracks with data assigned for storage on a tape, means to connect said track groups for emptying onto a tape in the order of filling, and means to initiate the assignment of a different group of tracks for filling in place of a partially filled group of tracks connected for emptying.

9. In a magnetic-drum storage system of the type wherein groups of tracks located in different parts of said drum are assigned for storage of incoming items of data to be grouped in accordance with the different track groups, apparatus for monitoring the filled condition of said tracks including a crossbar-switching apparatus having contacts disposed in intersecting columns and rows, a row solenoid at the end of each row, a column solenoid at the end of each column, the closing of a pair of contacts at the intersection of a row and column requiring the excitation of the corresponding row and column solenoid, each of said columns representing a different track group, each of said rows representing the tracks in a group, and means for exciting a row solenoid and a column solenoid when a track fills to close a pair of contacts at the intersection of said row and column to be representative of the next track for filling.

10. In a magnetic-drum storage system of the type wherein groups of tracks located in different parts of said drum are assigned for storage of incoming items of data to be grouped in accordance with the different track groups, apparatus for monitoring the filled condition of said tracks including a crossbar-switching apparatus having contacts disposed in intersecting columns and rows, a row solenoid at the end of each row, a column solenoid at the end of each column, the closing of a pair of contacts at the intersection of a row and column requiring the excitation of the corresponding row and column solenoid, each of said columns representing a different track group, each of said rows representing the tracks in a group, means for exciting a row solenoid and a column solenoid when a track fills to close a pair of contacts at the intersection of said row and column to be representative of the next track for filling, and means for successively surveying said crossbar apparatus to locate which of the groups of tracks are more filled than others, for the purpose of emptying said more-filled groups of tracks.

11. In a magnetic-drum storage system of the type wherein groups of tracks located in different parts of said drum are assigned for storage of incoming items of data to be grouped in accordance with the different track groups, apparatus for monitoring the filled condition of said tracks including a crossbar-switching apparatus having contacts disposed in intersecting columns and rows, a row solenoid at the end of each row, a column solenoid at the end of each column, the closing of a pair of contacts at the intersection of a row and column requiring the excitation of the corresponding row and column solenoid, each of said columns representating a different track group, each of said rows representing the tracks in a group, means for exciting a row solenoid and a column solenoid when a track fills to close a pair of contacts at the intersection of said row and column to be representative of the next track for filling, and means responsive to the crossbar-switching apparatus indicating the last track in a group of tracks being filled to provide another group of tracks for filling in place of the one that is filled.

12. Apparatus as recited in claim 11 wherein said incoming items of data are directed to said groups of tracks through said crossbar switching apparatus.

13. In a buffer storage system of the type having storage apparatus divisible into a plurality of storage sections, the method of directing incoming data items into said storage apparatus in accordance with predetermined ultimate data-storage groups comprising the steps of assigning certain ones of said storage sections for the storage of items in certain ones of said data-storage groups, detecting the data-storage group of each incoming item of data, directing the detected item of data for storage into the storage section assigned to the detected data-storage group, maintaining an indication of the extent of filling of each of said plurality of storage sections, and assigning in place of a filled storage section the assignment of another storage section for filling by items in the same data group as the one to which the filled storage section was assigned.

14. In a buffer storage system of the type having storage apparatus divisible into a plurality of storage sections, the method of directing incoming data items into said storage apparatus in accordance with predetermined ultimate data-storage groups comprising the steps of assigning certain ones of said storage sections for the storage of items in certain ones of said data-storage groups, detecting the data-storage group of each incoming item of data, directing the detected item of data for storage into the storage section assigned to the detected data-storage group, maintaining an indication of the extent of filling of each of said plurality of storage sections, assigning in place of a filled storage section the assignment of another storage section for filling by items in the same data group as the one to which the filled storage section was assigned, and reading out for subsequent storage the items of data from the storage sections assigned to a group in the order in which those sections were filled.

15. In a buffer storage system of the type having storage apparatus divisible into a plurality of storage sections, the method of directing incoming data items into said storage apparatus in accordance with predetermined ultimate data-storage groups comprising the steps of assigning certain ones of said storage sections for the storage of items in certain ones of said data-storage groups, detecting the data-storage group of each incoming item of data, directing the detected item of data for storage into the storage section assigned to the detected data-storage group, maintaining an indication of the extent of filling of each of said plurality of storage sections, detecting from the indications of the extent of filling of each of said plurality of storage sections which of said storage sections assigned to a group are available for emptying, connecting for readout those of said storage sections detected as available for emptying in the order in which the storage sections were filled, and assigning in place of a partially filled storage section connected for readout another storage section for filling by items of data in the same group.

16. In a magnetic-drum storage system of the type wherein there are a plurality of data tracks and a transducer head is over each track, and wherein groups of tracks located in different parts of said drum are assigned for storage of incoming items of data which are to be stored in subsequent apparatus in accordance with the different track groups, apparatus for properly routing said data comprising first and second crossbar-switching apparatus each having contacts disposed in intersecting rows and columns, a row solenoid at the end of each row, a column solenoid at the end of each column, the closing of a pair of contacts at the intersection of a row and column requiring the excitation of the corresponding row and column solenoid, in said first crossbar-switching apparatus each of said rows being representative of a different data-storage group and each of said columns being representative of a different group of tracks, means for selectively exciting a desired row solenoid and a desired column solenoid to close a pair of contacts at the intersection of said row and column to be representative of an assignment of a group of tracks to a data-storage group, in said second crossbar-switching apparatus each of said rows being representative of a different one of the tracks in a group of tracks, each of said columns being representative of a different group of tracks, means for exciting a row solenoid and a column solenoid when a track fills to close a pair of contacts at the intersection of said row and column to be representative of the next track for filling, a group-selecting relay for each track group each relay having a coil and contacts, means for coupling said group relay coils to the respective columns of said first crossbar-switching apparatus contacts for selective excitation in accordance with the group identification of an incoming item of data, means for coupling said second crossbar-switching apparatus contacts to the magnetic transducer heads over the associated tracks on said drum, means for coupling each group relay contact to the respective columns of said second crossbar-switching apparatus contacts in accordance with their group representations, means for applying incoming data to said group relay contacts whereby said data is stored in a track in a group of tracks assigned for data within such group, means for assigning a group of tracks for filling responsive to said second crossbar apparatus to determine whether any groups of tracks are suitable for emptying, means responsive to said survey means to connect for emptying the transducer heads over a group of tracks determined as suitable, and means to procure assignment of another group of tracks for filling in place of a group of tracks connected for emptying which group of tracks is only partly filled at that time.

References Cited in the file of this patent

UNITED STATES PATENTS 2,549,071 Dusek et al. ------------ Apr. 17, 1951

(Other references on following page)

UNITED STATES PATENTS

| | | |
|---|---|---|
| 2,587,532 | Schmidt | Feb. 26, 1952 |
| 2,639,859 | Serrell | May 26, 1953 |
| 2,737,342 | Nelson | Mar. 6, 1956 |
| 2,854,652 | Smith | Sept. 30, 1958 |
| 2,885,659 | Spielberg | May 5, 1959 |
| 2,905,930 | Golden | Sept. 22, 1959 |
| 2,911,622 | Ayres | Nov. 3, 1959 |
| 2,954,166 | Eckdahl | Sept. 27, 1960 |